US007269579B2

(12) United States Patent
Lovegren

(10) Patent No.: US 7,269,579 B2
(45) Date of Patent: Sep. 11, 2007

(54) METHOD FOR TRACKING AND ASSESSING PROGRAM PARTICIPATION

(76) Inventor: Victoria M. Lovegren, 2226 Bellfield Ave., Cleveland Heights, OH (US) 44106

( * ) Notice: Subject to any disclaimer, the term of this patent is extended or adjusted under 35 U.S.C. 154(b) by 428 days.

(21) Appl. No.: 10/245,944

(22) Filed: Sep. 18, 2002

(65) Prior Publication Data

US 2003/0061231 A1    Mar. 27, 2003

Related U.S. Application Data

(60) Provisional application No. 60/323,008, filed on Sep. 18, 2001.

(51) Int. Cl.
*G06F 7/00* (2006.01)
(52) U.S. Cl. .............................. 706/47; 706/58; 707/10; 707/104.1
(58) Field of Classification Search ................ 707/102, 707/103 Y; 434/322
See application file for complete search history.

(56) References Cited

U.S. PATENT DOCUMENTS

| | | | | |
|---|---|---|---|---|
| 5,307,262 | A * | 4/1994 | Ertel ............................... | 705/2 |
| 5,379,057 | A * | 1/1995 | Clough et al. ............... | 345/173 |
| 5,893,098 | A * | 4/1999 | Peters et al. .................... | 707/10 |
| 6,151,581 | A * | 11/2000 | Kraftson et al. ................ | 705/3 |
| 6,311,190 | B1 * | 10/2001 | Bayer et al. ............. | 707/104.1 |
| 6,581,071 | B1 * | 6/2003 | Gustman et al. ......... | 707/104.1 |
| 6,877,034 | B1 * | 4/2005 | Machin et al. ............... | 709/223 |
| 2002/0072933 | A1 * | 6/2002 | Vonk et al. ..................... | 705/2 |
| 2002/0119433 | A1 * | 8/2002 | Callender ................... | 434/322 |
| 2002/0188182 | A1 * | 12/2002 | Haines et al. ............... | 600/300 |

OTHER PUBLICATIONS

Maximus Court View Software information at www.cci-maximus.com.

* cited by examiner

*Primary Examiner*—Anthony Knight
*Assistant Examiner*—Nathan H. Brown, Jr.
(74) *Attorney, Agent, or Firm*—Thompson Hine LLP

(57) ABSTRACT

Disclosed is a computerized decision support system and method for a) tracking participation within programs, b) capturing participant's participation activity and assessment information in a format that can be easily analyzed and c) distilling the participation and assessment data into useful management and evaluation information. The repository of longitudinal data can be analyzed and reported for case-management and program-evaluation purposes. An assessment module enables analyzable assessment instruments to be custom-defined by the system user, e.g. a program manager. The customized assessment instrument is used to provide answer-restricted questions during an assessment interview, enabling virtually any data item to be tracked historically. The system captures date/time-stamped participation information at various levels of detail and stores this information in a way that can be easily retrieved and analyzed for program and participant-focused analysis. A set of industry-standard participation events can be tracked, with supporting detail, as well as less-data-intensive ad hoc user-defined activities. The data model underlying the system, and the implementation of this model within a relational database system, provides a great degree of flexibility, adaptability and efficient navigation through the database for analysis and reporting. Though numerous program-evaluation reports are provided, a set of intermediary aggregations of data is also available for efficient evaluation of additional program outcome measures.

9 Claims, 100 Drawing Sheets

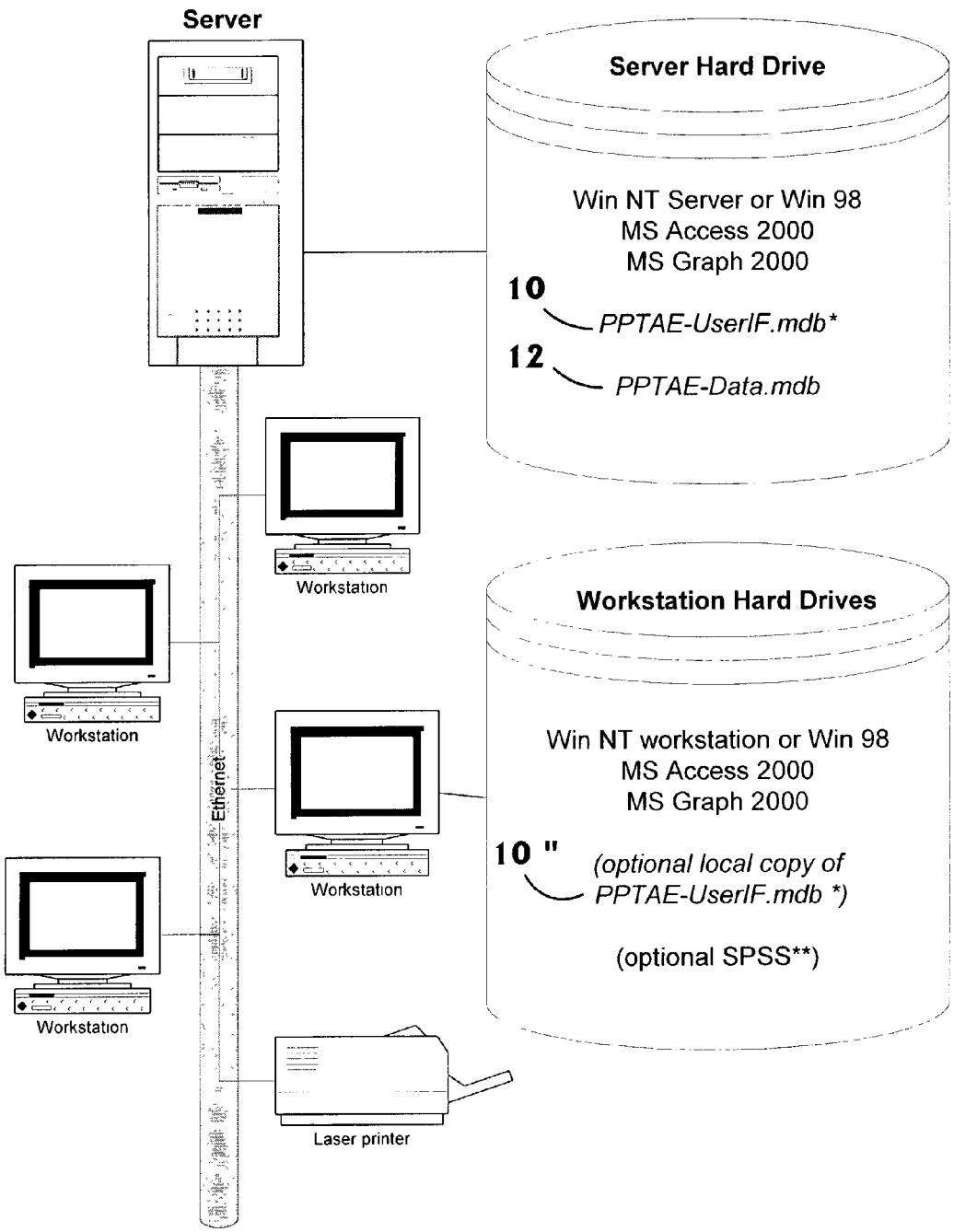
* linked to *PPTAE-Data.mdb* on Server
** or other application for performing advanced statistical analysis
Fig 1 (Preferred Embodiment)

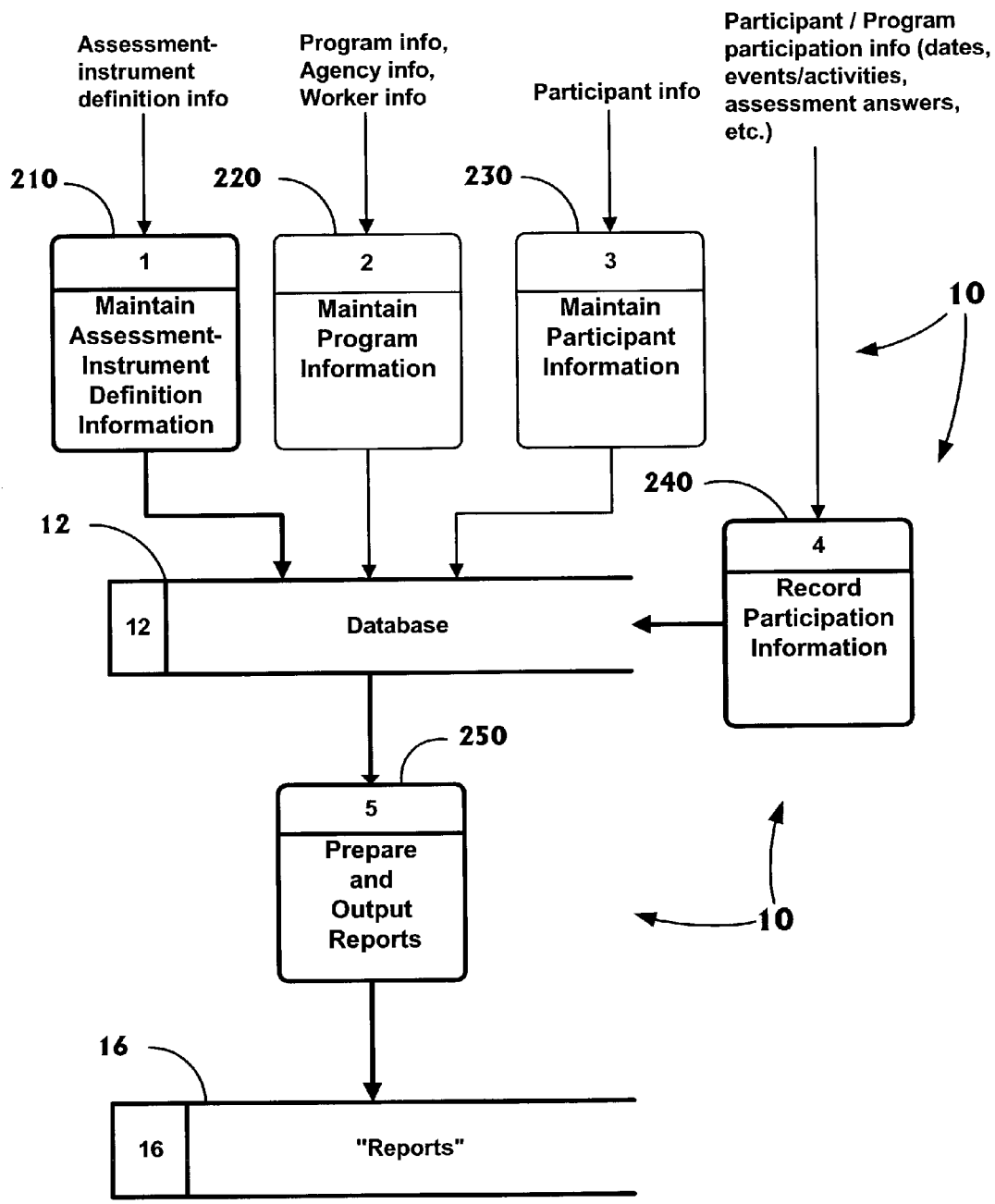
Fig 2 (Data Flow Diagram) - Program Participation Tracking, Assessment and Evaluation System -- Context Diagram

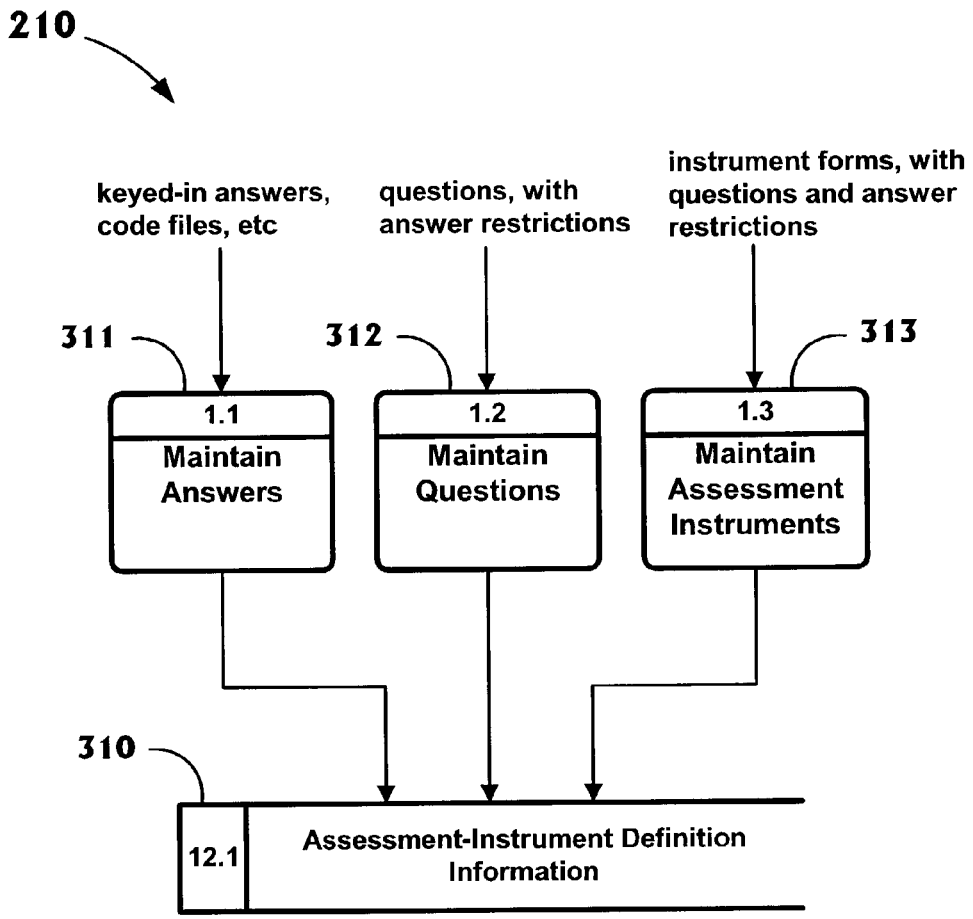
Fig 3a (Data Flow Diagram) - "Diagram 1" -- for Process 210

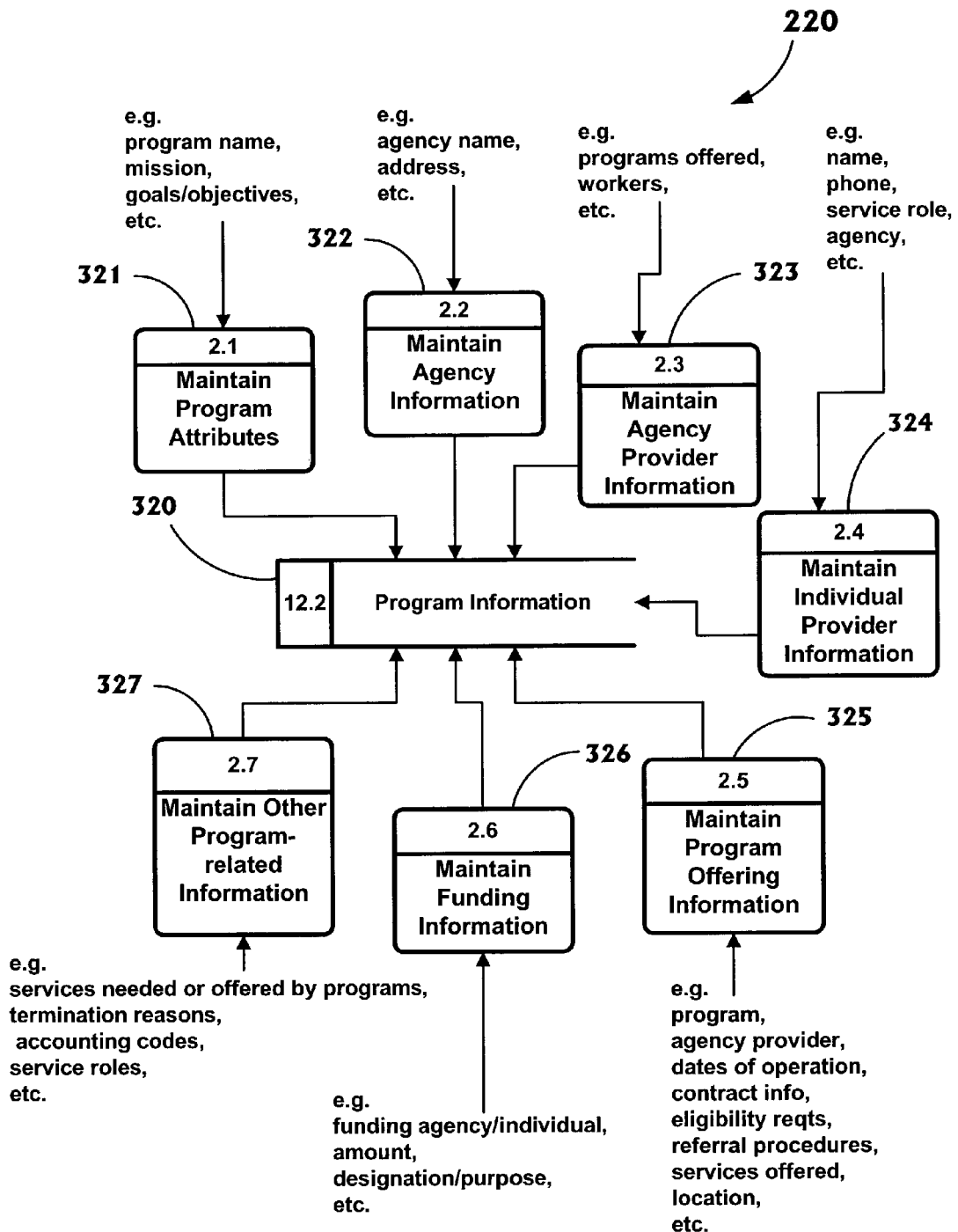
Fig 3b(Data Flow Diagram) - "Diagram 2" -- for Process 220

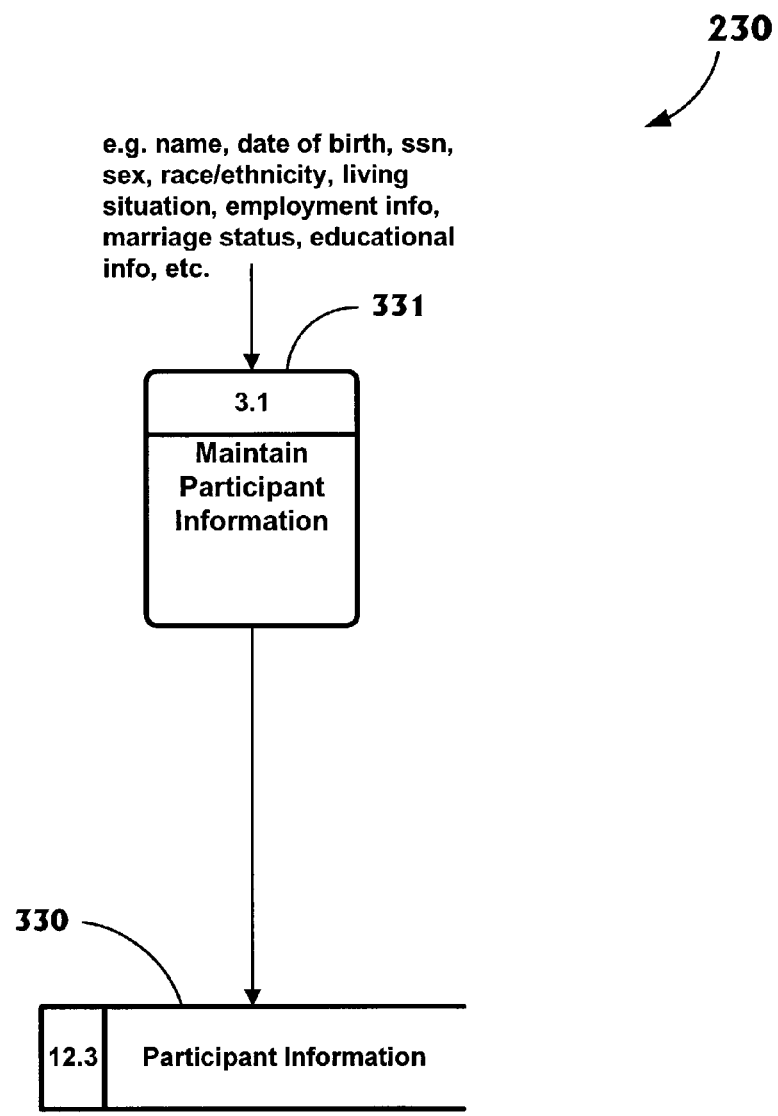
Fig 3c(Data Flow Diagram) - "Diagram 3" -- for Process 230

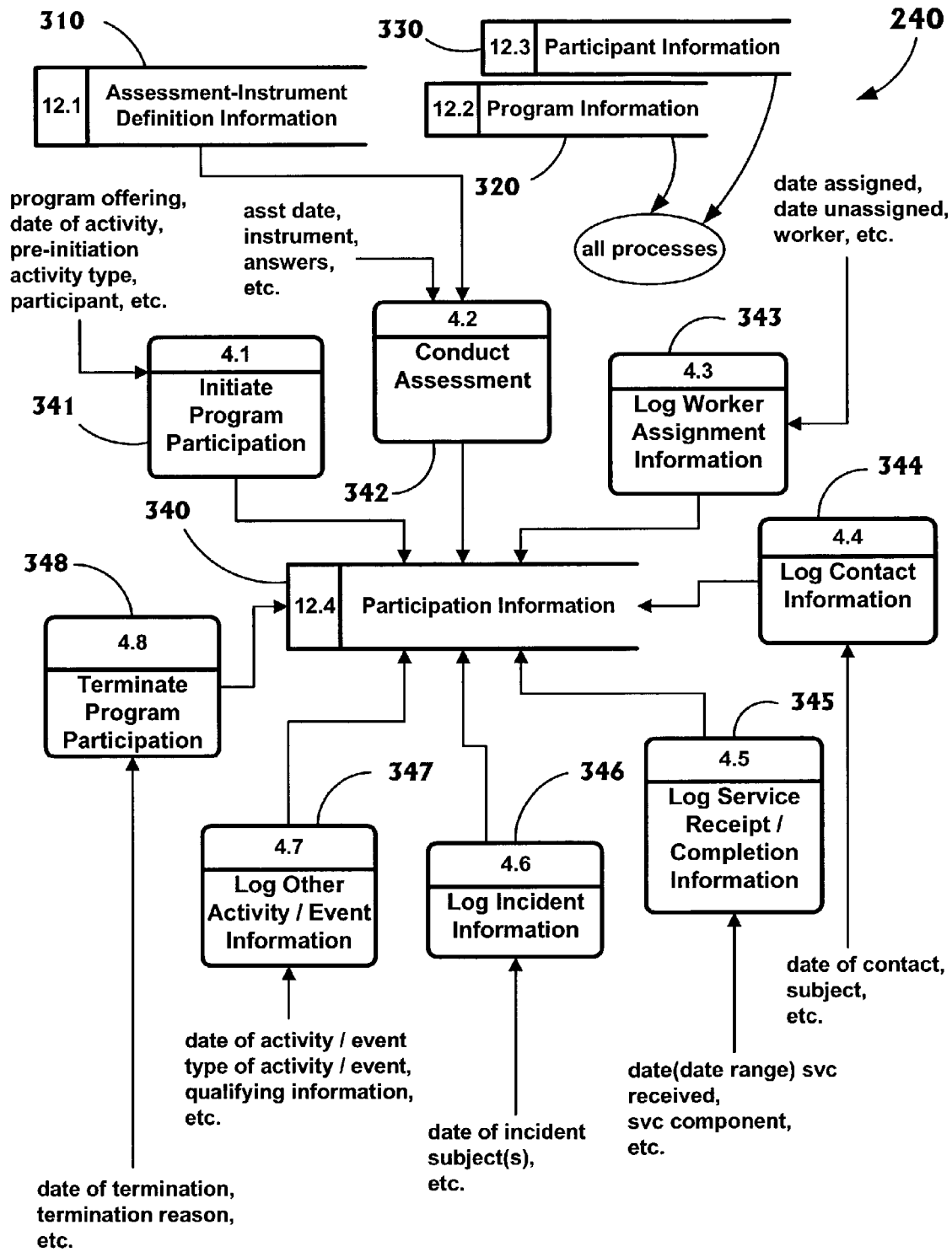
Fig 3d(Data Flow Diagram) - "Diagram 4" -- for Process 240

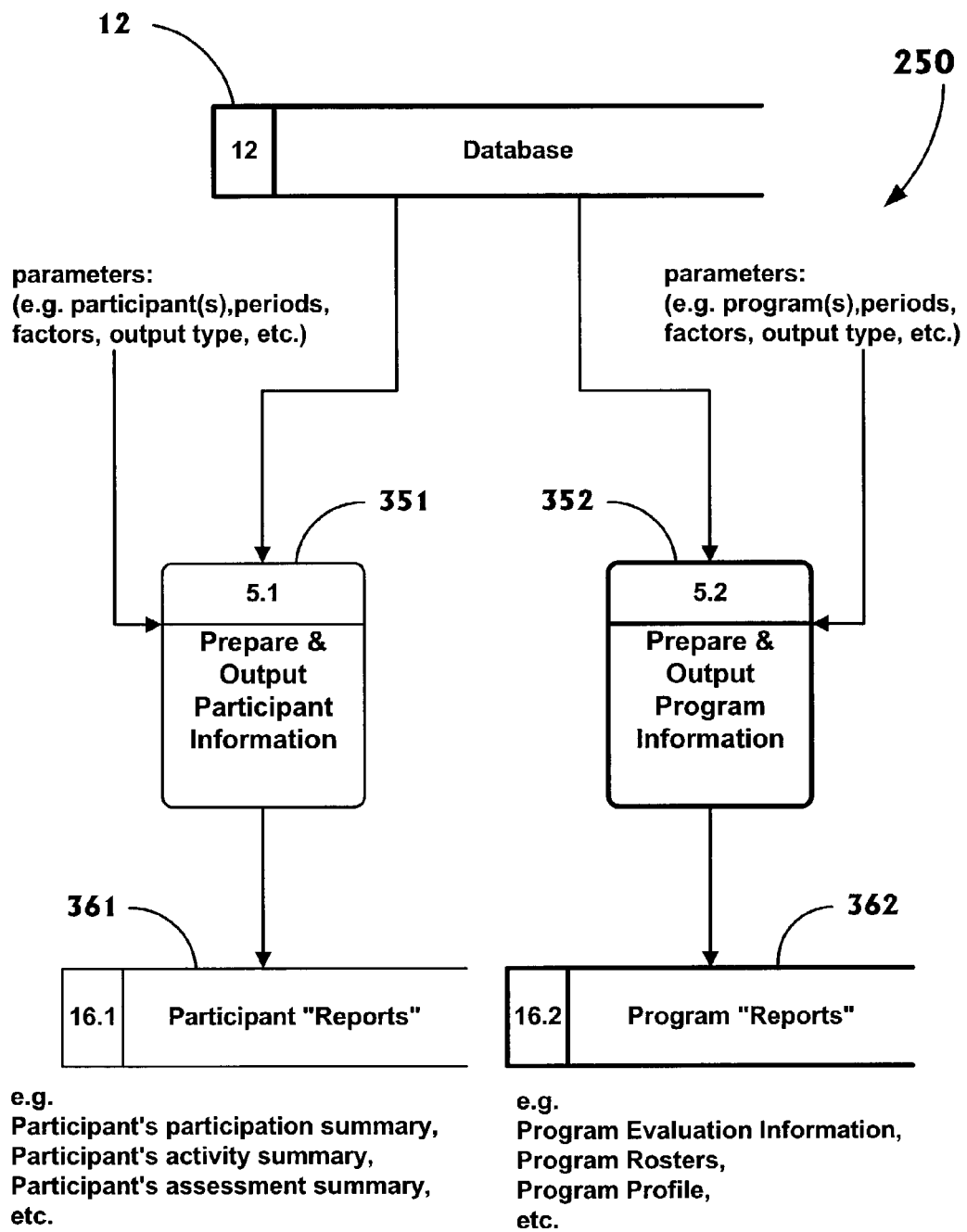
Fig 3e(Data Flow Diagram) - "Diagram 5" -- for Process 250

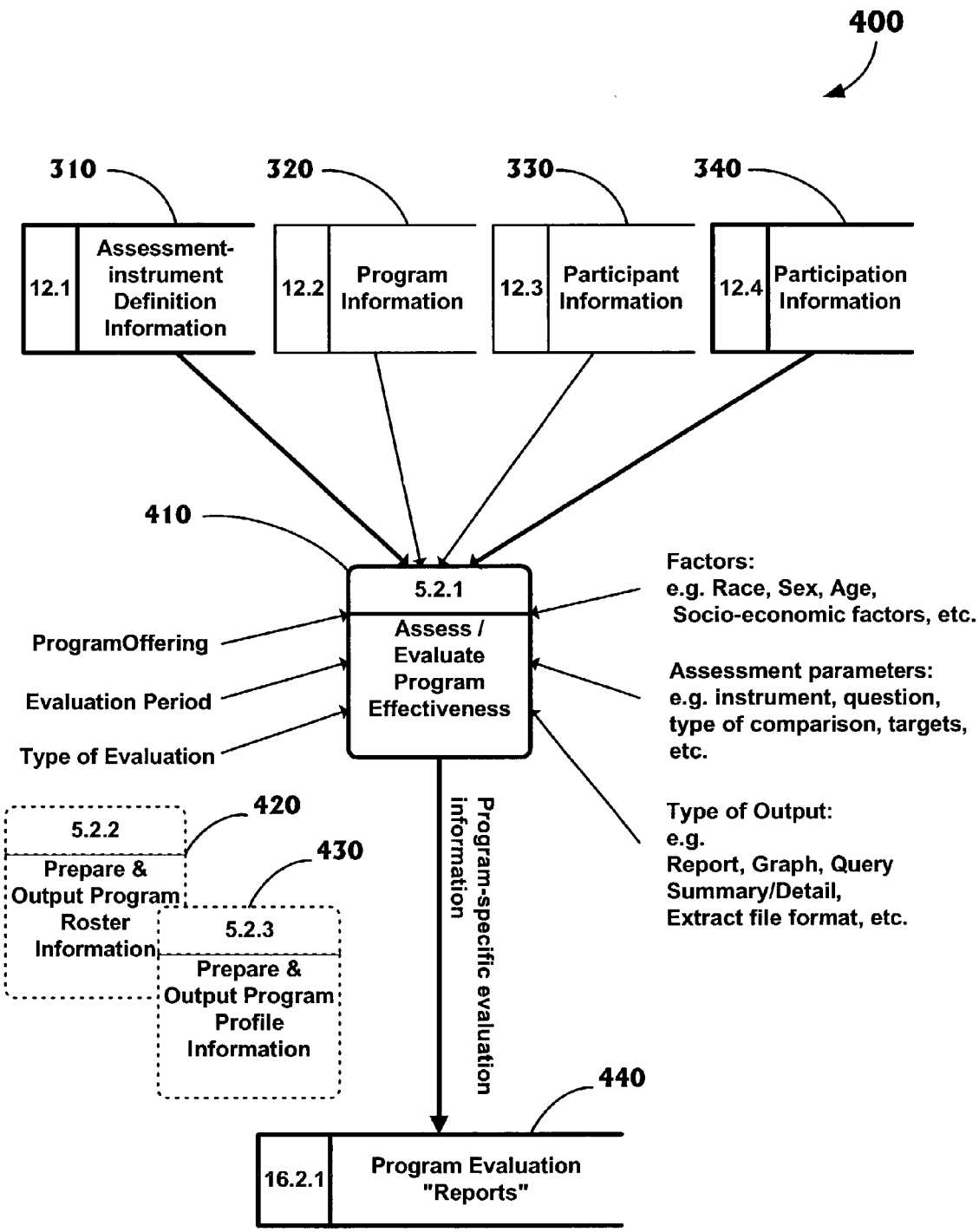
Fig 4 (Data Flow Diagram) - "Diagram 5.2" -- for Process 352

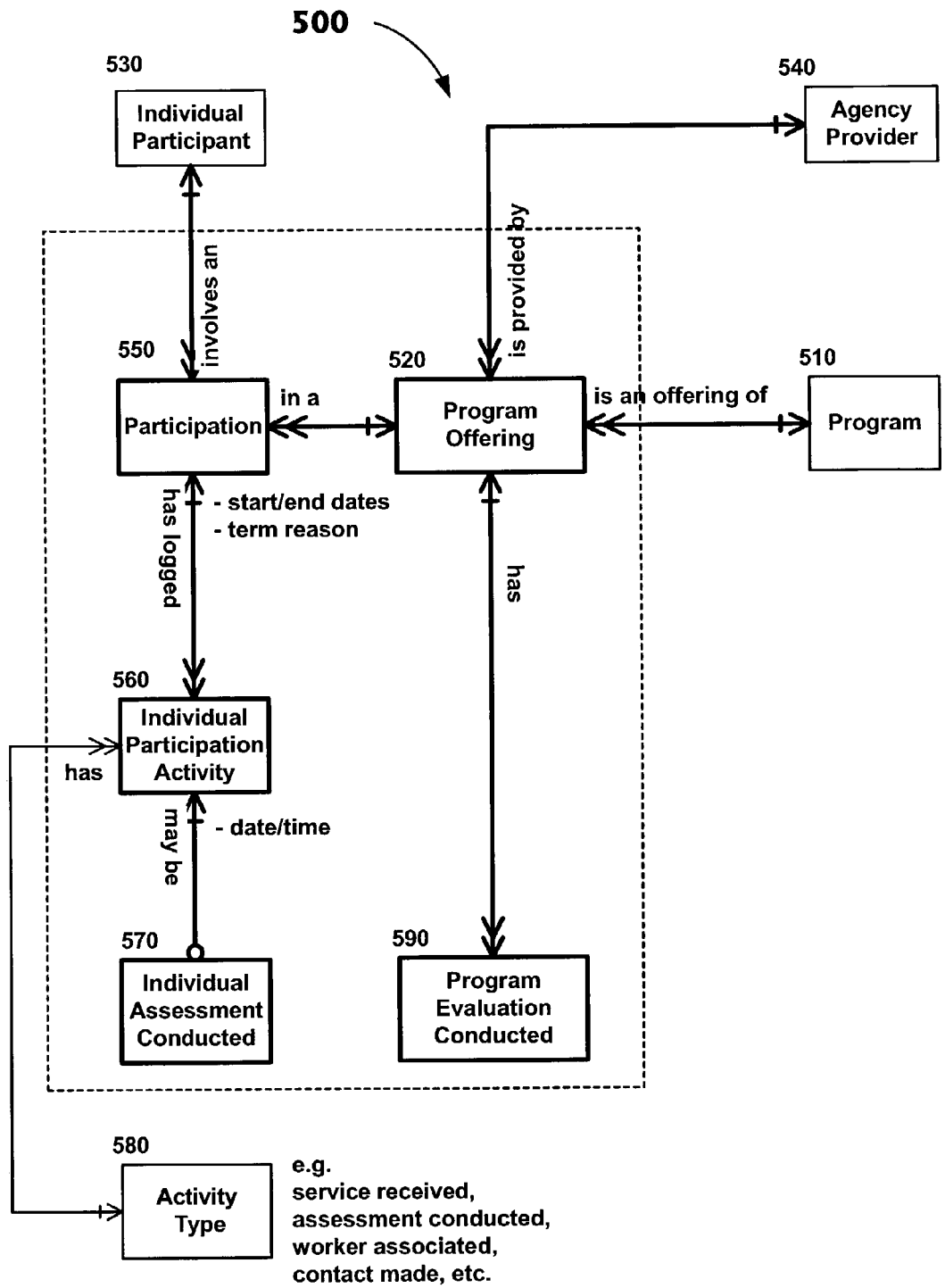
Fig 5 (Data Model) - Program Participation Tracking, Assessment and Evaluation System -- Primary Entities

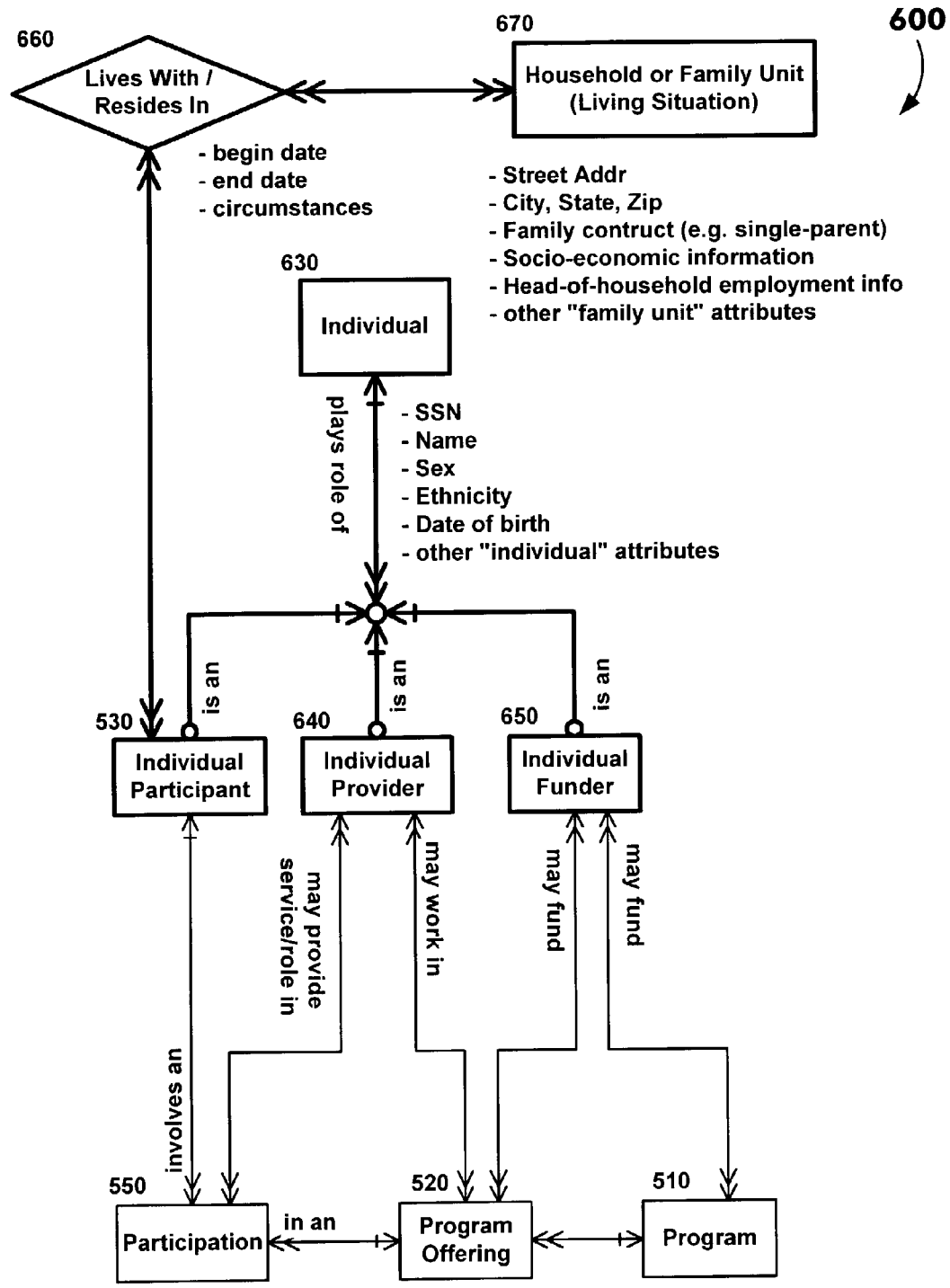
Fig 6 (Data Model) - Individual Participant / Household

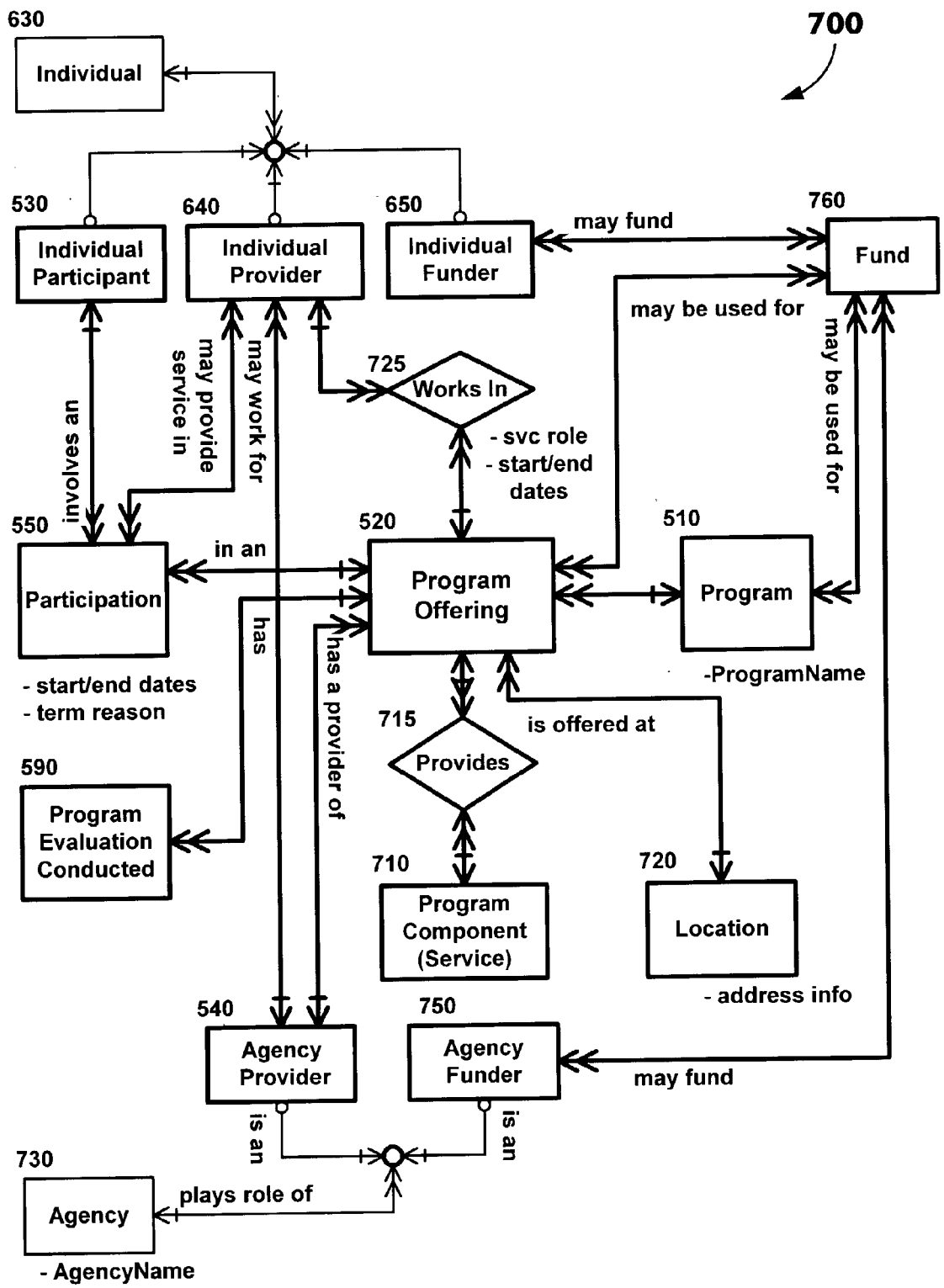
Fig 7 (Data Model) - Program Offering

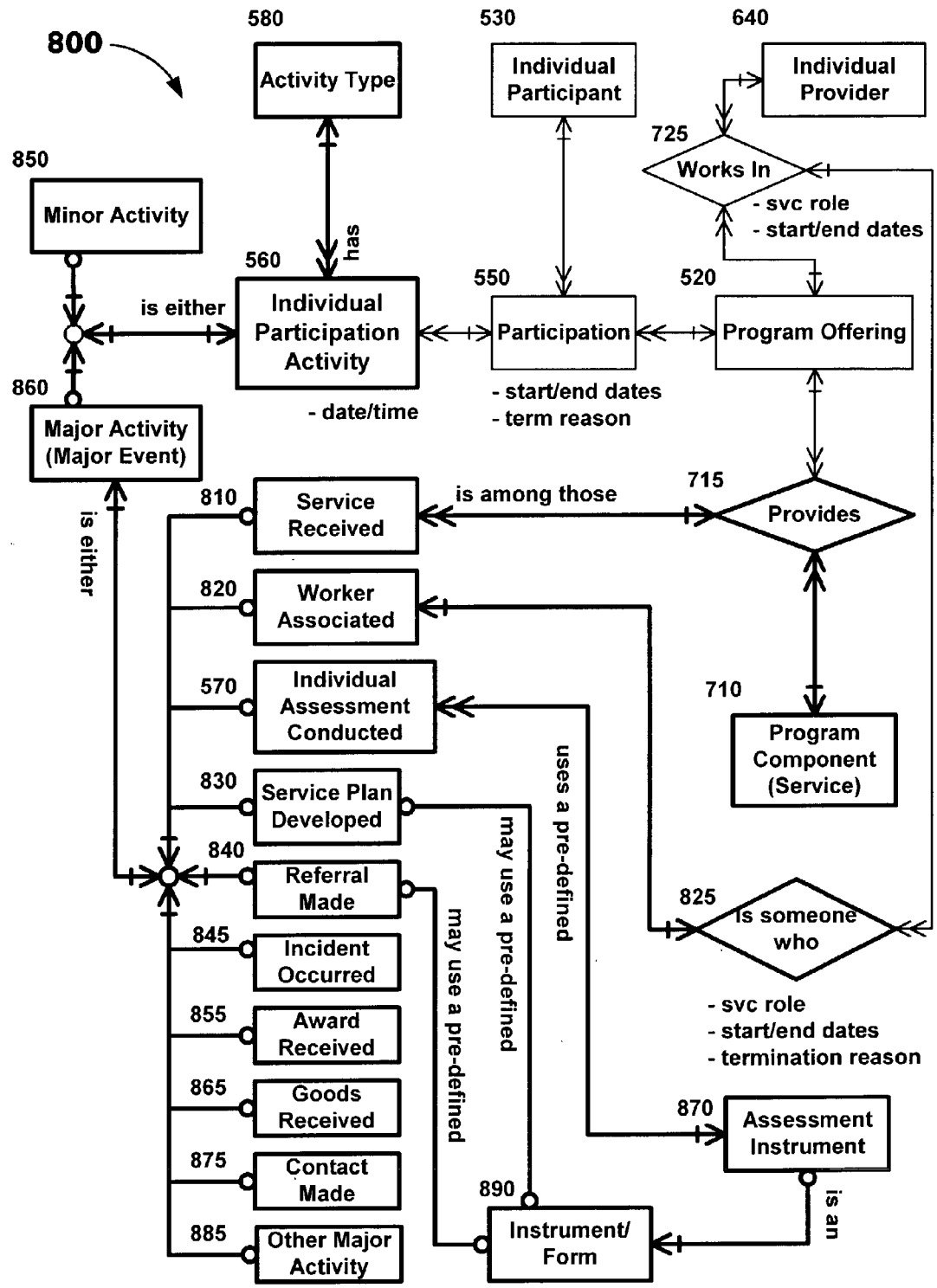
Fig 8 (Data Model) - Individual Participation Activity

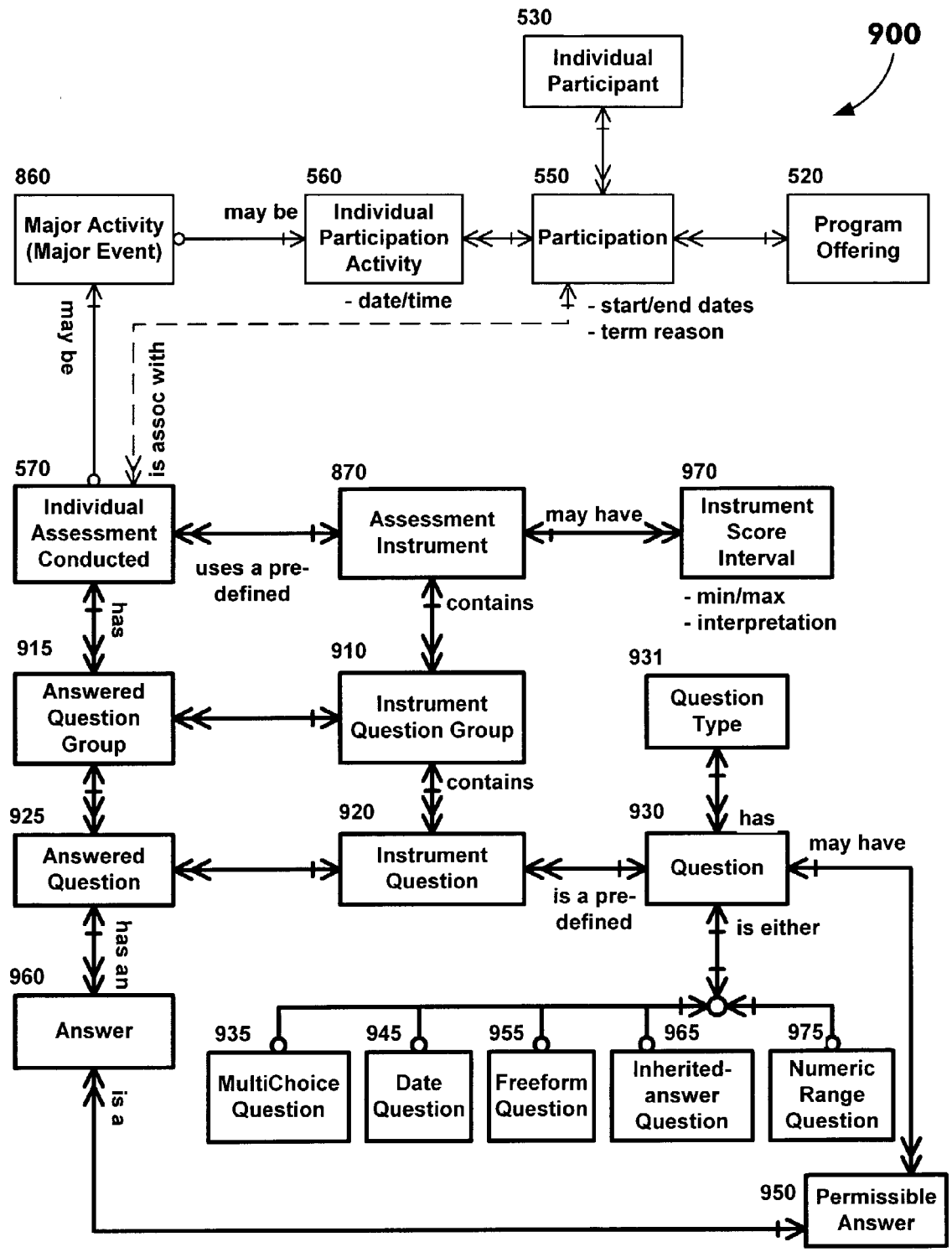
Fig 9 (Data Model) - Individual Assessment Conducted

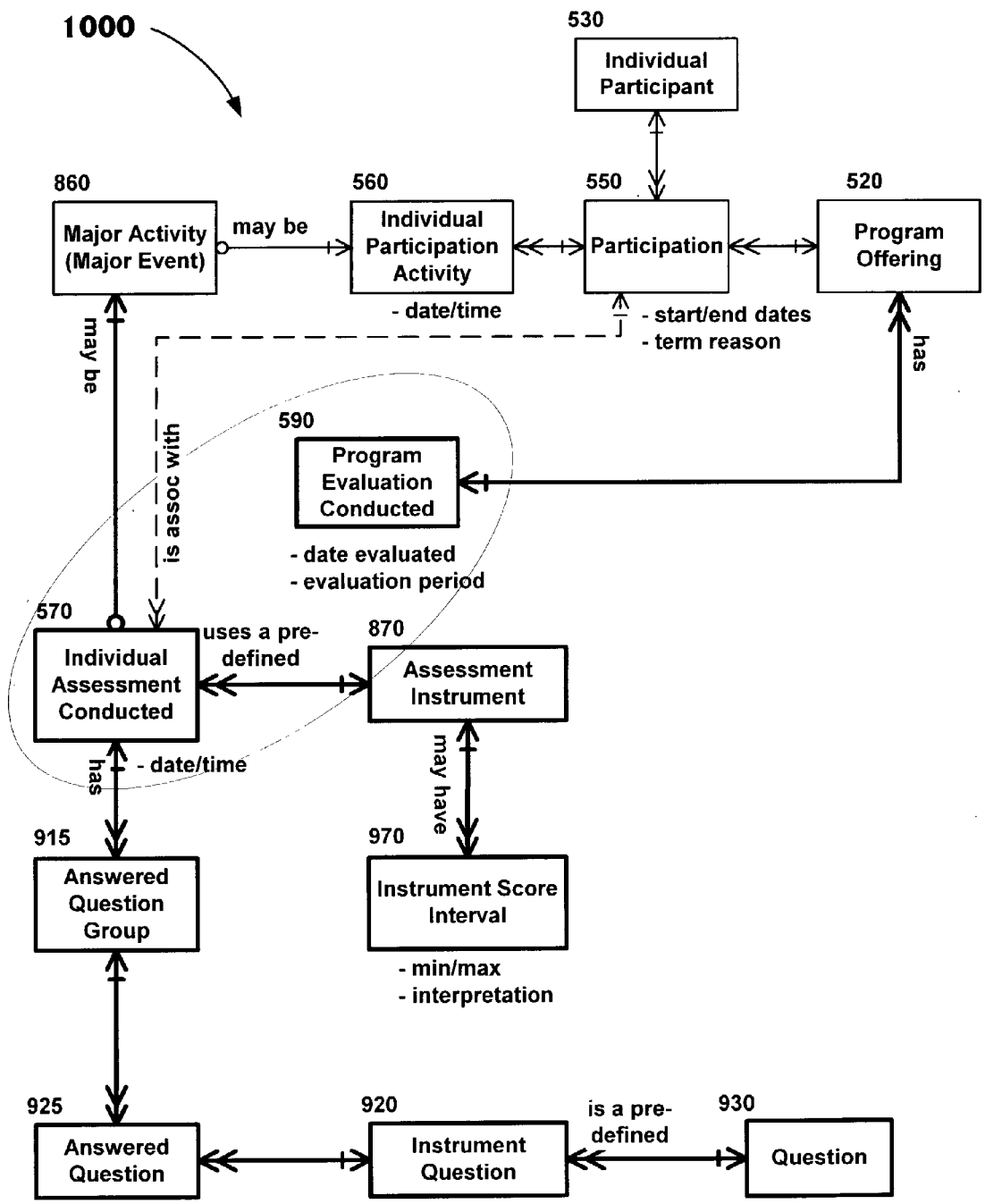
Fig 10 (Data Model) Program Evaluation
Using Individual Assessments and Participation Activity

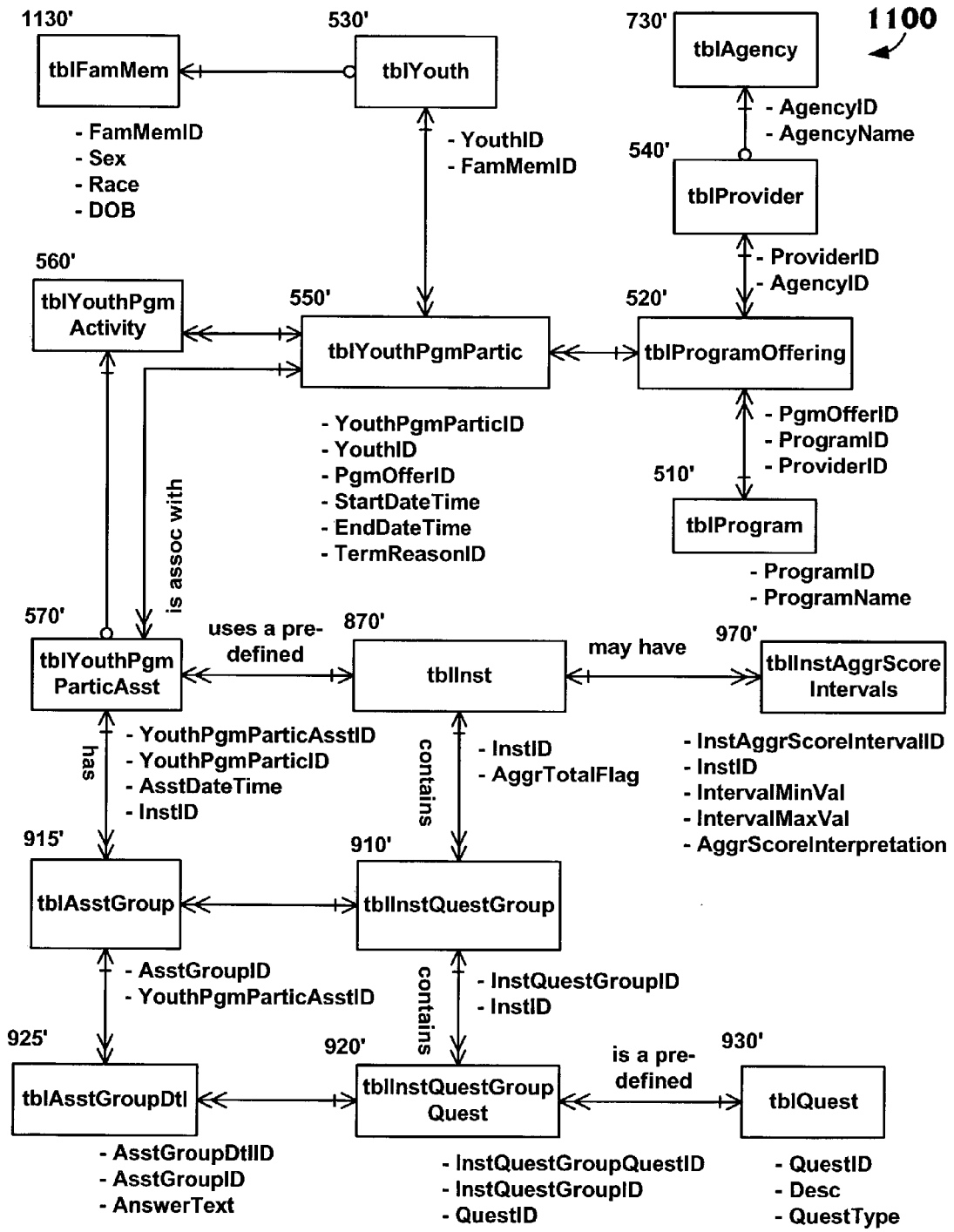
Fig 11(Data Model) Program Evaluation Using Individual Assessments and Program Activity -- Specific YOUTH Implementation

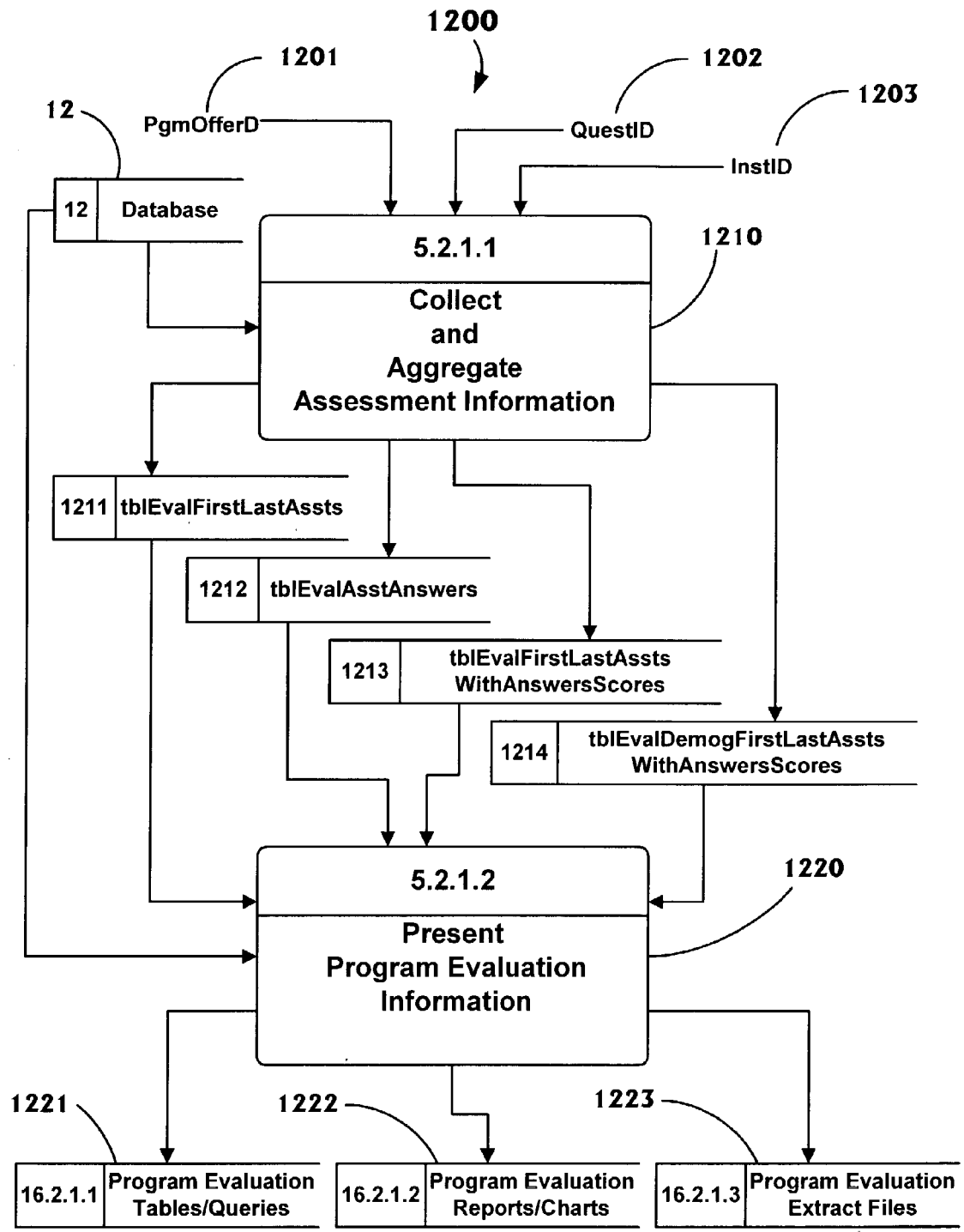
Fig 12 (Data Flow Diagram) - "Diagram 5.2.1" -- for Process 410

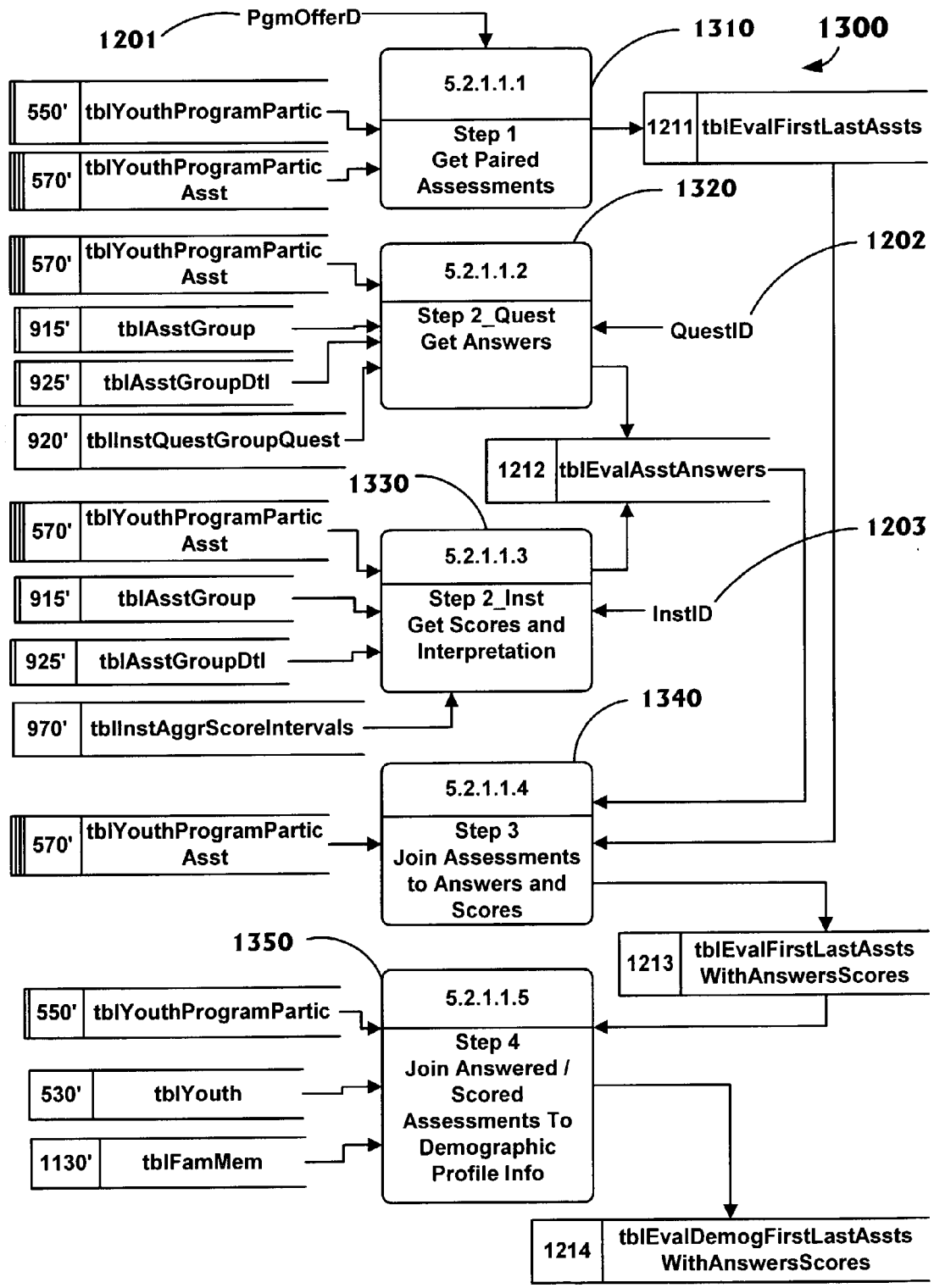
Fig 13 (Data Flow Diagram) -- "Diagram 5.2.1.1" -- for Process 1210

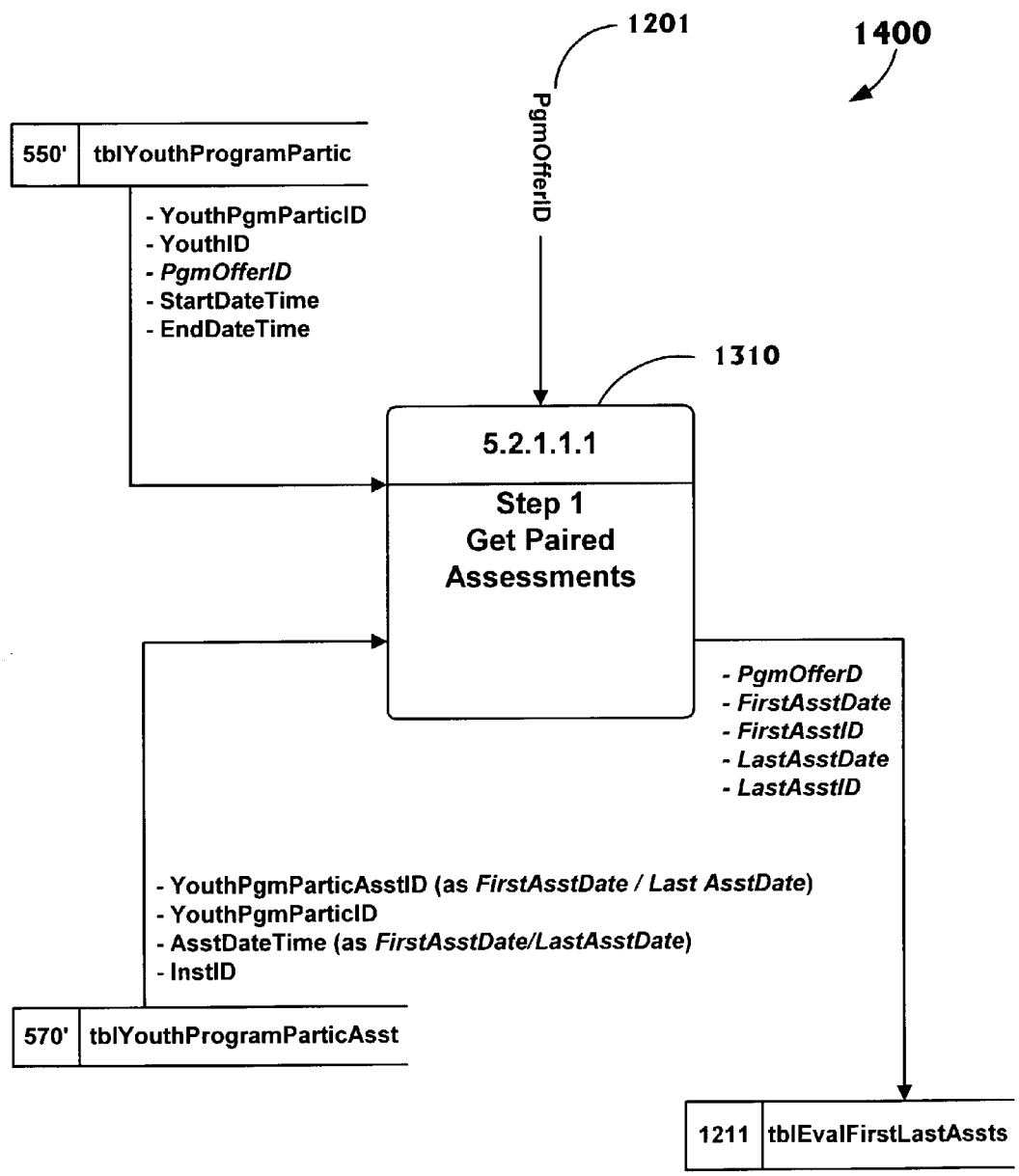
Fig 14 (Data Flow Diagram) -- "Diagram 5.2.1.1.1" (Step 1) -- for Process 1310

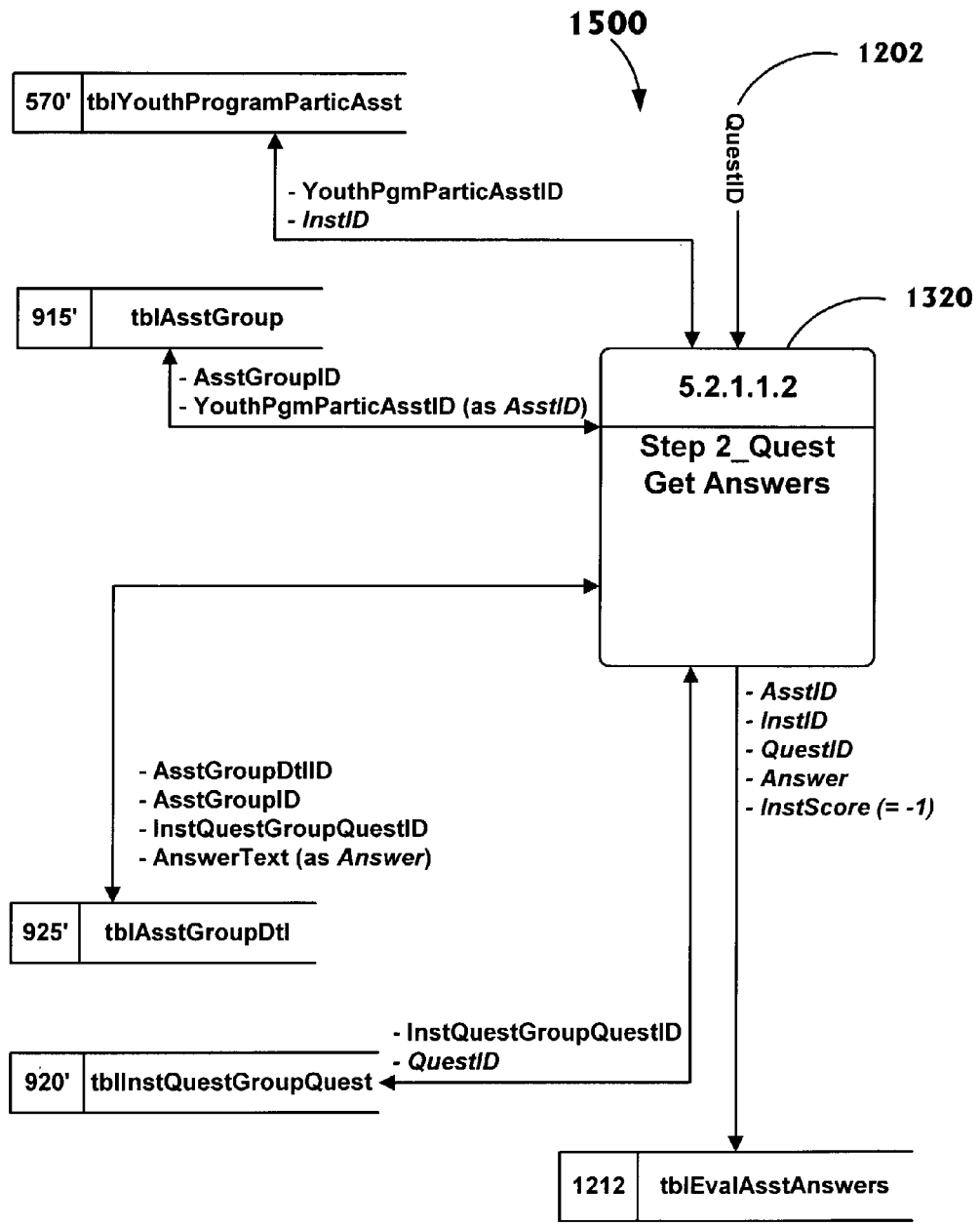
Fig 15 (Data Flow Diagram) -- "Diagram 5.2.1.1.2" (Step 2_Quest) -- for Process 1320

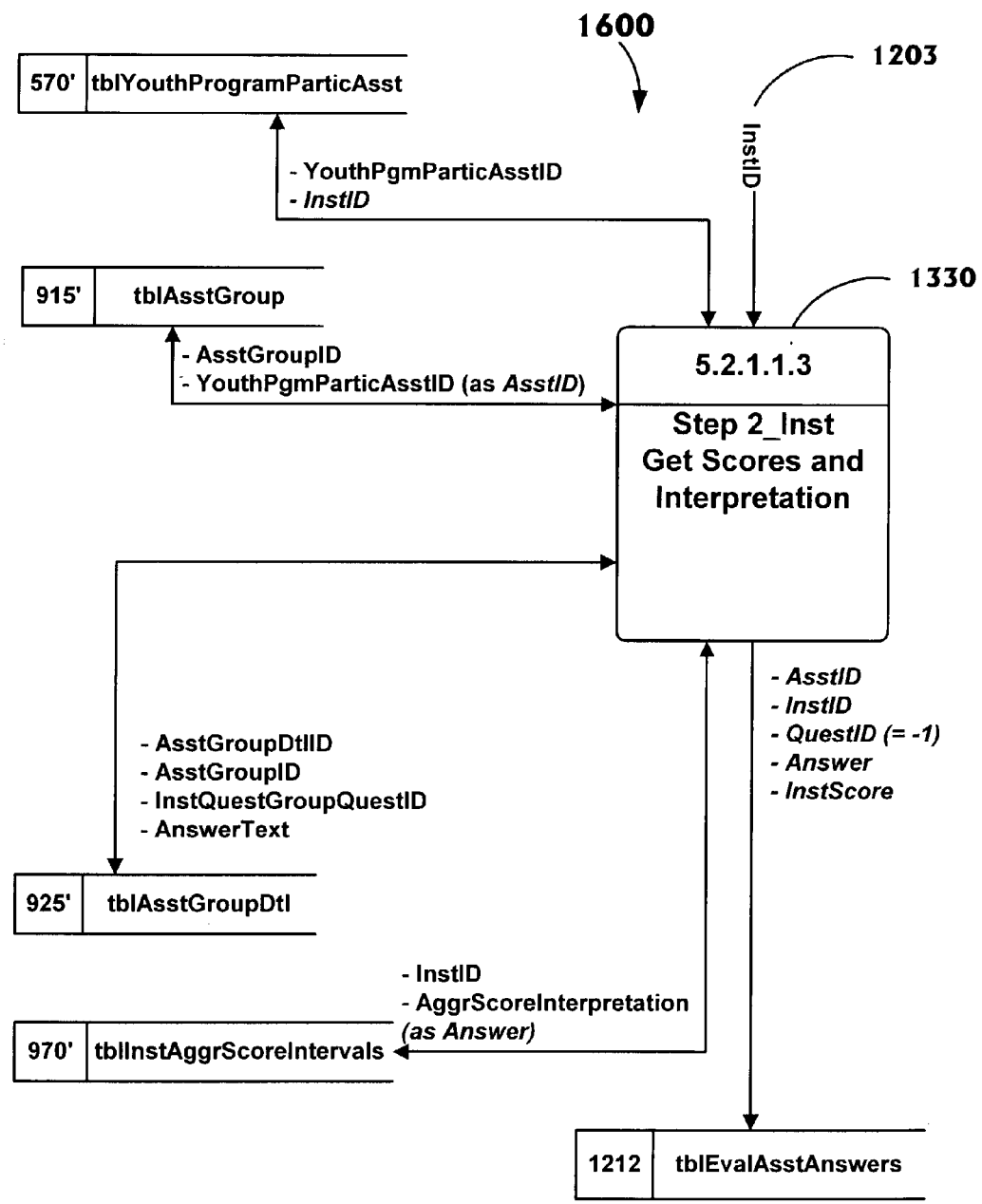
Fig 16 (Data Flow Diagram) -- "Diagram 5.2.1.1.3" (Step 2_Inst) -- for Process 1330

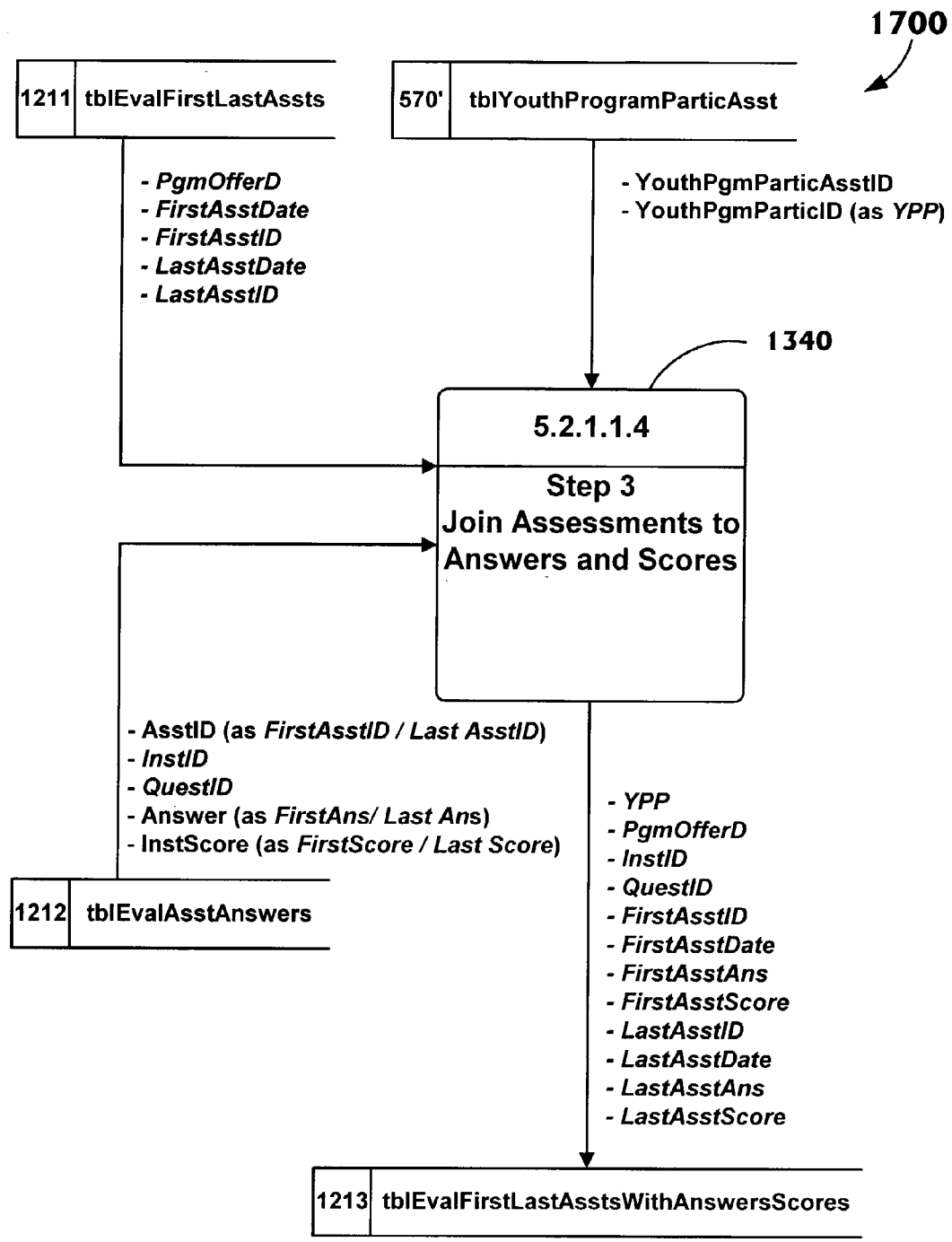
Fig 17 (Data Flow Diagram) -- "Diagram 5.2.1.1.4" (Step 3) -- for Process 1340

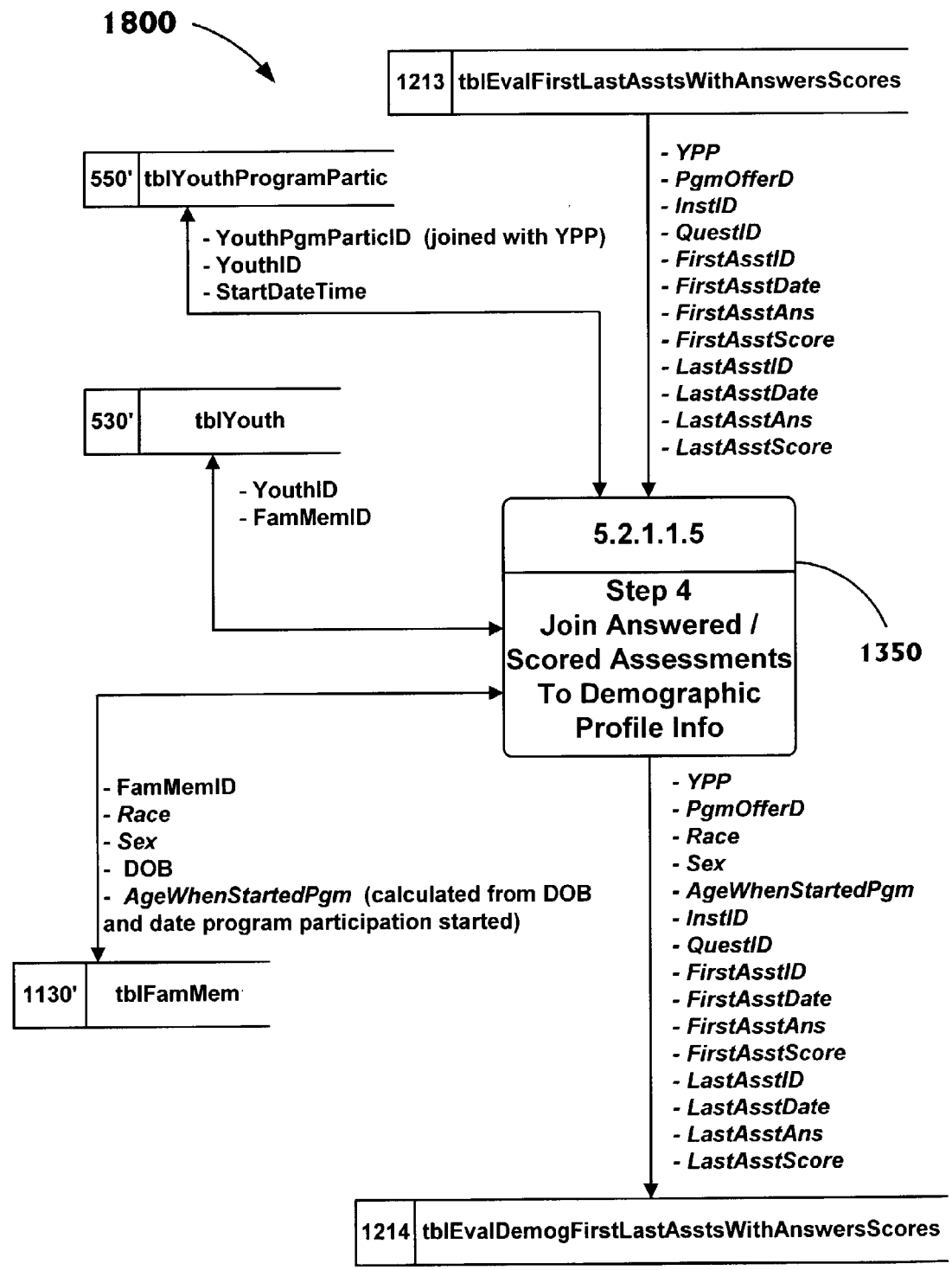
Fig 18 (Data Flow Diagram) -- "Diagram 5.2.1.1.5" (Step 4) -- for Process 1350

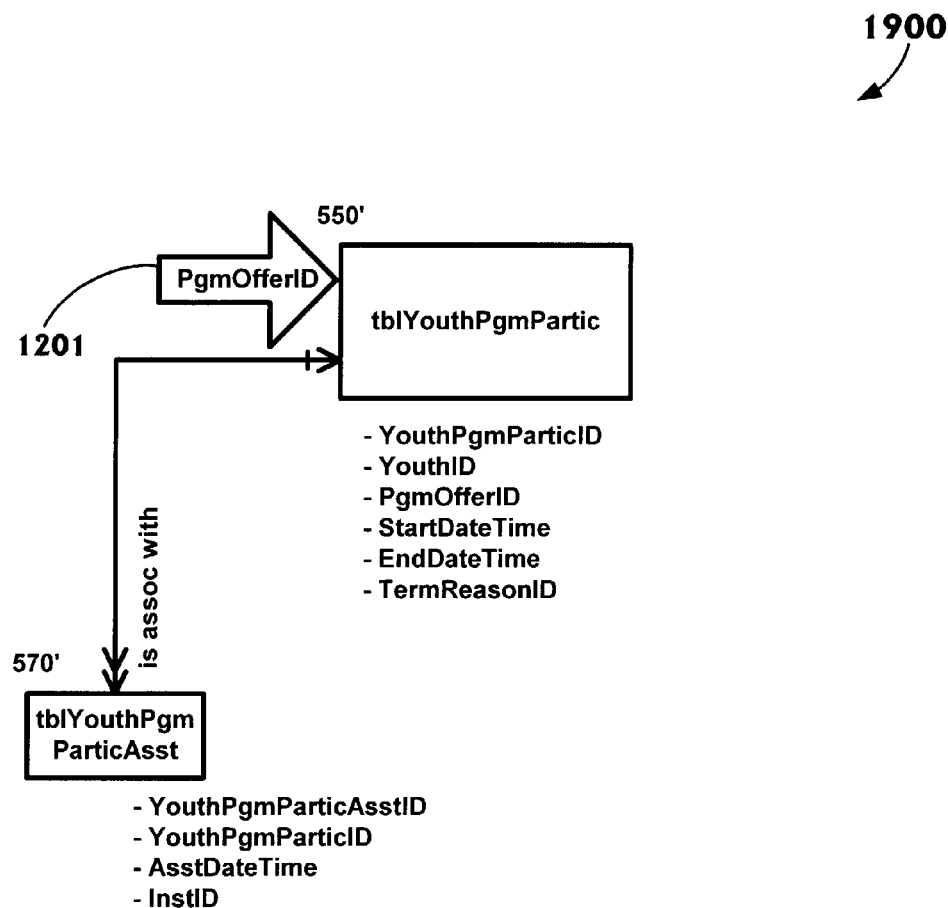
Fig 19 (Data Model) Database / Program Evaluation Through Assessments --
Step 1 Navigational Path

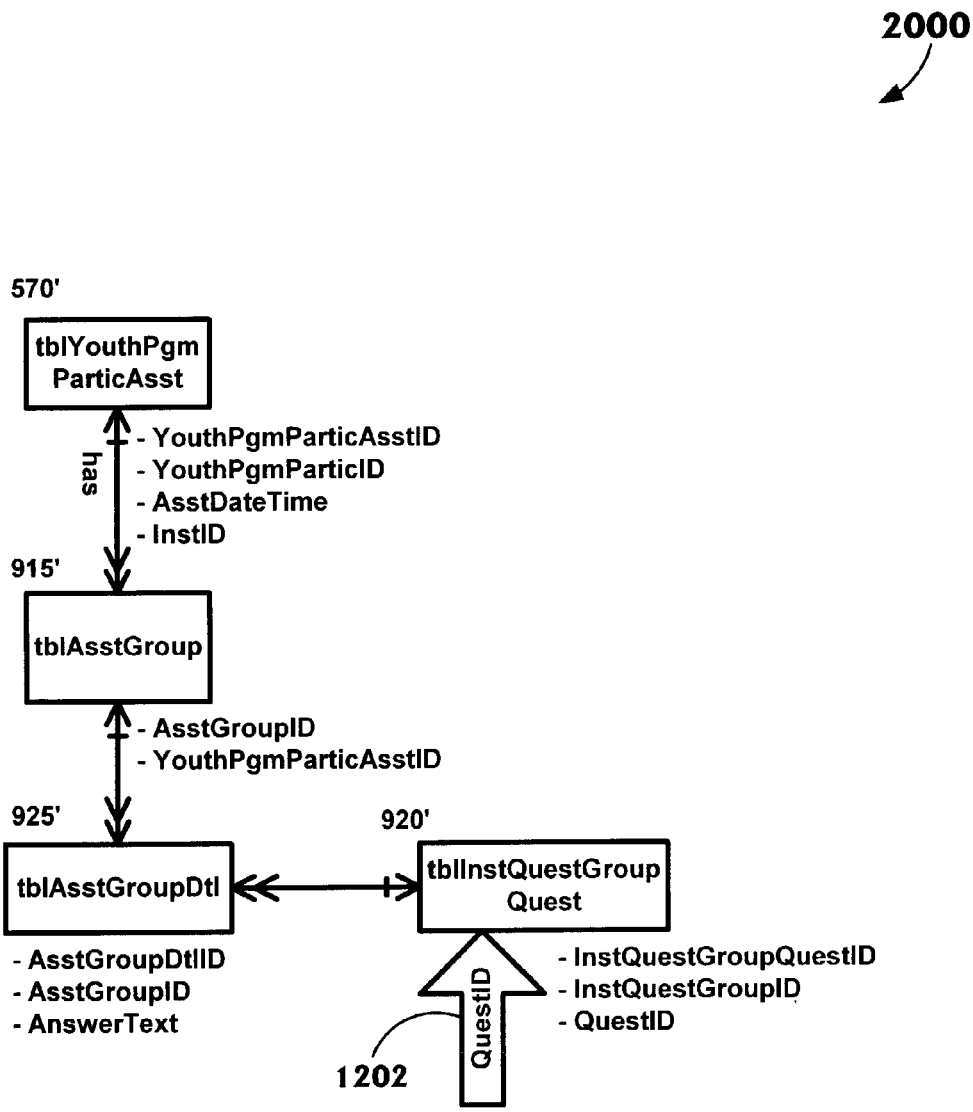
Fig 20 (Data Model) Database / Program Evaluation Through Assessments --
Step 2_Quest Navigational Path

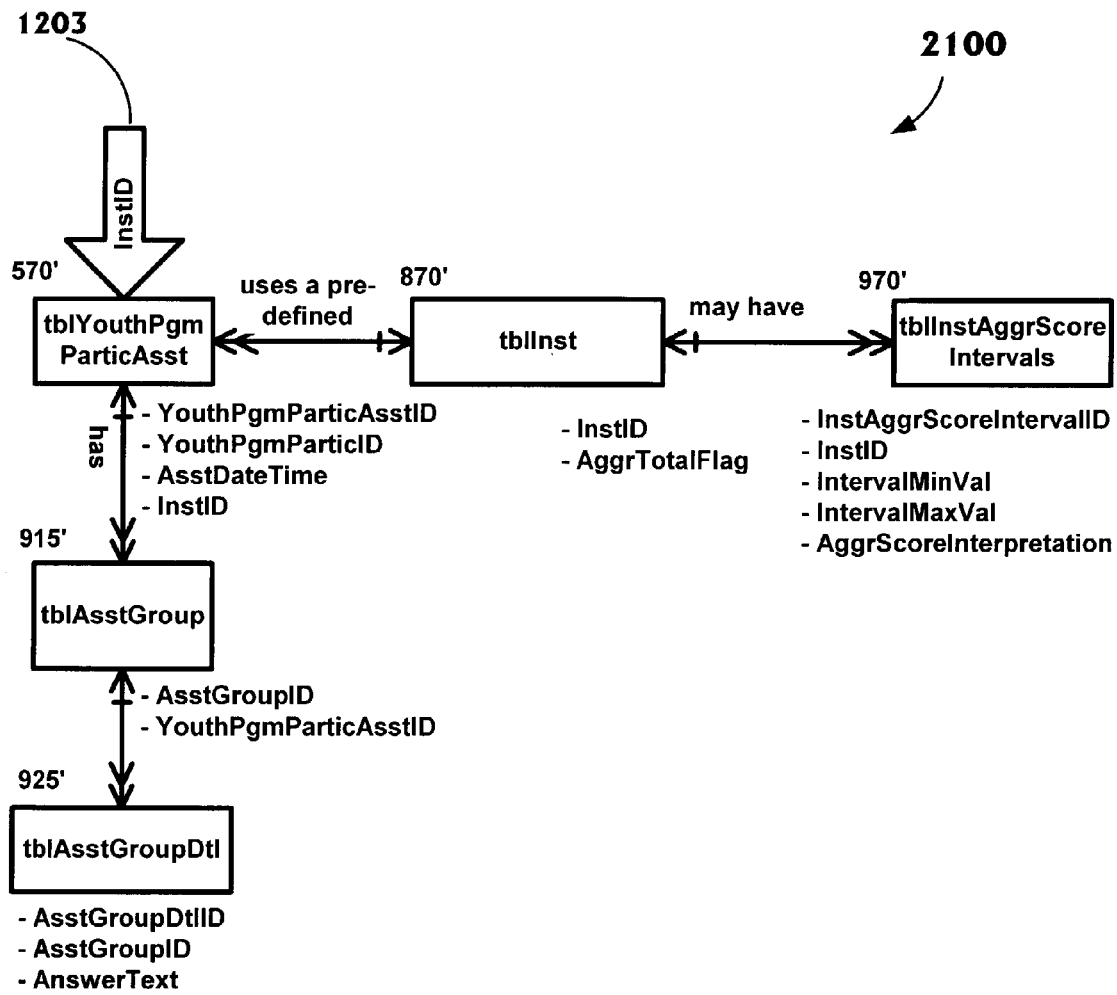
Fig 21 (Data Model) Database / Program Evaluation Through Assessments --
Step 2_Inst Navigational Path

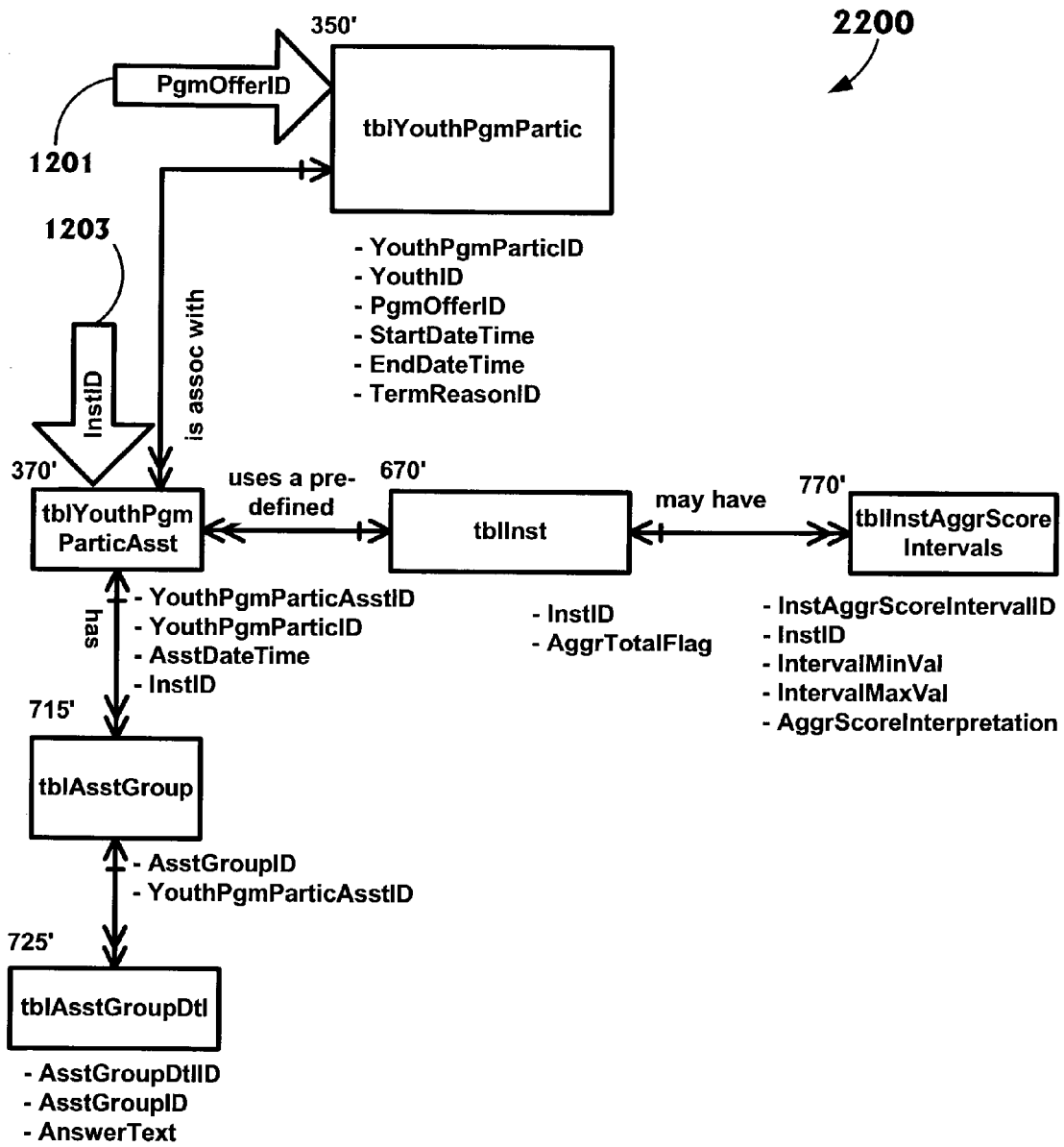
Fig 22 (Data Model) Database / Program Evaluation Through Assessments --
Step 3_Inst Navigational Path

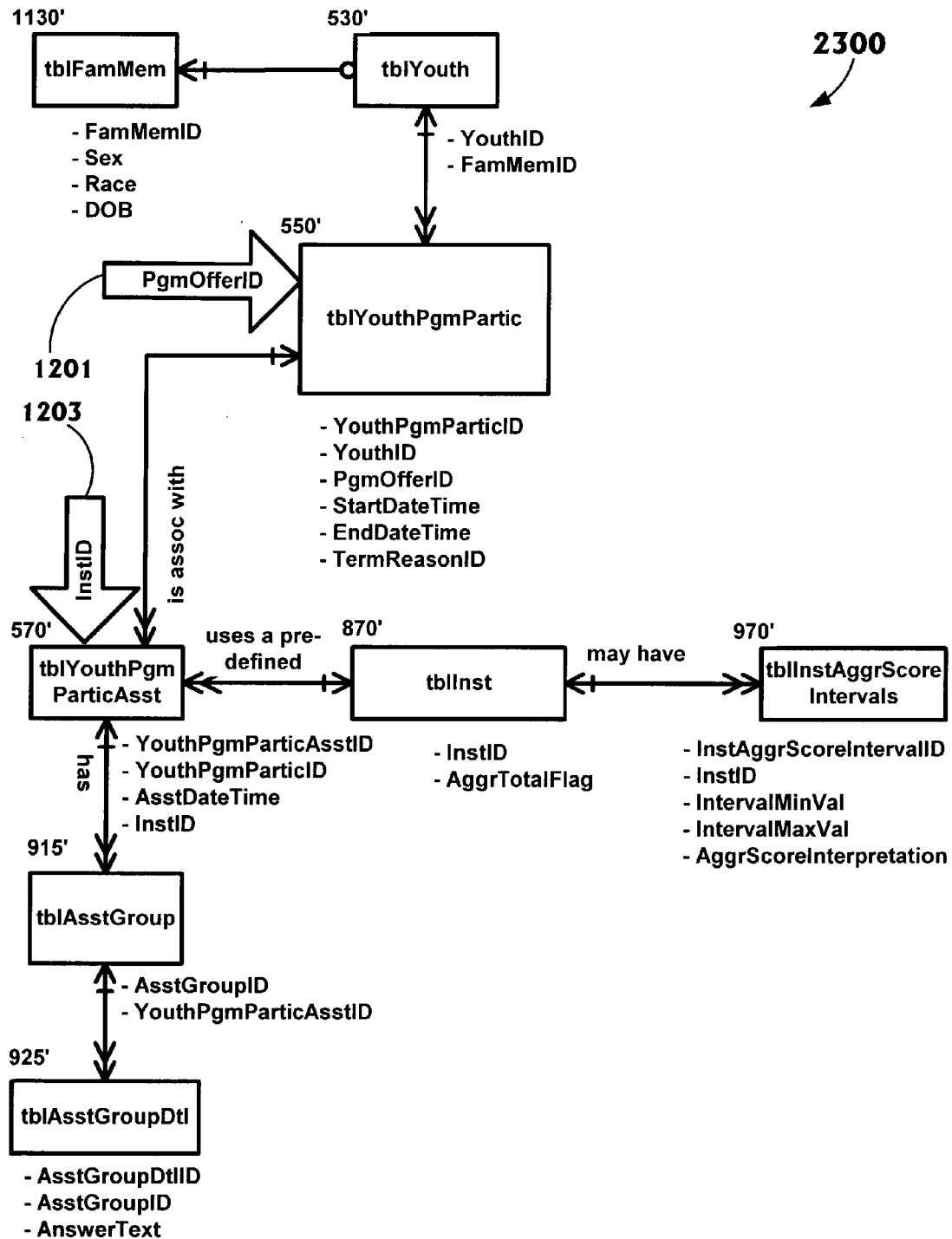
Fig 23 (Data Model) Database / Program Evaluation Through Assessments --
Step 4_Inst Navigational Path

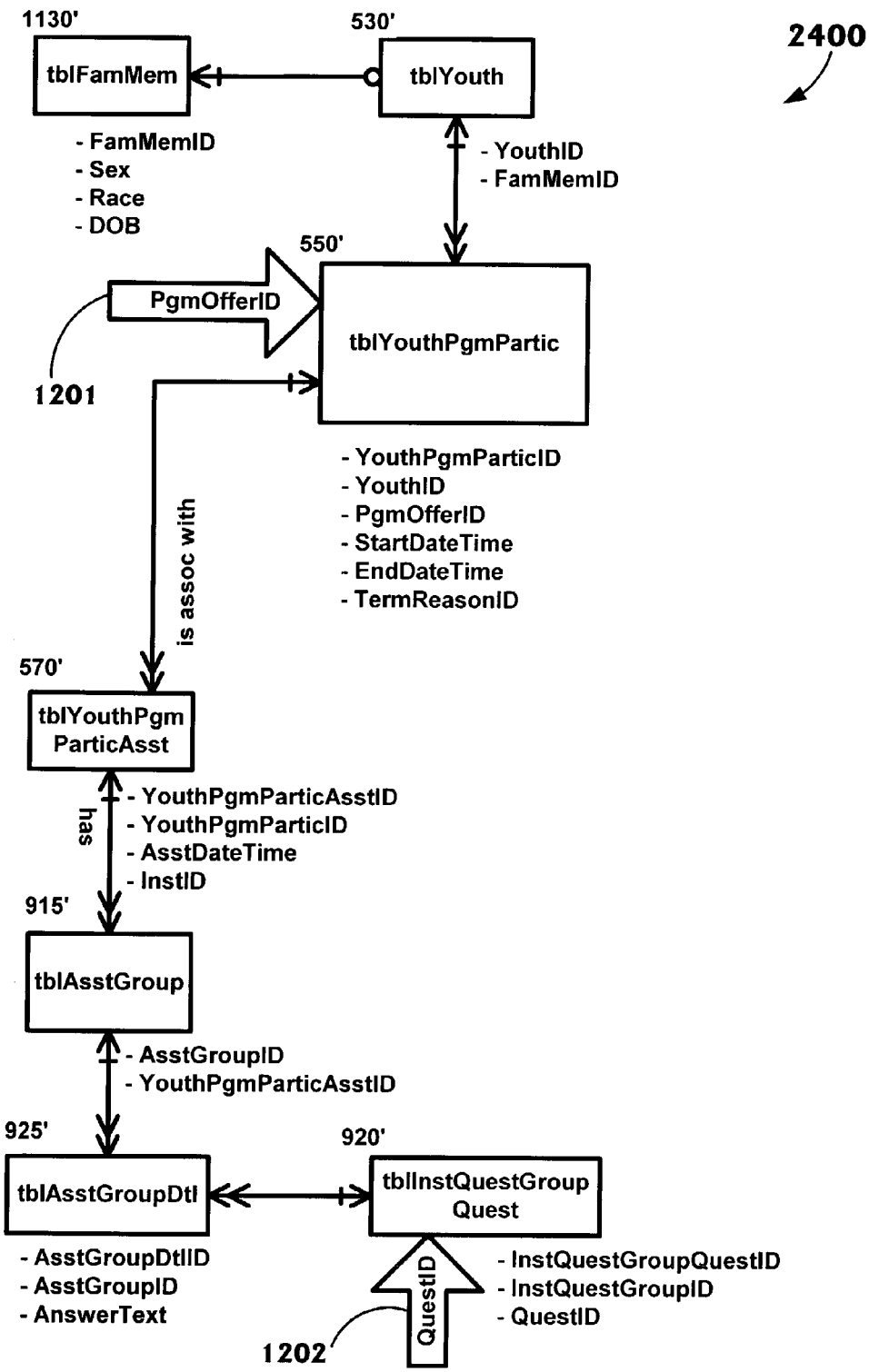
Fig 24 (Data Model) Database / Program Evaluation Through Assessments --
Step 4_Quest Navigational Path

2500

Answer List Maintenance

| Answer Code | Answer Description |
|---|---|
| Y | Yes |
| N | No |
| Satis | Satisfactory |
| Unsat | Unsatisfactory |
| N/A | Not Applicable |
| Poor | Poor |
| Pos | Positive |
| Neg | Negative |
| K | Kindergarten |

[ Add ]  [ Edit ]  [ Delete ]

Fig 25 - Screen "Answer List Maintenance"

Question Maintenance — 2600

| Question | Question Type |
|---|---|
| Current School Attendance Status (<10 Satisfactory) | Multiple Choice Answers in Answer List |
| History of PsychEval Assess - Date | Date(MMYYYY format) |
| History of PsychEval Assess - Diagnosis | Multiple Choice Answers in Table |
| History of PsychEval Assess -Treatment? | Multiple Choice Answers in Answer List |
| History of PsychEval Assess - Date Treatment Complete | Date(MMYYYY format) |
| History of Abnormal Behavior | Freeform - Text 50 Characters |
| - | |
| - | |
| - | |
| LOSI - Peer Relations | Range (answer must lie within boundaries) |
| LOSI - Substance Abuse | Range (answer must lie within boundaries) |
| LOSI - Leisure/Recreation | Range (answer must lie within boundaries) |
| - | |
| - | |

[ Add ]  [ Edit ]  [ Delete ]

Fig 26 - Screen "Question Maintenance"

2700

Question / Answer Maintenance

| | | 2701 | 2702 |
|---|---|---|---|

*Question* | New Question

*Question Type* | Multiple Choice Answers in Answer List ▼

Date (MMDDYYYY format)
Date (MMYYYY format)
Date (YYYY format) — 2704
Freeform - Text 50 characters
Multiple Choice Answers in Answer List — 2705
Multiple Choice Answers in Table
Multiple Choice Weighted Answers in Answer List
Range (answer must lie within range boundaries)

2706

*Question Answer Prompt*

2703

Fig 27 - Screen "Question / Answer Maintenance - Select Question Type"

Question / Answer Maintenance — 2800, 2704

| | |
|---|---|
| Question | Current School Attendance Status (< 10 Satisfactory) |
| Question Type | Multiple Choice Answers in Answer List ▼ |
| Question Answer Prompt | Satisfactory/Unsatisfactory/Not Applicable (i.e. not in school) |
| Multiple Choice | [x]   Weighted [ ]   Save |

Answer List

| Seq | Answer Description | | Default | Weight |
|---|---|---|---|---|
| 1 | Satisfactory | ▼ | [ ] | 0 |
| 2 | Unsatisfactory | ▼ | [ ] | 0 |
| ▶ 3 | Not Applicable | ▼ | [ ] | 0 |
| | | ▼ | [ ] | |

[ Add ]   [ Edit ]   [ Delete ]   — 2801

Fig 28a - Screen "Question / Answer Maintenance - Multiple Choice Answers in Answer List"

Question / Answer Maintenance — 2820, 2825

| | |
|---|---|
| *Question* | History of Psych Eval Assessments - Diagnosis |
| *Question Type* | Multiple Choice Answers in Table ▼ |
| *Question Answer Prompt* | DSM-IV code |
| *Multiple Choice* | [x] |
| *Select Code Table* | DSM-IV Diagnosis Codes ▼ |

[Save]

2822

Fig 28b - Screen "Question / Answer Maintenance - Multiple Choice Answers in Table"

2830

| Question / Answer Maintenance | 2706 |
|---|---|

Question: LOSI Attitudes/Orientation

Question Type: Range (answer must lie within boundaries) ▼

Question Answer Prompt: From 0 to 5 (Low=0; Moderate=1 to 2; High=3 to 5)

From [ 0 ]  To [ 5 ]       [ Save ]

2833    2834

Fig 28c - Screen "Question / Answer Maintenance - Range"

Instrument Maintenance 2900
2901

Select Instrument: Test Instrument ▼

Type of Instrument: Family Info ▼

Instrument Name: Test Instrument

Add Instrument

Aggregate Score? ☐ 2902

| Grp Seq # | Question Group Description | Multi-Part ? | Multi-Response? |
|---|---|---|---|
| 9 | Current Phones | ☐ | ☐ |
| 10 | Current School Attendance Status (less than 10 is | ☐ | ☐ |
| 11 | Current Living Situation/Residence | ☐ | ☐ |
| 12 | School Enrollment | ☑ | ☐ |
| 13 | Current Friends' Age | ☐ | ☐ |
| ▶ 29 | History of Psych Eval Assessments | ☑ | ☑ |

2911 Add Instrument-Question Group 2912  Delete Instrument-Question Group 2913

2910

| Grp# | Seq# | Question Description | Question Type |
|---|---|---|---|
| 29 | 1 | History-Pysch Eval Date ▼ | Date(MMYYYY format) |
| ▶ 29 | 2 | History-Pysch Eval Diagnosis ▼ | Multiple Choice Answeres in Table |
| 29 | 3 | History-Pysch Eval Treatment? ▼ | Multiple Choice Answers in Answer List |
| 29 | 4 | History-Pysch Eval Date Treatm ▼ | Date (MMYYY format) |

Show Answers   Add Instrument Question   Delete Instrument Question

Delete Instrument   2922   2923   2920

Fig 29a- Screen "Instrument Maintenance - Non-Aggregate Score Type - Multiple-Part Question Group"

2950

Instrument Maintenance

Select Instrument: Test Instrument ▼

Type of Instrument: Family Info ▼

Add Instrument

Instrument Name: Test Instrument    Aggregrate Score? ☐

| Grp Seq # | Question Group Description | Multi-Part ? | Multi-Response? |
|---|---|---|---|
| 9 | Current Phones | ☐ | ☐ |
| ▶ 10 | Current School Attendance Status (less than 10 is | ☐ | ☐ |
| 11 | Current Living Situation/Residence | ☐ | ☐ |
| 12 | School Enrollment | ☑ | ☐ |
| 13 | Current Friends' Age | ☐ | ☐ |
| 29 | History of Psych Eval Assessments | ☑ | ☑ |

2931   Add Instrument-Question Group    Delete Instrument-Question Group

2930

| Grp# | Seq# | Question Description | Question Type |
|---|---|---|---|
| ▶ 10 | 1 | Current School Attendance Stat ▼ | Date(MMYYYY format) |
| | | | |
| | | | |
| | | | |

Show Answers    Add Instrument Question    Delete Instrument Question

Delete Instrument    2940

Fig 29b- Screen "Instrument Maintenance - Non-Aggregate Score Type - Single-Part Question Group"

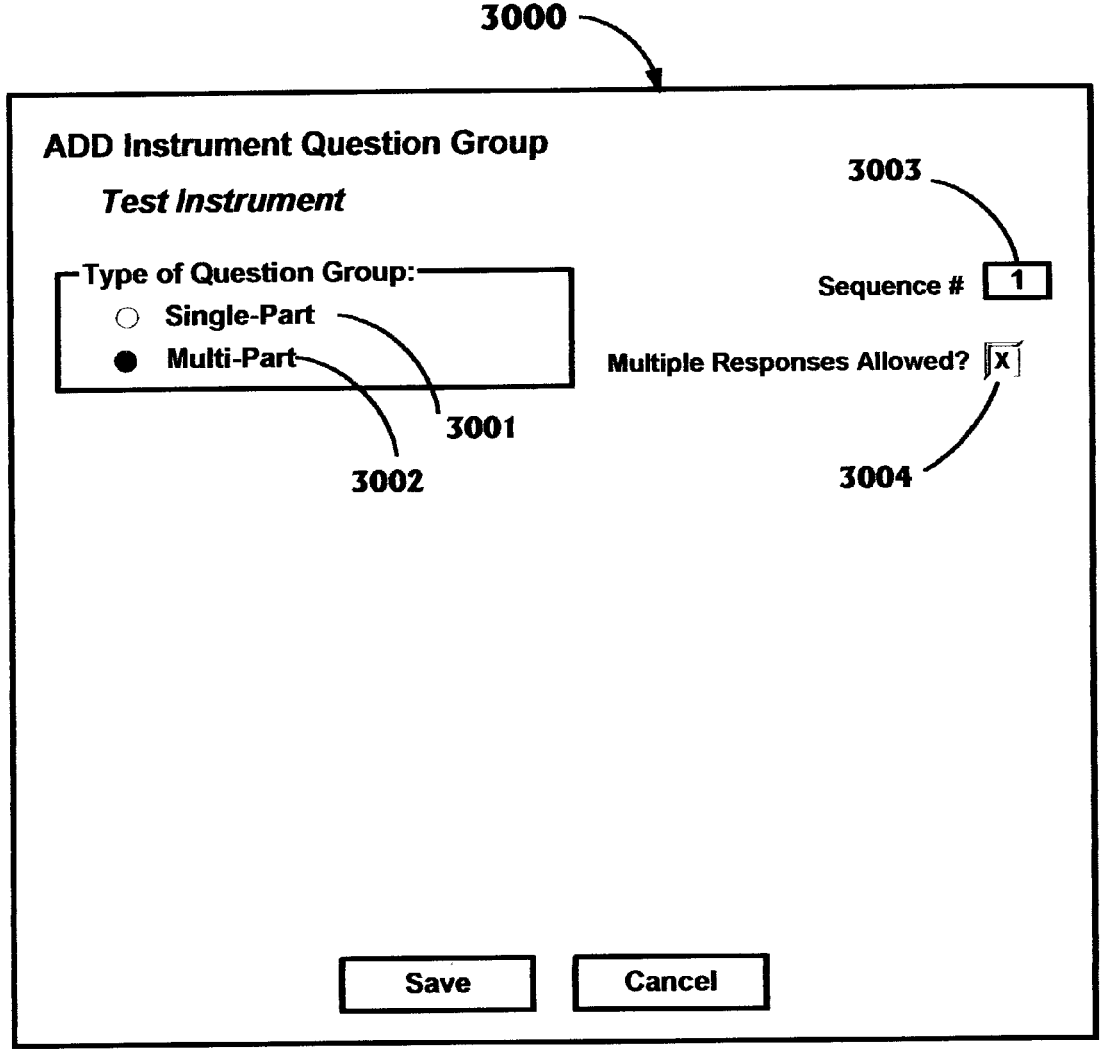
Fig 30a - Screen "Add Instrument Question Group - Select Question Group Type"

3020

ADD Instrument Question Group

*Test Instrument*

Type of Question Group:
- ○ Single-Part
- ● Multi-Part

Sequence # [ 1 ]

Multiple Responses Allowed? [X]

3006

3005

Description of Multi-Part Question Group | School Enrollment Info

| Seq # | Questions |
|---|---|
| 1 | Currently Enrolled in School |
| 2 | Current Enrolled Name of School |
| 3 | |
| 4 | |
| 5 | |
| 6 | |

Add    Delete

3008

Save    Cancel

Fig 30b - Screen "Add Instrument Question Group - Multi-Part Question Group"

3040

ADD Instrument Question

Question Group: *History of Psych Eval Assessments*

Question Sequence # within Group　[ 3 ]

Select Question

[ History of Psych Eval Assessments - Treatment?　▼ ]

[ Save ]　[ Cancel ]

Fig 30c - Screen "Add Instrument Question - Select Question"

Instrument Maintenance

3100

Select Instrument: LOSI Assessment of Risks and Needs ▼

Type of Instrument: Needs Assessment ▼

Instrument Name: LOSI Assessment of Risks and Needs  Aggregate Score? ☑  [Score Intervals]

[Add Instrument]

| Grp Seq # | Question Group Description | Multi-Part ? | Multi-Response? |
|---|---|---|---|
| 1 | LOSI Prior and Current Offenses, Adjudications | ☐ | ☐ |
| 2 | LOSI Family Circumstances and Parenting | ☐ 3102 | ☐ |
| 3 | LOSI Education / Employment | ☐ | ☐ |
| 4 | LOSI Peer Relations | ☐ 3105 | ☐ |
| ▶ 5 | LOSI Substance Abuse | ☐ | ☐ |
| 6 | LOSI Leisure / Recreation | ☐ | ☐ |

[Add Instrument-Question Group]  [Delete Instrument-Question Group]

| Grp# | Seq# | Question Description | Question Type |
|---|---|---|---|
| ▶ 5 | 1 | LOSI Substance Abuse | Range(answer must lie within range) |

[Show Answers]  [Add Instrument Question]  [Delete Instrument Question]

[Delete Instrument]

Fig 31a - Screen "Instrument Maintenance - Aggregate-Score Type"

3110

Aggregate Score Intervals for Selected Instrument

Instrument: *LOSI Assessment of Risks and Needs*

| | Minimum Value | Maximum Value | Score Interpretation Text |
|---|---|---|---|
| | 0 | 8 | Low Risk |
| | 9 | 22 | Moderate Risk |
| | 23 | 34 | High Risk |
| ▶ | 35 | 42 | Very High Risk |

3111　　3112　　　　　　3115

[ OK ]　[ Add ]　[ Cancel ]

Fig 31b - Screen "Aggregate Score Intervals for Selected Instrument"

Fig 32 - Screen "Youth Maintenance"

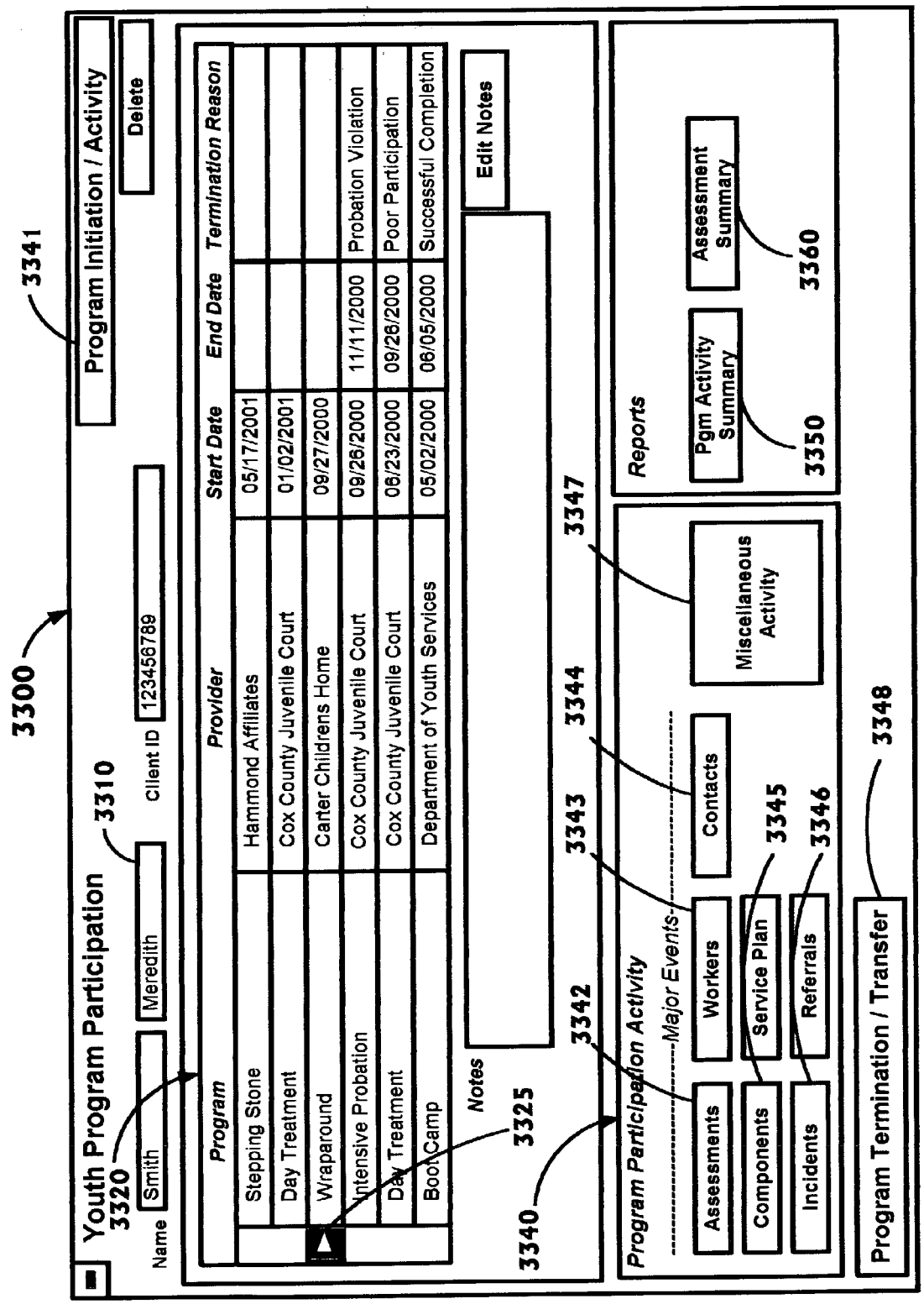
Fig 33a - Screen "Youth Program Participation"

Youth Program Participation Summary

SMITH, MEREDITH  234-56-7890  Address: 2345 East Main Salt Lake City, Utah

3380

| Start Date | End Date | Termination Reason | Program | Provider |
|---|---|---|---|---|
| 05/17/2001 | | | Stepping Stone | Hammond Afilliates |
| 01/02/2001 | | | Day Treatment | Cox County Juvenile Court |
| 09/27/2000 | | | Wraparound | Carter Children's Home |
| 09/26/2000 | 11/11/2000 | Probation Violation | Intensive Probation | Cox County Juvenile Court |
| 06/23/2000 | 09/26/2000 | Poor Participation | Day Treatment | Cox County Juvenile Court |
| 05/02/2000 | 06/05/2000 | Successful Completion | Boot Camp | Dept of Youth Services |
| | | | | |

Fig 33b

New Program Activity

Name: Smith  Meredith   Client ID: 123456789

- Select Program Offering: Dream Catchers
- Program Provider: Center for Families and Children
- New Activity Type: PARTICIPATION BEGAN
- Initial Supervisor: Roberts
- Date of Activity: 05/23/2001

Activity Summary

| Date Logged | Description | Event Date | Other | Activity Notes |
|---|---|---|---|---|
| 04/03/01 | was recommended for | | | |
| 04/08/01 | referral form was prepared for | | | |
| 05/02/01 | acceptance granted for immediate service | | | |

Delete Activity    OK

Fig 34a - Screen "Begin Participation via New program Activity Screen"

Youth Program Participation
3450

Name [Smith] [Meredith]    Client ID [123456789]    Program Initiation / Activity   [Delete]

3470

| Program | Provider | Start Date | End Date | Termination Reason |
|---|---|---|---|---|
| ▲ Dream Catchers | Center for Families and Children | 05/23/2001 | | |
| Stepping Stone | Hammond Affiliates | 05/17/2001 | | |
| Day Treatment | Cox County Juvenile Court | 01/02/2001 | | |
| Wraparound | Carter Childrens Home | 09/27/2000 | | |
| Intensive Probation | Cox County Juvenile Court | 09/26/2000 | 11/11/2000 | Probation Violation |
| Day Treatment | Cox County Juvenile Court | 08/23/2000 | 09/26/2000 | Poor Participation |

Notes
3460

[Edit Notes]

Program Participation Activity
------Major Events------

[Assessments]  [Workers]   [Contacts]   [Miscellaneous Activity]
[Components]   [Service Plan]
[Incidents]    [Referrals]

[Program Termination / Transfer]

Reports
[Pgm Activity Summary]   [Assessment Summary]

Fig 34b - Screen "Youth Program Participation - After Program Initiation"

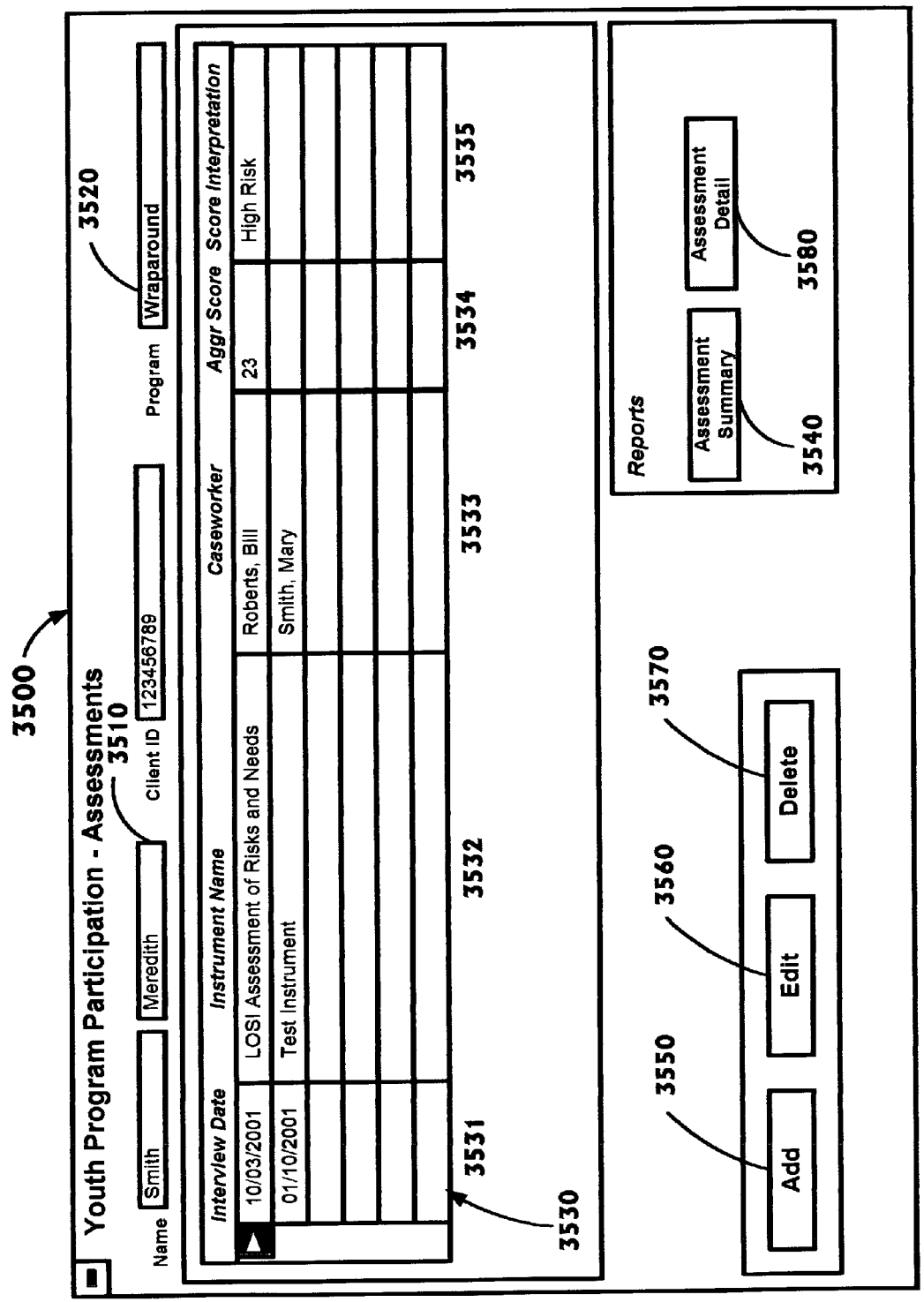
Fig 35a - Screen "Youth Program Participation - Assessments"

3545

Youth Program Participation - Assessment Summary

SMITH, MEREDITH      234-56-7890      Address: 2345 East Main
Salt Lake City, Utah

| Date | Assessment Instrument | Aggr Score | | Worker |
|---|---|---|---|---|
| 10/03/2001 | LOSI Assessment of Risks and Needs | 23 | High Risk | Roberts, Bill |
| 01/10/2001 | Test Instrument | | N/A | Roberts, Bill |

Fig 35b

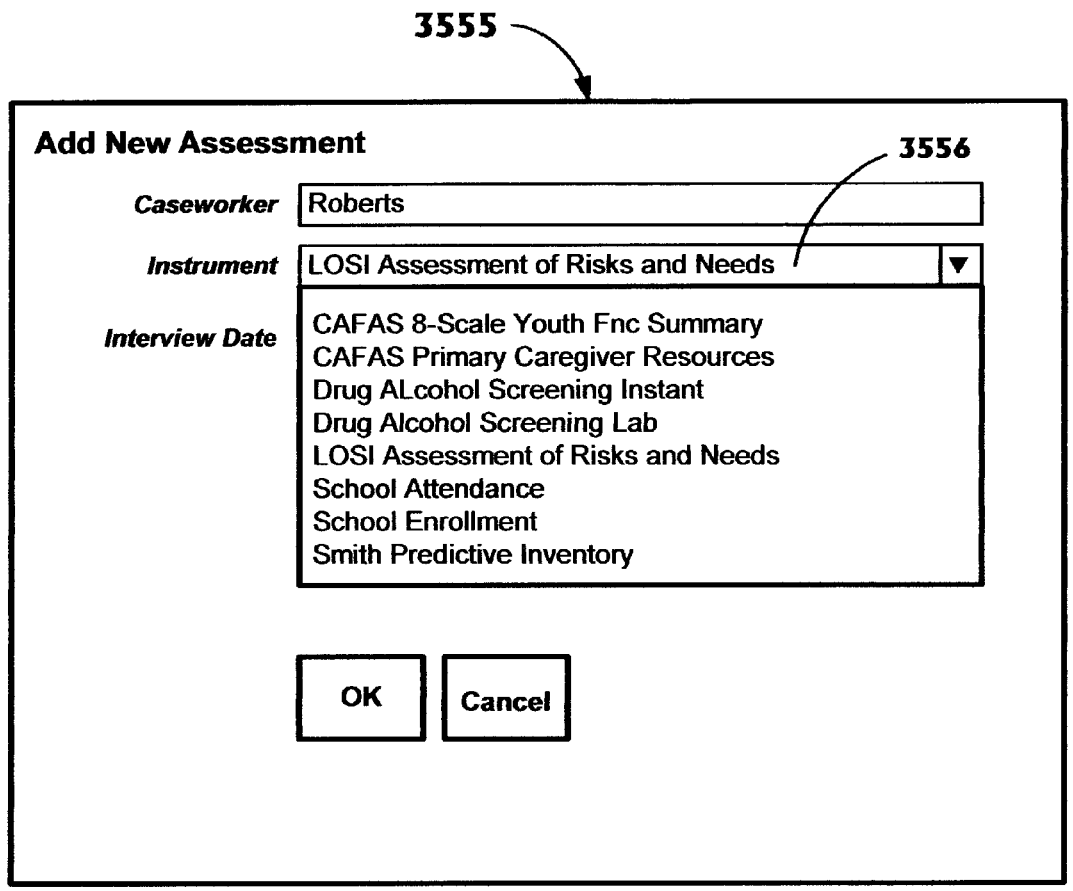
Fig 35c - Screen "Add New Assessment - Select Assessment Instrument"

3585 ↘

*Youth Program Participation - Assessment Detail*

---
SMITH, MEREDITH    234-56-7890              Address: 2345 East Main
                                                     Salt Lake City, Utah LOSI Assessment of Risks and Needs         10/03/2001

---

Aggregate Score : 23    Score Interpretation: High

|  | Question | Answer |
|---|---|---|
| #1 | LOSI Prior and Current Offenses, Adjudications | 2 |
| #2 | LOSI Family Circumstances and Parenting | 3 |
| #3 | LOSI Education / Employment | 5 |
| #4 | LOSI Peer Relations | 4 |
| #5 | LOSI Substance Abuse | 0 |
| #6 | LOSI Leisure / Recreation | 2 |
| #7 | LOSI Personality and Behavior | 3 |
| #8 | LOSI Attitudes / Orientation | 4 |

Conduct Assessment Interview

Assessment Instrument: Test Instrument
Date: 04/15/2001
Youth: SMITH, MEREDITH
Caseworker: Lovegren, Victoria

| Seq # | Question Group Description | Multi-Response? |
|---|---|---|
| 11 | Current Living Situation/Residence | ☐ |
| 12 | School Enrollment | ☐ |
| 13 | Current Friends' Age | ☐ |
| ▶ 29 | History of Psych Eval Assessments | ☑ |

3611    3614

3612 — Add Answer
3613 — Delete Answer

| Seq# | Questions |
|---|---|
| 1 | History of Pysch Eval Assessments-Date |
| ▶ 2 | History of Pysch Eval Assessments-Diagnoisis |
| 3 | History of Pysch Eval Assessments-Treatment? |
| 4 | History of Pysch Eval Assessments- Date Complete |

3621    3620    3610

3622 — Answer / Edit Question

| 1 | 2 | 3 | 4 | 3639 |
|---|---|---|---|---|
| 3631 | 3632 | 3633 | 3634 | |

3630

Fig 36a - Screen "Conduct Assessment Interview - Non-Aggregate-Score Instrument - Multi-Response / Multi-Part - Before Answers"

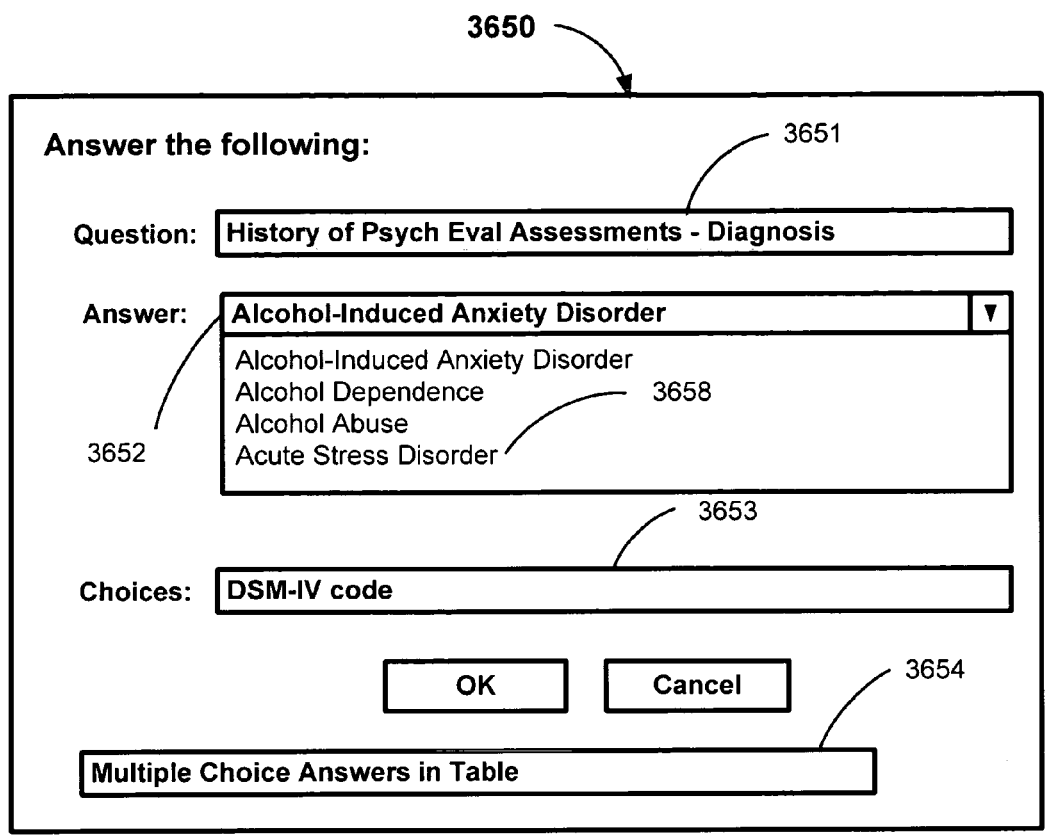
Fig 36b - Screen "Answer Dialog Box - Multi-Choice Table Format"

Conduct Assessment Interview — 3660

Assessment Instrument: Test Instrument
Date: 04/15/2001
Youth: SMITH, MEREDITH
Caseworker: Lovegren, Victoria

| Seq # | Question Group Description | Multi-Response? |
|---|---|---|
| 11 | Current Living Situation/Residence | ☐ |
| 12 | School Enrollment | ☐ |
| 13 | Current Friends' Age | ☐ |
| ▶ 29 | History of Psych Eval Assessments | ☑ |

Add Answer
Delete Answer

| Seq# | Questions |
|---|---|
| ▶ 1 | History of Pysch Eval Assessments-Date |
| 2 | History of Pysch Eval Assessments-Diagnoisis |
| 3 | History of Pysch Eval Assessments-Treatment? |
| 4 | History of Pysch Eval Assessments- Date Complete |

Answer / Edit Question

| 1 | 2 | 3 | 4 |
|---|---|---|---|
| 03/1999 | Acute Stress Di | Yes | 05/1999 |
| 06/1999 | Alcohol Abuse | No | 09/1999 |

3665
3667
3668

Fig 36c - Screen "Conduct Assessment Interview - Non-Aggregate-Score Instrument - Multi-Response / Multi-Part - After Answers"

Conduct Assessment Interview

Assessment Instrument: Test Instrument
Date: 04/15/2001
Youth: SMITH, MEREDITH
Caseworker: Lovegren, Victoria

| Seq # | Question Group Description | Multi-Response? |
|---|---|---|
| 10 | Current School Attendance | ☐ |
| 11 | Current Living Situation/Residence | ☐ |
| 12 | School Enrollment | ☐ |
| 13 | Current Friends' Age | ☐ |
| 29 | History of Psych Eval Assessments | ☑ |

Add Answer
Delete Answer

| Seq# | Questions |
|---|---|
| 1 | Current School Attendance |

Answer / Edit Question

Fig 36d - Screen "Conduct Assessment Interview - Non-Aggregate-Score Instrument - Single-Response / Single-Part - Before Answers"

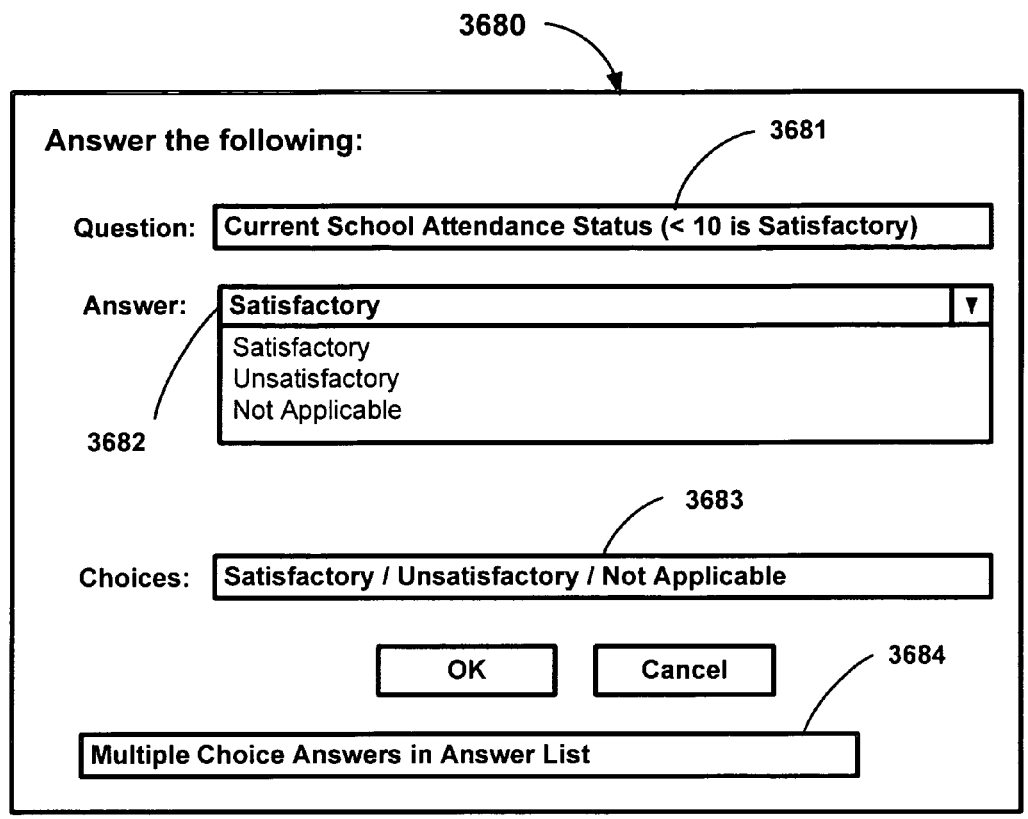
Fig 36e - Screen "Answer Dialog Box - Multi-Choice Answer List Format"

3700

Conduct Assessment Interview

Assessment Instrument: LOSI Assessment of Risks and Needs
Date: 12/12/2001
Youth: TestKid, TestFN
Caseworker: Andrews, Keith

3710

| Seq # | Question Group Description | Multi-Response? |
|---|---|---|
| 5 | LOSI Substance Abuse | ☐ |
| 6 | LOSI Leisure/Recreation | ☐ |
| 7 | LOSI Personality and Behavior | ☐ |
| ▶ 8 | LOSI Attitudes/Orientation | ☑ |
| | 3715 | 3716 |

3711

3712
Add Answer

Delete Answer
3719

3720

| Seq# | Questions | |
|---|---|---|
| ▶ 1 | LOSI Attitudes/Orientation | |
| | 3721    3725 | |

3722
Answer / Edit Question

3730

| | 1 | |
|---|---|---|
| ▶ | 3 | |
| | 3738 | |

Fig 37a - Screen "Conduct Assessment Interview - Aggregate-Score Instrument"

Conduct Assessment Interview — 3740

Assessment Instrument: LOSI Assessment of Risks and Needs
Date: 04/01/2001
Youth: SMITH, MEREDITH
Caseworker: Roberts, Bill

| Seq # | Question | Answer |
|---|---|---|
| 1 | LOSI Prior and Current Offenses, Adjudications | 3 |
| 2 | LOSI Family Circumstances and Parenting | 4 |
| 3 | LOSI Education / Employment | 3 |
| 4 | LOSI Peer Relations | 3 |
| 5 | LOSI Substance Abuse | 3 |
| 6 | LOSI Leisure/ Recreation | 3 |
| 7 | LOSI Personality and Behavior | 3 |
| 8 | LOSI Attitudes/Orientation | 3 |

3741 — 3745 — 3748

Answer / Edit Question — 3742

Fig 37b - Screen "Conduct Assessment Interview - Aggregate-Score Instrument - Alternate Form"

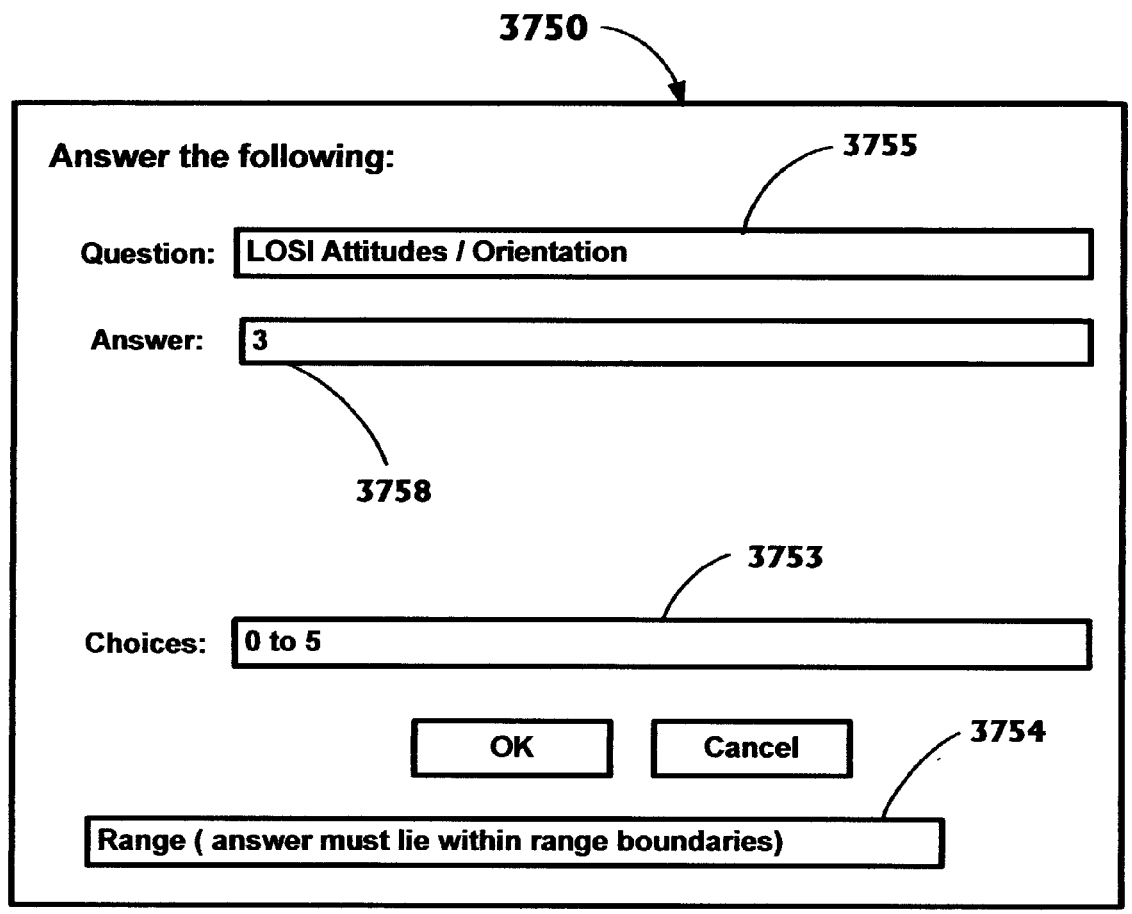
Fig 37c - Screen "Answer Dialog Box - Range Format"

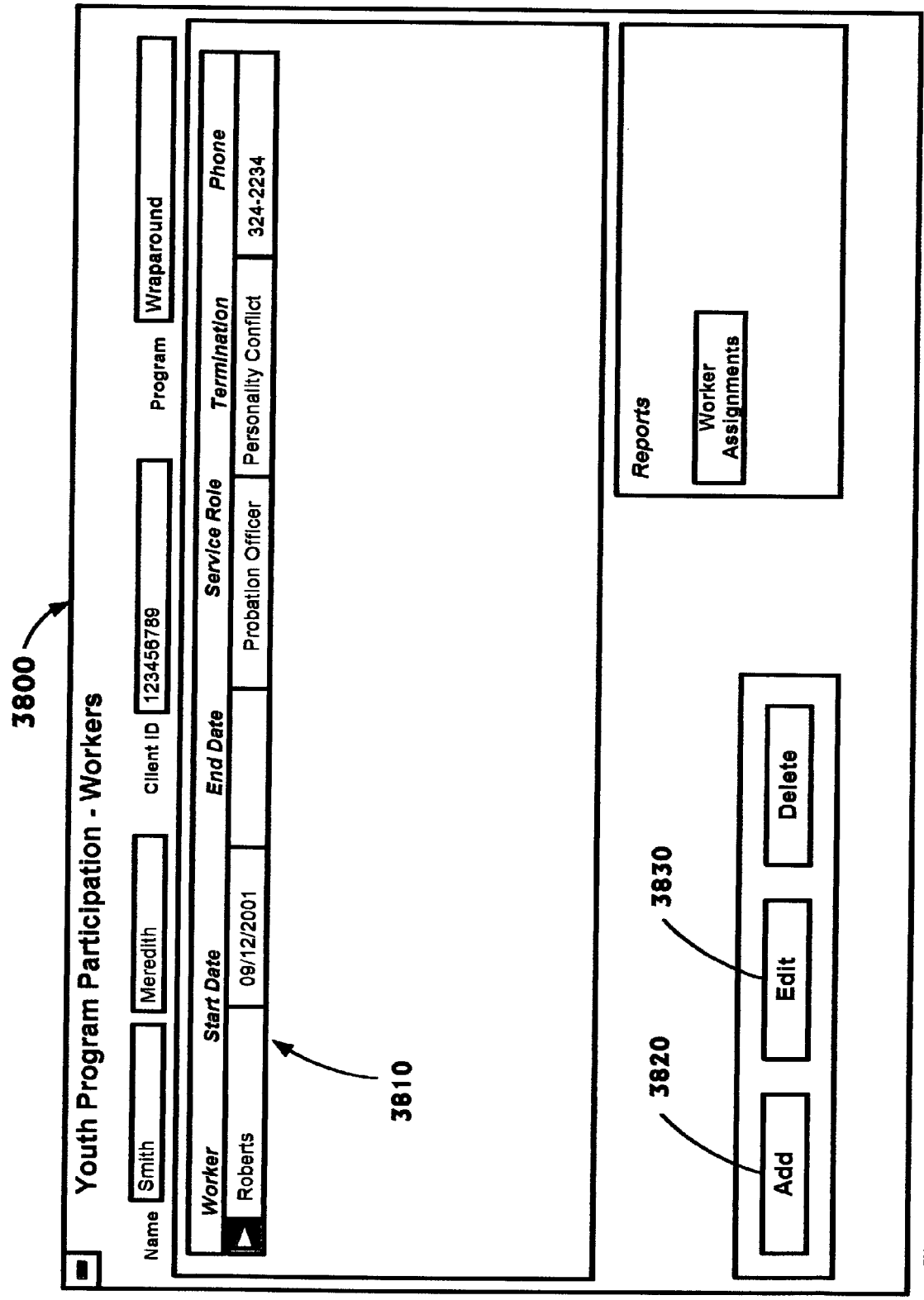
Fig 38a - Screen "Youth Program Participation - Workers (Log Worker Assignment Information - Summary)"

View / Edit - Workers

3850

Name [Smith] [Meredith]  Client ID [123456789]  Program [Wraparound]

| Worker | Start Date | End Date | Service Role | Termination | Phone |
|---|---|---|---|---|---|
| ▲ Roberts | 08/12/2001 | | Probation Officer | Personality Conflict | 324-2234 |

Worker: Roberts, Bill
Cox County Juvenile Court
2345 Main Street
Anytown, OH 44110

Notes:

Fig 38b - Screen "View / Edit Workers (Log Worker Assignment Information - Detail)"

Youth Program Participation - Contacts

Name: Smith  Client ID: 123456789  Program: Wraparound

Meredith

| Contact Date/Time | Sched Date / Time | Type | Duration | Worker | Location | Subject |
|---|---|---|---|---|---|---|
| 09/12/2001 2:31 pm | 09/12/2001 2:31 pm | Phone | 15 min | Lovegren | Home | Parent |

[Add] [Edit] [Delete]

*Reports*

[Contact Summary]

3900

Figure 39B:
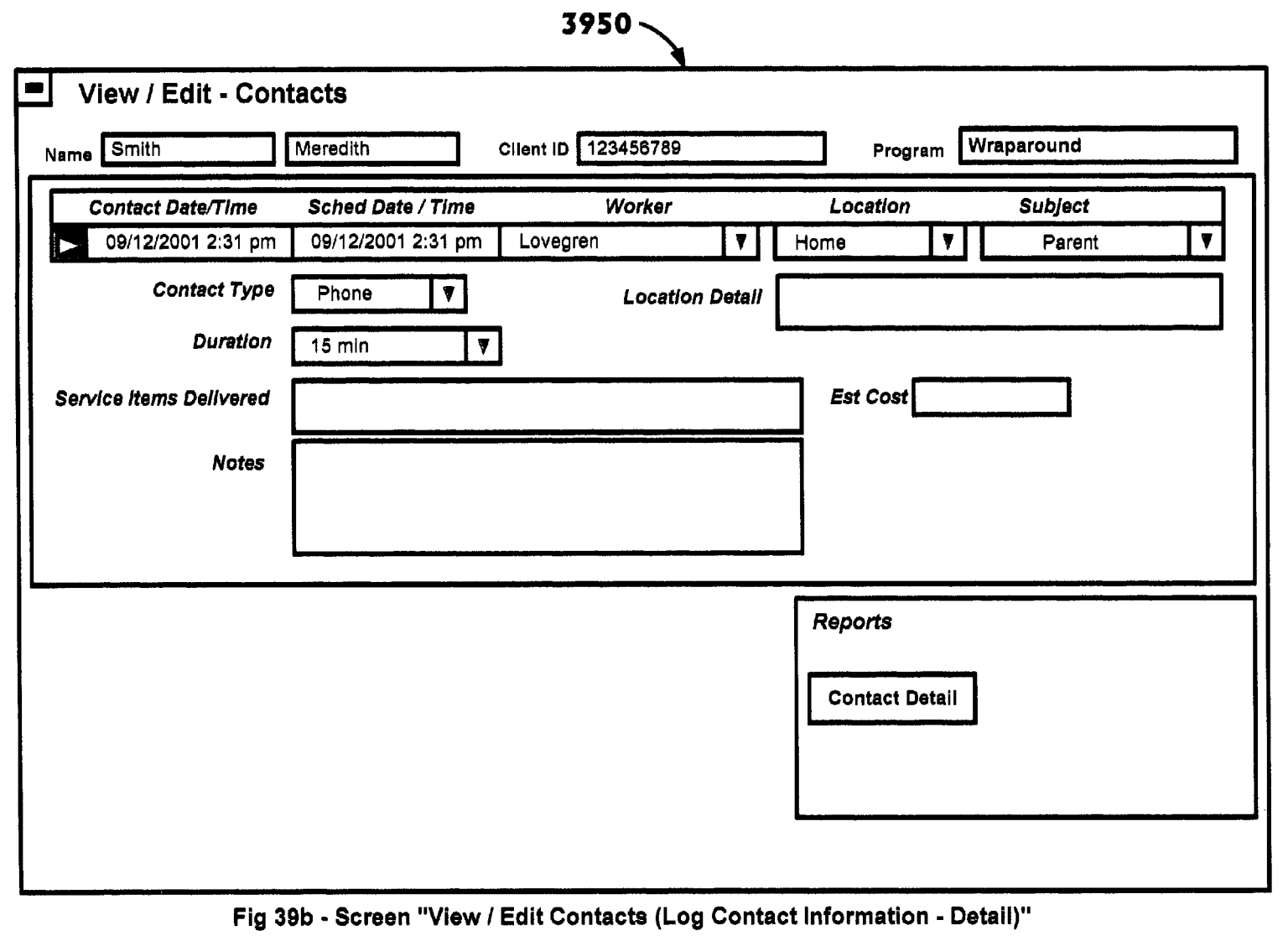

Fig 39a - Screen "Youth Program Participation - Contacts (Log Contact Information - Summary)"

Fig 39b - Screen "View / Edit Contacts (Log Contact Information - Detail)"

Youth Program Participation - Program Components

Name [Smith] [Meredith]  Client ID [123456789]  Program [Wraparound]

| Program Component / Service | Start Date | Completion Date | Supervisor |
|---|---|---|---|
| Counseling ▶ | 01/29/2001 ▶ | 01/29/2001 | Roberts ▶ |
| Anger Management ▶ | 02/03/2001 ▶ | 02/09/2001 | Jenkins ▶ |
| Drug Abuse Prevention ▲ | | | ▶ |
| Life Skills | | | |
| Tutoring | | | |
| Sex Education | | | |

[Add]  [Edit]  [Delete]

*Reports*

[Program Component Summary]

Fig 40 - Screen "Youth Program Participation - Program Component (Log Service Receipt / Completion Information)"

Youth Program Participation - Workers

4100

| Name | Smith | Meredith | Client ID | 123456789 | Program | Wraparound |

| Date / Time | Incident Type | Severity | Location |
|---|---|---|---|
| 09/12/2001 2:25 pm | Major Confrontation | Major | School |

Reports

Incident Detail

Add    Edit    Delete

Fig 41a - Screen "Youth Program Participation - Incidents (Log Incident Information - Summary)"

View / Edit Incident

Name: Smith  Meredith  Client ID: 123456789  Program: Wraparound

| Date / Time | Incident Type | Severity | Location |
|---|---|---|---|
| ▲ 09/12/2001 2:25 pm | Major Confrontation | Major | School |

Location Detail

Subject Detail

Notes

Date/Time Report Prepared

Prepared By

*Reports*

Incident Detail

4150

Fig 41b - Screen "View / Edit Incidents (Log Incident Information - Detail)"

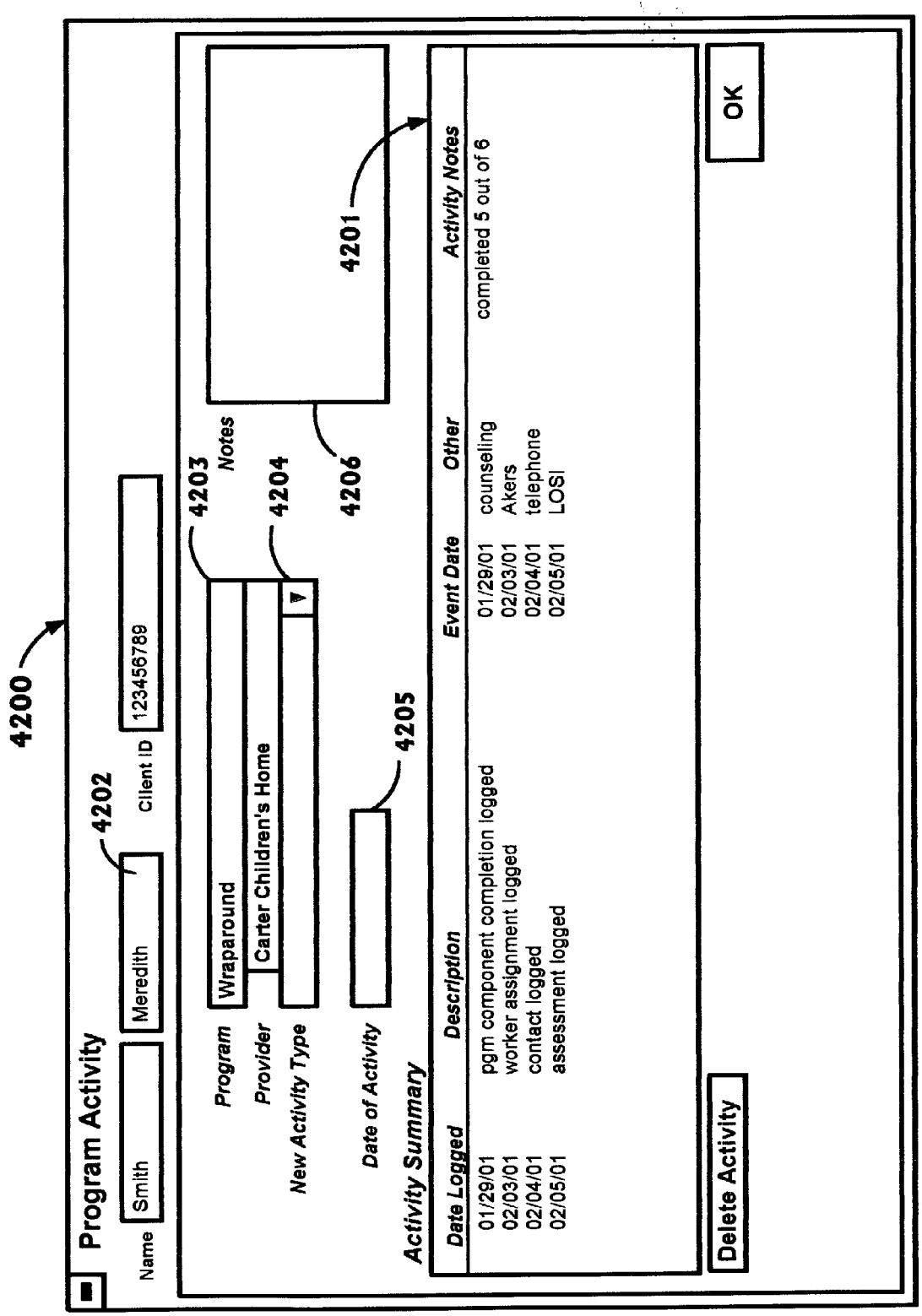
Fig 42a - Screen "Program Activity Screen - Log Other Activity / Event Info"

*Youth Program Activity Summary*

SMITH, MEREDITH    234-56-7890    Address: 2345 East Main Salt Lake City, Utah

Program: Wraparound

Start Date: 09/27/2000    End Date:

4250

*Activity Summary*

| Date Logged | Description | Event Date | Other | Activity Notes |
|---|---|---|---|---|
| 01/29/2001 | pgm component completion logged | 01/29/2001 | Counseling | Completed 5 out of 6 |
| 02/03/2001 | worker assignment logged | 02/03/2001 | Akers | |
| 02/04/2001 | contact logged | 02/04/2001 | Telephone | |
| 02/05/2001 | assessment logged | 02/05/2001 | LOSI | |

Fig 42b

Fig 43 - Screen "Program Termination / Transfer Activity (Terminate Program Participation)"

Program Evaluation

4400

Program: Intensive Probation
Provider: Cox County Juvenile Court

4410

Outcome Indicator

○ Assessment Instrument (Aggregate Score)  ● Assessment Instrument Question

Instrument 4415

- LOSI Assessment of Risks and Needs
- CAFAS - 8pt Scale
- Alcohol Screening

Question 4420

- Current School Attendance Status
- Current School Attendance Status
- Current School Enrollment - Enrolled?
- History of Psych Eval Assess - Date
- History of Psych Eval Assess - Diagnosis
- History of Psych Eval Assess - Treatment?
- History of Psych Eval Assess - Compl Date

4430

Type of Output 4440

- Tabular - Detail / Demog breakdown
- Tabular - Detail / Demog breakdown
- Tabular - Summary
- Extract File - Detail / Demog breakdown
- Pie Chart - Summary
- Pie Chart - Demog breakdown
- Bar Chart - Score Change
- Bar Chart - Summary

Evaluation Scenario 4450

- First / Last Assessments after Pgm Start
- First / Last Assessments after Pgm Start
- First / Last Assessments after Pgm End
- Last Assessment after Pgm Start
- First Assessment after Pgm End

[Cancel]  [OK]

Fig 44 - Screen "Program Offering Evaluation - Select a Question - First / Last Assessment"

Program Evaluation

4500

Outcome Indicator
○ Assessment Instrument (Aggregate Score)   ● Assessment Instrument Question Program: Intensive Probation
Provider: Cox County Juvenile Court

*Instrument*

| LOSI Assessment of Risks and Needs |
| CAFAS - 8pt Scale |
| Alcohol Screening |

*Question*

| Current School Attendance Status |
| Current School Attendance Status |
| Current School Enrollment - Enrolled? |
| History of Psych Eval Assess - Date |
| History of Psych Eval Assess - Diagnosis |
| History of Psych Eval Assess - Treatment? |
| History of Psych Eval Assess - Compl Date |

*Evaluation Scenario*

4530

| Last Assessments after Pgm Start |
| First / Last Assessments after Pgm Start |
| First / Last Assessments after Pgm End |
| Last Assessment after Pgm Start |
| First Assessment after Pgm End |

*Type of Output*

| Pie Chart - Demog breakdown |
| Tabular - Detail / Demog breakdown |
| Tabular - Summary |
| Extract File - Detail / Demog breakdown |
| Pie Chart - Summary |
| Pie Chart - Demog breakdown |
| Bar Chart - Score Change |
| Bar Chart - Summary |

4560

Cancel    OK

Fig 45 - Screen "Program Offering Evaluation - Select a Question - Last Assessment"

Program Evaluation

Program: Intensive Probation
Provider: Cox County Juvenile Court

---

Outcome Indicator

● Assessment Instrument (Aggregate Score) ○ Assessment Instrument Question — 4610

Instrument: LOSI Assessment of Risks and Needs ▼ — 4615
- LOSI Assessment of Risks and Needs
- CAFAS - 8pt Scale
- Alcohol Screening

4620

Question: — 4630
- Current School Attendance Status
- Current School Enrollment - Enrolled?
- History of Psych Eval Assess - Date
- History of Psych Eval Assess - Diagnosis
- History of Psych Eval Assess - Treatment?
- History of Psych Eval Assess - Compl Date

Evaluation Scenario: First / Last Assessments after Pgm Start ▼ — 4640
- First / Last Assessments after Pgm Start
- First / Last Assessments after Pgm End
- Last Assessment after Pgm Start
- First Assessment after Pgm End

Type of Output: Bar Chart - Score Change ▼ — 4650
- Tabular - Detail / Demog breakdown
- Tabular - Summary
- Extract File - Detail / Demog breakdown
- Pie Chart - Summary
- Pie Chart - Demog breakdown
- Bar Chart - Score Change — 4690
- Bar Chart - Summary

[ Cancel ] [ OK ]

4600

Fig 46 - Screen "Program Offering Evaluation - Select an Aggregate Score Instrument - First / Last Assessment"

LOSI Assessment of Risks and Needs - Sample

Name:                                    Date of Birth:

1. Prior and Current Offenses, Adjudication

*a.* *Three or more prior adjudications*     ☐
    *b.* *Two of more failures to comply*        ☐
    *c.* *Prior probation*                       ☐
    *d.* *Prior detention*                       ☐
    *e.* *Three of more current adjudications*   ☐

TOTAL -------------
Risk Level for question 1:
    Low (0)
    Moderate(1-2)
    High (3-5)

2. Family Circumstances and Parenting

*a.* *Inadequate supervision*            ☐
    *b.* *Difficulty in controlling behavior* ☐
    *c.* *Inappropriate discipline*          ☐
    *d.* *Inconsistent parenting*            ☐
    *e.* *Poor relations/father-child*       ☐
    *f.* *Poor relations/mother-child*       ☐

TOTAL ------------
Risk Level for question 2:
    Low (0-2)
    Moderate(3-4)
    High (5-6)

(..... Similar scoring for questions 3 through 8)

Overall Total:    ☐   Low (0-8)      ☐   Moderate (9-22)
                  ☐   High (23-34)   ☐   Very High (35-42)

Fig 47a - Form "Sample Aggregate-Score Assessment Instrument - LOSI"

Step 1 - For a specified ProgramOffering (identified by a PgmOfferID), find the assessment pairs that satisfy the date-sensitive selection criteria.

Parameter: PgmOfferID qryEvalApStep1_Scenario1—FirstLastAssts
    qryEvalAsstsAfterStartFirstLastAsstDifDates
        qryEvalAsstsAfterStartFirstAsst
            qryEvalAsstsAfterStartFirstLastAsstDates
                qryEvalAsstsAfterStart
                      tblYouthPgmPartic
                      tblYouthPgmParticAsst
                      tblYouthPgmPartic
        qryEvalAsstsAfterStartLastAsst
            qryEvalAsstsAfterStartFirstLastAsstDates
                qryEvalAsstsAfterStart
                      tblYouthPgmPartic
                      tblYouthPgmParticAsst
                      tblYouthPgmPartic

Store the following information in *tblEvalFirstLastAssts*

- *PgmOfferID*
- *FirstAsstDate*
- *FirstAsstID*
- *LastAsstDate*
- *LastAsstID*

Fig 48a qryEvalApStep1_Scenario1--FirstLastAssts:

INSERT INTO
    tblEvalFirstLastAssts ( PgmOfferID, FirstAsstID, FirstAsstDate, LastAsstID, LastAsstDate )
SELECT
    tblYouthPgmPartic.PgmOfferID,
    qryEvalAsstsAfterStartFirstLastAsstDifDates.FirstAsstID,
    qryEvalAsstsAfterStartFirstLastAsstDifDates.FirstAsstDate,
    qryEvalAsstsAfterStartFirstLastAsstDifDates.LastAsstID,
    qryEvalAsstsAfterStartFirstLastAsstDifDates.LastAsstDate
FROM
    qryEvalAsstsAfterStartFirstLastAsstDifDates
    INNER JOIN
    tblYouthPgmPartic
    ON qryEvalAsstsAfterStartFirstLastAsstDifDates.YPP = tblYouthPgmPartic.YouthPgmParticID
WHERE
    (((tblYouthPgmPartic.PgmOfferID)=[Enter Pgm Offering ID])
;

Fig 48b qryEvalAsstsAfterStartFirstLastAsstDifDates:

SELECT
    qryEvalAsstsAfterStartFirstAsst.YPP,
    qryEvalAsstsAfterStartFirstAsst.InstID,
    qryEvalAsstsAfterStartFirstAsst.YouthPgmParticAsstID AS FirstAsstID,
    qryEvalAsstsAfterStartFirstAsst.FirstAsstDate,
    qryEvalAsstsAfterStartLastAsst.YouthPgmParticAsstID AS LastAsstID,
    qryEvalAsstsAfterStartLastAsst.LastAsstDate
FROM
    qryEvalAsstsAfterStartFirstAsst
    INNER JOIN
    qryEvalAsstsAfterStartLastAsst
    ON
        (qryEvalAsstsAfterStartFirstAsst.InstID = qryEvalAsstsAfterStartLastAsst.InstID)
        AND
        (qryEvalAsstsAfterStartFirstAsst.YPP = qryEvalAsstsAfterStartLastAsst.YPP)
WHERE
    (((qryEvalAsstsAfterStartLastAsst.YouthPgmParticAsstID)<>[qryEvalAsstsAfterStartFirstAsst].[YouthPgmParticAsstID]));

Fig 48c qryEvalAsstsAfterStartFirstAsst:

SELECT
    qryEvalAsstsAfterStartFirstLastAsstDates.YPP,
    qryEvalAsstsAfterStartFirstLastAsstDates.InstID,
    qryEvalAsstsAfterStartFirstLastAsstDates.FirstAsstDate,
    qryEvalAsstsAfterStart.YouthPgmParticAsstID FROM
    qryEvalAsstsAfterStartFirstLastAsstDates
    INNER JOIN
    qryEvalAsstsAfterStart
    ON  (qryEvalAsstsAfterStartFirstLastAsstDates.FirstAsstDate = qryEvalAsstsAfterStart.AsstDateTime)
        AND
        (qryEvalAsstsAfterStartFirstLastAsstDates.InstID = qryEvalAsstsAfterStart.InstID)
        AND
        (qryEvalAsstsAfterStartFirstLastAsstDates.YPP = qryEvalAsstsAfterStart.YPP)

Fig 48d qryEvalAsstsAfterStartLastAsst:

SELECT
    qryEvalAsstsAfterStartFirstLastAsstDates.YPP,
    qryEvalAsstsAfterStartFirstLastAsstDates.InstID,
    qryEvalAsstsAfterStartFirstLastAsstDates.LastAsstDate,
    qryEvalAsstsAfterStart.YouthPgmParticAsstID
FROM
    qryEvalAsstsAfterStartFirstLastAsstDates
    INNER JOIN
    qryEvalAsstsAfterStart
    ON
        (qryEvalAsstsAfterStartFirstLastAsstDates.LastAsstDate = qryEvalAsstsAfterStart.AsstDateTime)
        AND
        (qryEvalAsstsAfterStartFirstLastAsstDates.InstID = qryEvalAsstsAfterStart.InstID)
        AND
        (qryEvalAsstsAfterStartFirstLastAsstDates.YPP = qryEvalAsstsAfterStart.YPP)

Fig 48e qryEvalAsstsAfterStartFirstLastAsstDates:

SELECT
  qryEvalAsstsAfterStart.YPP,
  tblYouthPgmParticAsst.InstID,
  Min(qryEvalAsstsAfterStart.AsstDateTime) AS FirstAsstDate,
  Max(qryEvalAsstsAfterStart.AsstDateTime) AS LastAsstDate
FROM
  tblYouthPgmParticAsst
  INNER JOIN
  qryEvalAsstsAfterStart
  ON tblYouthPgmParticAsst.YouthPgmParticAsstID = qryEvalAsstsAfterStart.YouthPgmParticAsstID
GROUP BY
  qryEvalAsstsAfterStart.YPP,
  tblYouthPgmParticAsst.InstID
;

Fig 48f qryEvalAsstsAfterStart:

SELECT
    tblYouthPgmPartic.YouthPgmParticID AS YPP,
    tblYouthPgmPartic.StartDateTime,
    tblYouthPgmPartic.EndDateTime,
    tblYouthPgmParticAsst.YouthPgmParticAsstID,
    tblYouthPgmParticAsst.AsstDateTime,
    tblYouthPgmParticAsst.YouthPgmParticID AS AsstYPP,
    tblYouthPgmParticAsst.InstID
FROM
    tblYouthPgmPartic
    INNER JOIN
    (tblYouthPgmParticAsst
        INNER JOIN tblYouthPgmPartic AS tblYouthPgmPartic_1
        ON tblYouthPgmParticAsst.YouthPgmParticID = tblYouthPgmPartic_1.YouthPgmParticID)
        ON tblYouthPgmPartic.YouthID = tblYouthPgmPartic_1.YouthID
WHERE
    (((tblYouthPgmParticAsst.AsstDateTime)>=[tblYouthPgmPartic].[StartDateTime]))
ORDER BY
    tblYouthPgmPartic.YouthPgmParticID
;

Fig 48g

Step 2_Quest – For a specified Question find the Answers

Parameter: QuestID qryEvalApStep2_Quest--AsstsAnswers
    qryEvalAsstsAnswersForQuestions
        tblAsstGroup
        tblAsstGroupDtl
        tblInstQuestGroupQuest
        tblYouthPgmParticAsst Store the following information in: *tblEvalAsstAnswers*
- *AsstID*
- *InstID*
- *QuestID*
- *Answer*
- *InstScore*

Fig 49a qryEvalApStep2_Quest--AsstsAnswers:

INSERT INTO
    tblEvalAsstAnswers ( AsstID, InstID, QuestID, Answer, InstScore )
SELECT
    qryEvalAsstsAnswersForQuestions.YouthPgmParticAsstID,
    qryEvalAsstsAnswersForQuestions.InstID,
    qryEvalAsstsAnswersForQuestions.QuestID,
    qryEvalAsstsAnswersForQuestions.AnswerText,
    -1 AS Expr1
FROM
    qryEvalAsstsAnswersForQuestions
WHERE
    (((qryEvalAsstsAnswersForQuestions.QuestID)=[Enter Quest ID]))
;

Fig 49b qryEvalAsstsAnswersForQuestions:

SELECT
    tblAsstGroup.YouthPgmParticAsstID,
    tblYouthPgmParticAsst.InstID,
    tblInstQuestGroupQuest.QuestID,
    tblAsstGroupDtl.AnswerText
FROM
    ((tblAsstGroup
        INNER JOIN
        tblAsstGroupDtl
        ON tblAsstGroup.AsstGroupID = tblAsstGroupDtl.AsstGroupID)
        INNER JOIN
        tblInstQuestGroupQuest
        ON tblAsstGroupDtl.InstQuestGroupQuestID = tblInstQuestGroupQuest.InstQuestGroupQuestID)
        INNER JOIN
        tblYouthPgmParticAsst
        ON tblAsstGroup.YouthPgmParticAsstID = tblYouthPgmParticAsst.YouthPgmParticAsstID

Fig 49c

Step 2_Inst – For specified aggregate-score-type[1] Instrument, find Aggregate Total of the Answers, respectively.

Parameter: InstID qryEvalApStep2_Inst—AsstsScoresAndInterpretation
        qryEvalAsstsAnswersForInstrumentsWithScoreInterp
            qryEvalAsstsAnswersForInstruments
                tblAsstGroup
                tblAsstGroupDtl
                tblYouthPgmParticAsst
            tblInstAggrScoreIntervals

Store the following information in: *tblEvalAsstAnswers*
- *AsstID*
- *InstID*
- *QuestID*
- *Answer*
- *InstScore*

Fig 49d qryEvalApStep2_Inst--AsstsScoresAndInterpretation:

INSERT INTO
    tblEvalAsstAnswers ( AsstID, InstID, QuestID, InstScore, Answer )
SELECT
    qryEvalAsstsAnswersForInstrumentsWithScoreInterp.YouthPgmParticAsstID,
    qryEvalAsstsAnswersForInstrumentsWithScoreInterp.InstID,
    -1 AS Expr1,
    qryEvalAsstsAnswersForInstrumentsWithScoreInterp.AnswerVal,
    qryEvalAsstsAnswersForInstrumentsWithScoreInterp.AggrScoreInterpretation
FROM
    qryEvalAsstsAnswersForInstrumentsWithScoreInterp
WHERE
    (((qryEvalAsstsAnswersForInstrumentsWithScoreInterp.InstID)=[Enter Inst ID]))
;

Fig 49e qryEvalAsstsAnswersForInstrumentsWithScoreInterp:

SELECT
    qryEvalAsstsAnswersForInstruments.YouthPgmParticAsstID,
    qryEvalAsstsAnswersForInstruments.InstID,
    qryEvalAsstsAnswersForInstruments.AnswerVal,
    tblInstAggrScoreIntervals.AggrScoreInterpretation
FROM
    qryEvalAsstsAnswersForInstruments
    LEFT JOIN
    tblInstAggrScoreIntervals
    ON qryEvalAsstsAnswersForInstruments.InstID = tblInstAggrScoreIntervals.InstID
WHERE
    (
        (qryEvalAsstsAnswersForInstruments.AnswerVal)>=[IntervalMinVal])
        and
        (qryEvalAsstsAnswersForInstruments.AnswerVal)<=[IntervalMaxVal])
    );

Fig 49f qryEvalAsstsAnswersForInstruments:

SELECT
  tblAsstGroup.YouthPgmParticAsstID,
  tblYouthPgmParticAsst.InstID,
  Sum(Val([AnswerText])) AS AnswerVal
FROM
  (tblAsstGroup
  INNER JOIN
  tblAsstGroupDtl
  ON tblAsstGroup.AsstGroupID = tblAsstGroupDtl.AsstGroupID)
    INNER JOIN
    tblYouthPgmParticAsst
    ON tblAsstGroup.YouthPgmParticAsstID = tblYouthPgmParticAsst.YouthPgmParticAsstID
GROUP BY
  tblAsstGroup.YouthPgmParticAsstID,
  tblYouthPgmParticAsst.InstID

Fig 49g

Step 3 - Given the assessments identified in step 1 and the answers / scores identified in step 2, join the two pieces of information.

qryEvalApStep3—FirstLastAsstsWithAnswersScores
qryEvalFirstLastAsstsWithAnswersScores Store the following information in: *tblEvalFirstLastAsstsWithAnswersScores*

- *YPP*
- *PgmOfferID*
- *InstID*
- *QuestID*
- *FirstAsstID*
- *FirstAsstDate*
- *FirstAsstAnswer*
- *FirstAsstScore*
- *LastAsstID*
- *LastAsstDate*
- *LastAsstAnswer*
- *LastAsstScore*

Fig 50a qryEvalApStep3--FirstLastAsstsWithAnswersScores:

INSERT INTO
 tblEvalFirstLastAsstsWithAnswersScores
  (YPP,
  PgmOfferID,
  InstID,
  QuestID,
  FirstAsstID, FirstAsstDate,FirstAsstAns,FirstAsstScore,
  LastAsstID,LastAsstDate,LastAsstAns,LastAsstScore )

SELECT
 tblYouthPgmParticAsst.YouthPgmParticID,
 qryEvalFirstLastAssts WithAnswersScores.PgmOfferID,
 qryEvalFirstLastAsstsWithAnswersScores.InstID,
 qryEvalFirstLastAsstsWithAnswersScores.QuestID,
 qryEvalFirstLastAsstsWithAnswersScores.FirstAsstID,
 qryEvalFirstLastAsstsWithAnswersScores.FirstAsstDate,
 qryEvalFirstLastAsstsWithAnswersScores.FirstAns,
 qryEvalFirstLastAsstsWithAnswersScores.FirstScore,
 qryEvalFirstLastAsstsWithAnswersScores.LastAsstID,
 qryEvalFirstLastAsstsWithAnswersScores.LastAsstDate,
 qryEvalFirstLastAsstsWithAnswersScores.LastAns,
 qryEvalFirstLastAsstsWithAnswersScores.LastScore FROM
 qryEvalFirstLastAsstsWithAnswersScores
 INNER JOIN tblYouthPgmParticAsst
  ON qryEvalFirstLastAsstsWithAnswersScores.FirstAsstID = tblYouthPgmParticAsst.YouthPgmParticAsstID
;

Fig 50b qryEvalFirstLastAsstsWithAnswersScores:

SELECT
    tblEvalFirstLastAssts.PgmOfferID,
    tblEvalAsstAnswers.InstID,
    tblEvalAsstAnswers.QuestID,
    tblEvalFirstLastAssts.FirstAsstID,
    tblEvalFirstLastAssts.FirstAsstDate,
    tblEvalAsstAnswers.Answer AS FirstAns,
    tblEvalAsstAnswers.InstScore AS FirstScore,
    tblEvalFirstLastAssts.LastAsstID,
    tblEvalFirstLastAssts.LastAsstDate,
    tblEvalAsstAnswers_1.Answer AS LastAns,
    tblEvalAsstAnswers_1.InstScore AS LastScore
FROM
    (tblEvalFirstLastAssts
INNER JOIN
    tblEvalAsstAnswers
ON tblEvalFirstLastAssts.FirstAsstID = tblEvalAsstAnswers.AsstID)

INNER JOIN
    tblEvalAsstAnswers AS tblEvalAsstAnswers_1
ON tblEvalFirstLastAssts.LastAsstID = tblEvalAsstAnswers_1.AsstID

Fig 50c

Step 4 - Given the assessments identified in step 3 and the demographic information of the Youth, join the answer and demographic attributes qryEvalApStep4—DemogFirstLastAsstsWithAnswersScores
    qryEvalDemogFirstLastAsstsWithAnswersScores Store the following information in:
*tblDemogEvalFirstLastAsstsWithAnswersScores*

- *YPP*
- *PgmOfferID*
- *Race*
- *Sex*
- *AgeWhenStartedPgm*
- *InstID*
- *QuestID*
- *FirstAsstID*
- *FirstAsstDate*
- *FirstAsstAnswer*
- *FirstAsstScore*
- *LastAsstID*
- *LastAsstDate*
- *LastAsstAnswer*
- *LastAsstScore*

Fig 51a qryEvalApStep4--DemogFirstLastAsstsWithAnswersScores:

INSERT INTO
tblEvalDemogFirstLastAsstsWithAnswersScores
(YPP,
PgmOfferID,
Race,
Sex,
AgeWhenStartedPgm,
InstID,
QuestID,
FirstAsstID, FirstAsstDate, FirstAsstAns, FirstAsstScore,
LastAsstID, LastAsstDate, LastAsstAns, LastAsstScore )
SELECT
qryEvalDemogFirstLastAsstsWithAnswersScores.YPP,
qryEvalDemogFirstLastAsstsWithAnswersScores.PgmOfferID,
qryEvalDemogFirstLastAsstsWithAnswersScores.Race,
qryEvalDemogFirstLastAsstsWithAnswersScores.Sex,
qryEvalDemogFirstLastAsstsWithAnswersScores.AgeWhenStartedPgm,
qryEvalDemogFirstLastAsstsWithAnswersScores.InstID,
qryEvalDemogFirstLastAsstsWithAnswersScores.QuestID,
qryEvalDemogFirstLastAsstsWithAnswersScores.FirstAsstID,
qryEvalDemogFirstLastAsstsWithAnswersScores.FirstAsstDate,
qryEvalDemogFirstLastAsstsWithAnswersScores.FirstAsstAns,
qryEvalDemogFirstLastAsstsWithAnswersScores.FirstAsstScore,
qryEvalDemogFirstLastAsstsWithAnswersScores.LastAsstID,
qryEvalDemogFirstLastAsstsWithAnswersScores.LastAsstDate,
qryEvalDemogFirstLastAsstsWithAnswersScores.LastAsstAns,
qryEvalDemogFirstLastAsstsWithAnswersScores.LastAsstScore FROM
qryEvalDemogFirstLastAsstsWithAnswersScores

Fig 51b qryEvalDemogFirstLastAsstsWithAnswersScores:

SELECT
  tblEvalFirstLastAsstsWithAnswersScores.YPP,
  tblEvalFirstLastAsstsWithAnswersScores.PgmOfferID,
  tblFamMem.Race, tblFamMem.Sex,
  Int(DateDiff("d",[DOB],[StartDateTime])/365) AS AgeWhenStartedPgm,
  tblEvalFirstLastAsstsWithAnswersScores.InstID,
  tblEvalFirstLastAsstsWithAnswersScores.QuestID
  tblEvalFirstLastAsstsWithAnswersScores.FirstAsstID,
  tblEvalFirstLastAsstsWithAnswersScores.FirstAsstDate,
  tblEvalFirstLastAsstsWithAnswersScores.FirstAsstAns,
  tblEvalFirstLastAsstsWithAnswersScores.FirstAsstScore,
  tblEvalFirstLastAsstsWithAnswersScores.LastAsstID,
  tblEvalFirstLastAsstsWithAnswersScores.LastAsstDate,
  tblEvalFirstLastAsstsWithAnswersScores.LastAsstAns,
  tblEvalFirstLastAsstsWithAnswersScores.LastAsstScore
FROM
  tblEvalFirstLastAsstsWithAnswersScores
  INNER JOIN
  ((
    tblYouthPgmPartic
    INNER JOIN
    tblYouth
    ON tblYouthPgmPartic.YouthID = tblYouth.YouthID)
    INNER JOIN
    tblFamMem
    ON tblYouth.FamMemID = tblFamMem.FamMemID)
  ON tblEvalFirstLastAsstsWithAnswersScores.YPP = tblYouthPgmPartic.YouthPgmParticID
;

| ID | Race | Sex | | | | | Date | Status |
|---|---|---|---|---|---|---|---|---|
| 238 | 77 W | M | 12 | 12 | 22 | 1 | 2/2/00 | Unsatisfactory |
| 239 | 77 W | M | 12 | 12 | 22 | 14 | 3/22/01 | Not Applicable |
| 256 | 77 H | F | 15 | 12 | 22 | 20 | 6/2/00 | Unsatisfactory |
| 188 | 77 B | M | 17 | 12 | 22 | 22 | 7/6/00 | Unsatisfactory |
| 235 | 77 W | M | 15 | 12 | 22 | 26 | 12/2/99 | Unsatisfactory |
| 255 | 77 W | M | 15 | 12 | 22 | 28 | 12/2/99 | Unsatisfactory |
| 224 | 77 B | M | 15 | 12 | 22 | 32 | 10/3/99 | Satisfactory |
| 258 | 77 W | M | 12 | 12 | 22 | 43 | 1/1/00 | Not Applicable |
| 259 | 77 W | F | 16 | 12 | 22 | 47 | 4/2/00 | Unsatisfactory |
| 260 | 77 W | F | 13 | 12 | 22 | 49 | 2/2/00 | Not Applicable |
| 261 | 77 W | M | 12 | 12 | 22 | 51 | 2/2/00 | Not Applicable |
| 208 | 77 B | F | 16 | 12 | 22 | 55 | 2/2/00 | Unsatisfactory |
| 263 | 77 H | F | 15 | 12 | 22 | 60 | 9/11/00 | Not Applicable |
| 192 | 77 W | M | 11 | 12 | 22 | 64 | 1/2/00 | Not Applicable |
| 264 | 77 W | M | 14 | 12 | 22 | 69 | 5/2/00 | Unsatisfactory |
| 209 | 77 M | F | 14 | 12 | 22 | 73 | 4/2/00 | Satisfactory |
| 193 | 77 W | M | 13 | 12 | 22 | 75 | 5/2/00 | Unsatisfactory |
| 266 | 77 W | M | 13 | 12 | 22 | 77 | 5/2/00 | Unsatisfactory |
| 246 | 77 H | M | 16 | 12 | 22 | 82 | 7/2/00 | Unsatisfactory |
| 246 | 77 H | M | 16 | 12 | 22 | 82 | 7/2/00 | Unsatisfactory |
| 250 | 77 W | M | 14 | 12 | 22 | 86 | 2/2/00 | Unsatisfactory |
| 271 | 77 W | M | 15 | 12 | 22 | 90 | 6/2/00 | Satisfactory |
| 270 | 77 W | M | 15 | 12 | 22 | 92 | 6/2/00 | Not Applicable |
| 229 | 77 W | M | 13 | 12 | 22 | 99 | 10/2/00 | Unsatisfactory |
| 248 | 77 W | M | 13 | 12 | 22 | 109 | 2/2/00 | Not Applicable |

Fig 52a

| ID | | | | | | | |
|---|---|---|---|---|---|---|---|
| 236 | 77 | W | M | 12 | 362 | 1/1/01 | Satisfactory |
| 239 | 77 | W | M | 12 | 214 | 2/21/02 | Not Applicable |
| 256 | 77 | H | F | 15 | 365 | 5/1/01 | Unsatisfactory |
| 188 | 77 | B | M | 17 | 321 | 6/5/01 | Satisfactory |
| 235 | 77 | W | M | 15 | 217 | 11/1/00 | Satisfactory |
| 255 | 77 | W | M | 15 | 217 | 11/1/00 | Satisfactory |
| 224 | 77 | B | M | 15 | 324 | 9/2/00 | Satisfactory |
| 258 | 77 | W | M | 12 | 223 | 12/1/00 | Satisfactory |
| 259 | 77 | W | F | 16 | 327 | 3/1/01 | Unsatisfactory |
| 260 | 77 | W | F | 13 | 374 | 1/1/01 | Satisfactory |
| 261 | 77 | B | M | 12 | 226 | 1/1/01 | Not Applicable |
| 208 | 77 | H | F | 16 | 330 | 1/1/01 | Satisfactory |
| 263 | 77 | W | F | 15 | 228 | 4/10/01 | Not Applicable |
| 192 | 77 | W | M | 11 | 333 | 12/1/00 | Satisfactory |
| 264 | 77 | W | M | 14 | 232 | 4/1/01 | Unsatisfactory |
| 209 | 77 | M | F | 14 | 235 | 3/1/01 | Satisfactory |
| 193 | 77 | W | M | 13 | 238 | 4/1/01 | Satisfactory |
| 266 | 77 | W | M | 13 | 238 | 4/1/01 | Satisfactory |
| 246 | 77 | H | M | 16 | 335 | 6/1/01 | Satisfactory |
| 246 | 77 | H | M | 16 | 336 | 6/1/01 | Satisfactory |
| 250 | 77 | W | M | 14 | 241 | 1/1/01 | Satisfactory |
| 271 | 77 | W | M | 15 | 340 | 5/1/01 | Satisfactory |
| 270 | 77 | W | M | 15 | 340 | 5/1/01 | Satisfactory |
| 229 | 77 | W | M | 13 | 343 | 9/1/01 | Satisfactory |
| 248 | 77 | W | M | 13 | 346 | 12/1/00 | Unsatisfactory |

Fig 52b

```
188,77,"B","M",17,12,22,22,7/6/2000 0:00:00,"Unsatisfactory",-1,321,6/5/2001 0:00:00,"Satisfactory"
192,77,"W","M",11,12,22,64,1/2/2000 0:00:00,"Not Applicable",-1,333,12/1/2000 0:00:00,"Satisfactory"
201,77,"B","F",11,12,22,246,6/14/2000 0:00:00,"Unsatisfactory",-1,248,11/30/2001 0:00:00,"Not Appl
202,77,"W","M",13,12,22,357,1/2/2000 0:00:00,"Unsatisfactory",-1,359,12/1/2000 0:00:00,"Satisfactory"
208,77,"B","F",16,12,22,55,2/2/2000 0:00:00,"Unsatisfactory",-1,330,1/1/2001 0:00:00,"Satisfactory"
209,77,"M","F",14,12,22,73,4/2/2000 0:00:00,"Satisfactory",-1,235,3/1/2001 0:00:00,"Satisfactory"
215,77,"W","M",12,12,22,111,1/11/2000 0:00:00,"Not Applicable",-1,252,12/10/2000 0:00:00,"Satisfa
224,77,"B","M",15,12,22,32,10/3/1999 0:00:00,"Satisfactory",-1,324,9/2/2000 0:00:00,"Satisfactory"
229,77,"W","M",13,12,22,99,10/2/2000 0:00:00,"Satisfactory",-1,343,9/1/2001 0:00:00,"Satisfactory"
236,77,"W","M",12,12,22,1,2/2/2000 0:00:00,"Satisfactory",-1,362,1/1/2001 0:00:00,"Satisfactory"
238,77,"W","M",11,12,22,113,11/2/2000 0:00:00,"Unsatisfactory",-1,349,10/1/2001 0:00:00,"Unsatisf
239,77,"W","M",12,12,22,14,3/22/2001 0:00:00,"Not Applicable",-1,214,2/21/2002 0:00:00,"Not Appli
191,77,"W","M",14,12,22,218,12/9/2000 0:00:00,"Not Applicable",-1,35,6/11/2001 0:00:00,"Not Appli
246,77,"W","H",16,12,22,82,7/2/2000 0:00:00,"Unsatisfactory",-1,335,6/1/2001 0:00:00,"Satisfactory"
246,77,"W","H",16,12,22,82,2/2/2000 0:00:00,"Unsatisfactory",-1,336,6/1/2001 0:00:00,"Satisfactory"
248,77,"W","M",13,12,22,109,2/2/2000 0:00:00,"Satisfactory",-1,346,12/1/2000 0:00:00,"Unsatisfa
282,77,"B","M",13,12,22,143,2/2/2000 0:00:00,"Satisfactory",-1,278,1/1/2001 0:00:00,"Not Applicab
249,77,"B","M",13,12,22,145,2/2/2000 0:00:00,"Not Applicable",-1,278,1/1/2001 0:00:00,"Satisfactory"
250,77,"W","M",14,12,22,86,2/2/2000 0:00:00,"Unsatisfactory",-1,241,1/1/2001 0:00:00,"Satisfactory"
251,77,"H","B",15,12,22,129,10/2/1999 0:00:00,"Not Applicable",-1,259,11/1/2000 0:00:00,"Satisfactory"
235,77,"W","M",15,12,22,26,12/2/1999 0:00:00,"Not Applicable",-1,217,11/1/2000 0:00:00,"Satisfactory"
255,77,"W","M",15,12,22,28,12/2/1999 0:00:00,"Unsatisfactory",-1,217,11/1/2000 0:00:00,"Satisfactory"
256,77,"H","F",15,12,22,20,6/2/2000 0:00:00,"Unsatisfactory",-1,365,5/1/2001 0:00:00,"Unsatisfactory"
258,77,"W","M",12,12,22,43,1/1/2000 0:00:00,"Not Applicable",-1,223,12/1/2000 0:00:00,"Satisfactory"
259,77,"W","F",16,12,22,47,4/2/2000 0:00:00,"Not Applicable",-1,327,3/1/2001 0:00:00,"Unsatisfactory"
260,77,"W","F",13,12,22,49,2/2/2000 0:00:00,"Unsatisfactory",-1,374,1/1/2001 0:00:00,"Satisfactory"
261,77,"W","M",12,12,22,51,2/2/2000 0:00:00,"Not Applicable",-1,226,1/1/2001 0:00:00,"Not Applica
263,77,"H","F",15,12,22,60,9/11/2000 0:00:00,"Not Applicable",-1,228,4/10/2001 0:00:00,"Not Appli
264,77,"W","M",14,12,22,69,5/2/2000 0:00:00,"Unsatisfactory",-1,232,4/1/2001 0:00:00,"Unsatisfactory"
193,77,"W","M",13,12,22,75,5/2/2000 0:00:00,"Satisfactory",-1,238,4/1/2001 0:00:00,"Satisfactory"
266,77,"W","M",13,12,22,77,5/2/2000 0:00:00,"Unsatisfactory",-1,238,4/1/2001 0:00:00,"Unsatisfactory"
271,77,"W","M",15,12,22,90,6/2/2000 0:00:00,"Satisfactory",     ,-1,340,5/1/2001 0:00:00,"Satisfactory"
270,77,"W","M",15,12,22,92,6/2/2000 0:00:00,"Satisfactory",...,-1,340,5/1/2001 0:00:00,"Satisfactory"
274,77,"W","B",13,12,22,117,6/2/2000 0:00:00,"Not Applicable",-1,256,5/1/2001 0:00:00,"Unsatisfac
```

| ID | | | | | | | | | | |
|---|---|---|---|---|---|---|---|---|---|---|
| 236 | 77 | W | M | 12 | | 11 | -1 | 2 | 2/2/00 High | 29 |
| 256 | 77 | H | F | 15 | | 11 | -1 | 19 | 6/2/00 Moderate | 19 |
| 257 | 77 | B | F | 12 | | 11 | -1 | 23 | 12/21/00 High | 29 |
| 235 | 77 | W | M | 15 | | 11 | -1 | 25 | 12/2/99 Low | 7 |
| 255 | 77 | W | M | 15 | | 11 | -1 | 27 | 12/2/99 Low | 7 |
| 206 | 77 | B | M | 16 | | 11 | -1 | 29 | 6/2/99 High | 28 |
| 240 | 77 | W | M | 17 | | 11 | -1 | 38 | 3/22/01 High | 23 |
| 204 | 77 | W | M | 13 | | 11 | -1 | 44 | 10/2/00 High | 28 |
| 260 | 77 | W | F | 13 | | 11 | -1 | 48 | 2/2/00 High | 23 |
| 261 | 77 | W | M | 12 | | 11 | -1 | 50 | 2/2/00 High | 23 |
| 262 | 77 | W | M | 14 | | 11 | -1 | 52 | 8/2/99 High | 26 |
| 196 | 77 | H | M | 15 | | 11 | -1 | 58 | 1/4/99 High | 28 |
| 212 | 77 | H | M | 12 | | 11 | -1 | 61 | 10/2/00 High | 28 |
| 199 | 77 | B | F | 15 | | 11 | -1 | 66 | 9/6/00 High | 25 |
| 265 | 77 | W | M | 13 | | 11 | -1 | 70 | 1/2/00 High | 29 |
| 193 | 77 | W | M | 13 | | 11 | -1 | 74 | 5/2/00 High | 27 |
| 266 | 77 | W | M | 13 | | 11 | -1 | 76 | 5/2/00 High | 27 |
| 267 | 77 | H | M | 16 | | 11 | -1 | 80 | 7/2/00 High | 25 |
| 267 | 77 | H | M | 16 | | 11 | -1 | 80 | 7/2/00 High | 25 |
| 246 | 77 | H | M | 16 | | 11 | -1 | 81 | 7/2/00 High | 31 |
| 246 | 77 | W | F | 16 | | 11 | -1 | 81 | 7/2/00 High | 31 |
| 210 | 77 | W | M | 13 | | 11 | -1 | 87 | 1/2/00 High | 29 |
| 271 | 77 | W | M | 15 | | 11 | -1 | 89 | 6/2/00 High | 30 |
| 270 | 77 | W | M | 15 | | 11 | -1 | 91 | 6/2/00 High | 28 |
| 213 | 77 | W | M | 12 | | 11 | -1 | 96 | 12/2/00 Very High | 42 |

| | | | | | | | |
|---|---|---|---|---|---|---|---|
| 236 | 77 W | M | 12 | 11 | -1 | 2 | 2/2/00 High | 29 |
| 256 | 77 H | F | 15 | 11 | -1 | 19 | 6/2/00 Moderate | 19 |
| 257 | 77 B | F | 12 | 11 | -1 | 23 | 12/21/00 High | 29 |
| 235 | 77 W | M | 15 | 11 | -1 | 25 | 12/2/99 Low | 7 |
| 255 | 77 W | M | 15 | 11 | -1 | 27 | 12/2/99 Low | 7 |
| 206 | 77 B | M | 16 | 11 | -1 | 29 | 6/2/99 High | 28 |
| 240 | 77 W | M | 17 | 11 | -1 | 38 | 3/22/01 High | 23 |
| 204 | 77 W | F | 13 | 11 | -1 | 44 | 10/2/00 High | 28 |
| 260 | 77 W | M | 13 | 11 | -1 | 48 | 2/2/00 High | 23 |
| 261 | 77 W | M | 12 | 11 | -1 | 50 | 2/2/00 High | 23 |
| 262 | 77 W | M | 14 | 11 | -1 | 52 | 8/2/99 High | 26 |
| 196 | 77 H | M | 15 | 11 | -1 | 58 | 1/4/99 High | 28 |
| 212 | 77 H | M | 12 | 11 | -1 | 61 | 10/2/00 High | 28 |
| 199 | 77 B | F | 15 | 11 | -1 | 66 | 9/6/00 High | 25 |
| 265 | 77 W | M | 13 | 11 | -1 | 70 | 1/2/00 High | 29 |
| 193 | 77 W | M | 13 | 11 | -1 | 74 | 5/2/00 High | 27 |
| 266 | 77 W | M | 13 | 11 | -1 | 76 | 5/2/00 High | 27 |
| 267 | 77 H | M | 16 | 11 | -1 | 80 | 7/2/00 High | 25 |
| 267 | 77 H | M | 16 | 11 | -1 | 80 | 7/2/00 High | 25 |
| 246 | 77 H | M | 16 | 11 | -1 | 81 | 7/2/00 High | 31 |
| 246 | 77 H | M | 16 | 11 | -1 | 81 | 7/2/00 High | 31 |
| 210 | 77 W | F | 13 | 11 | -1 | 87 | 1/2/00 High | 29 |
| 271 | 77 W | M | 15 | 11 | -1 | 89 | 6/2/00 High | 30 |
| 270 | 77 W | M | 15 | 11 | -1 | 91 | 6/2/00 High | 28 |
| 213 | 77 W | M | 12 | 11 | -1 | 96 | 12/2/00 Very High | 42 |

```
195,77,"W","M",16,11,-1,100,2/6/2000 0:00:00,"High",25,188,1/5/2001 0:00:00,"Moderate",13
196,77,"H","M",15,11,-1,58,1/4/1999 0:00:00,"High",28,178,12/3/1999 0:00:00,"Low",6
199,77,"B","F",15,11,-1,66,9/6/2000 0:00:00,"High",25,173,8/5/2001 0:00:00,"Low",8
203,77,"B","M",15,11,-1,148,2/2/2000 0:00:00,"High",23,211,1/1/2001 0:00:00,"Low",0
204,77,"W","M",13,11,-1,44,10/2/2000 0:00:00,"High",28,164,6/1/2001 0:00:00,"Low",4
206,77,"B","M",16,11,-1,29,6/2/1999 0:00:00,"High",28,284,5/1/2000 0:00:00,"High",34
210,77,"W","F",13,11,-1,87,1/2/2000 0:00:00,"High",29,301,4/1/2001 0:00:00,"Moderate",9
212,77,"H","M",12,11,-1,61,10/2/2000 0:00:00,"High",28,296,9/1/2001 0:00:00,"Low",0
213,77,"W","M",12,11,-1,96,12/2/2000 0:00:00,"Very High",42,306,11/1/2001 0:00:00,"Very High",38
222,77,"B","M",12,11,-1,138,9/2/2000 0:00:00,"High",24,318,8/1/2001 0:00:00,"Very High",35
230,77,"W","M",16,11,-1,104,5/2/2000 0:00:00,"Moderate",21,309,4/1/2001 0:00:00,"Moderate",9
231,77,"W","M",16,11,-1,114,4/11/2000 0:00:00,"High",23,194,3/10/2001 0:00:00,"Low",0
233,77,"W","M",13,11,-1,124,3/11/2000 0:00:00,"High",34,201,12/10/2000 0:00:00,"Low",8
236,77,"W","M",12,11,-1,2,2/2/2000 0:00:00,"High",29,153,1/1/2001 0:00:00,"Low",6
240,77,"W","M",17,11,-1,38,3/22/2001 0:00:00,"High",23,289,2/21/2002 0:00:00,"High",29
244,77,"W","M",14,11,-1,160,12/9/2000 0:00:00,"Moderate",17,33,6/11/2001 0:00:00,"Moderate",20
244,77,"W","M",14,11,-1,160,12/9/2000 0:00:00,"Moderate",17,36,6/11/2001 0:00:00,"High",23
267,77,"H","M",16,11,-1,80,7/2/2000 0:00:00,"High",25,178,6/1/2001 0:00:00,"Low",2
267,77,"H","M",16,11,-1,80,7/2/2000 0:00:00,"High",25,179,6/1/2001 0:00:00,"Low",2
246,77,"H","M",16,11,-1,81,7/2/2000 0:00:00,"High",31,178,6/1/2001 0:00:00,"Low",2
246,77,"H","M",16,11,-1,81,7/2/2000 0:00:00,"High",31,179,6/1/2001 0:00:00,"Low",2
248,77,"W","M",13,11,-1,108,2/2/2000 0:00:00,"High",25,191,1/1/2001 0:00:00,"Low",7
282,77,"B","M",13,11,-1,142,2/2/2000 0:00:00,"Very High",38,208,1/1/2001 0:00:00,"Moderate",9
249,77,"B","M",13,11,-1,144,2/2/2000 0:00:00,"High",27,208,1/1/2001 0:00:00,"Moderate",9
219,77,"B","M",15,11,-1,126,10/2/1999 0:00:00,"High",26,315,9/1/2000 0:00:00,"Low",7
251,77,"B","M",15,11,-1,128,10/2/1999 0:00:00,"High",33,315,9/1/2000 0:00:00,"Low",7
235,77,"W","M",15,11,-1,25,12/2/1999 0:00:00,"Low",7,159,11/1/2000 0:00:00,"Moderate",18
255,77,"W","M",15,11,-1,27,12/2/1999 0:00:00,"Low",7,159,11/1/2000 0:00:00,"Moderate",18
256,77,"H","F",15,11,-1,19,6/2/2000 0:00:00,"Moderate",19,156,5/1/2001 0:00:00,"Very High",36
257,77,"B","F",12,11,-1,23,12/21/2000 0:00:00,"High",29,281,11/20/2001 0:00:00,"Very High",42
260,77,"W","M",13,11,-1,48,2/2/2000 0:00:00,"High",23,377,2/1/2001 0:00:00,"Low",5
261,77,"H","M",12,11,-1,50,2/2/2000 0:00:00,"High",23,379,2/1/2001 0:00:00,"Low",8
262,77,"W","H",14,11,-1,52,8/2/1999 0:00:00,"High",26,293,7/1/2000 0:00:00,"High",26
265,77,"W","M",13,11,-1,70,1/2/2000 0:00:00,"High",29,298,4/1/2001 0:00:00,"Moderate",18
```

Fig 56

METHOD FOR TRACKING AND ASSESSING PROGRAM PARTICIPATION

RELATED APPLICATIONS

This application claims priority from U.S. Provisional Patent Application Ser. No. 60/323,008 entitled "PROGRAM PARTICIPATION TRACKING, ASSESSMENT, AND EVALUATION SYSTEM" filed Sep. 18, 2001, incorporated herein by reference in its entirety.

TECHNICAL FIELD

The present invention relates generally to the field of database management and more specifically to tracking and assessing human subjects as they progress through a variety of programs.

BACKGROUND OF THE INVENTION

The need for the invention was first raised in a Juvenile Justice setting. Juvenile courts, unlike their adult counterparts, focus on rehabilitation of the offender (vs. punishment). As a result, these agencies need to provide programs, services, and interventions that address the assessment and rehabilitation of these young offenders. Some programs are offered directly by the court (e.g. probation services), but most are provided by outside agencies.

The goal is for offenders to be assessed and then referred to programs that hold promise of impacting the youth in a positive way. It is important that the referrals direct the youth to appropriate programs for his/her needs (and risk). Assessments are conducted to determine the characteristics of the subject (e.g. demographic information such as sex, race, age, socioeconomic situation, but also behavioral, physical, psychiatric needs, risks, strengths, weakness, etc.). The candidate programs, on the other hand, have characteristics (i.e. mission, goals, expertise, target audience, capability, capacity, cost, eligibility requirements, etc.) In an ideal world, some exceptionally skilled and informed case worker or court official would match the youth, having documented characteristics, to the best program(s), having documented characteristics. Making this "matching" decision would also take into account the information "what intervention works best for what kind of youth? And are these intervention services offered by the available programs?" These are among the criteria used to measure how "good" a candidate match might promise to be.

Answering these questions is a very complex and data intensive task, especially with thousands of youth and scores of different programs from which to choose. Methods of assessing and characterizing the youth and programs, documenting the level of participation and the interventions used, and capturing the outcomes of historical matches are needed. And, importantly, information technology in the form of data-collection, database and analysis tools are needed to enable the methodology.

Static information about the youth as well as longitudinal and dynamic information about the youth's needs, behaviors, attitudes, etc., together with longitudinal intervention information related to his/her participation in multiple programs, program service-delivery information and goals, must be captured. Furthermore, this information needs to be captured in a format that can accommodate very different kinds of data coming from many different sources. The data-collection method and tool need to be flexible yet robust.

The problem of maintaining youth assessment information alone is a daunting task. Assessment instruments (e.g. questionnaires, survey forms, etc.) vary from program to program. And often there are multiple assessment instruments used within the same program. Frequently, questions are shared by multiple instruments. Similar questions are expressed inconsistently across instruments (e.g. one expression of the question might be in a multiple-choice format, while another might be free format.) The assessment instrument itself is often dynamic, having questions added, changed, or deleted over time. The sheer number of instruments and information elements is overwhelming, and maintaining such instruments within an information system could require major and ongoing programming effort to "program them into and then maintain them" within the application.

There is a growing universal and pressing need for methods and tools to assist in program outcome measurement, and, more generally, to program evaluation. This impetus has arisen partially due to the presence of more and more human service programs and the rise in non-profit initiatives. Also, funders of such programs are demanding accountability and are expecting to see how their contributions are being used. United Way has recently mandated that its member agencies implement Program Outcomes Measurement programs and methods, and is actively training these agencies in this practice.

SUMMARY OF THE INVENTION

Determining how youth are impacted as a result of program interventions is an important question. While the present invention will be described in the juvenile justice environment, the present invention need not be confined to youth subjects or to a juvenile justice setting. The data model underlying the invention was developed to track any participants in any programs within a robust database structure that could support numerous multi-dimensional and parametric program outcome measurement objectives. The ease in navigating through the database to measure various program outcome indicators is demonstrated in the accompanying invention description.

According to a preferred embodiment of the present invention, an aggregate assessment of a group of subjects is performed given subject-specific assessments. The assessments are conducted using assessment instruments and data-validation rules. A means of representing a set of questions, answer restrictions, and question-answer-validation rules is provided within an assessment-instrument data structure. A means of representing a plurality of assessment instruments is provided within the assessment-instrument data structure and for each assessment instrument an assessment-instrument key and a plurality of links to associated questions is stored. A means of representing a plurality of subjects is provided and for each subject a subject key and a plurality of subject attributes are stored within a subject data structure. A means of representing a plurality of assessment events is provided within an assessment-event data structure, and for each assessment event, an associated assessment-event key, subject key and assessment-instrument keys, and a reference to a point in time are stored in the assessment-event data structure. Within the assessment-event data structure, the assessment results including of a plurality of validated answers to a plurality of associated said questions for each assessment event are stored for a subject group by aggregating the assessment results from subjects within the group and utilizing linked data within the data structures.

According to an embodiment of the present invention, program participation is tracked within programs that provide services to program participants. The participation experience includes service events and said assessment events and the assessment data has been stored in assessment-instrument and assessment-event data structures. A means of representing a plurality of programs having varying program components and services is provided and a unique program key and a plurality of program attributes are stored in a program-definition data structure. A means of representing a plurality of program-participation experiences is provided and for each said program-participation experience a unique program-participation key, an associated program key, an associated program-participant key, and a reference to a participation time period is stored within a program-participation data structure. A plurality of program-participation activities and events for a given program-participation experience is represented within the program-participation data structure including assessment events and each event is linked to the experience by the program-participation key.

According to another embodiment of the present invention the effectiveness of programs that provide services to program participants can be assessed given assessment questions that have been stored in an assessment-instrument data structure and validated assessment results for program participants that have been stored as assessment events in an assessment-event data structure and analyzed, in aggregate, relative to program-participation experiences. A means of representing a plurality of programs having varying program components and services is provided and a unique program key and a plurality of program attributes are stored in a program-definition data structure. A means of representing a plurality of program-participation experiences is provided and for each program-participation experience, a unique program-participation key, an associated program key, an associated program-participant key, and a reference to a participation time period are stored within a program-participation data structure. For a given program-participation experience, a plurality of program-participation activities and events, including said assessment events representing, are stored within the program-participation data structure and each event is linked to the experience by the program-participation key. For any program having outcome indicators represented in the assessment instruments, the set of said assessment events associated with the instrument(s) is selected with the program's participants, and program-level assessment results are derived by aggregating the assessment results of the assessment events.

The program participation tracking, assessment, and evaluation system of the present invention is an integrated decision support tool that provides support for case workers, program managers and administrators in delivery of appropriate and beneficial program services to program participants.

The tracking, assessment, and evaluation system of the present invention is able to use assessment instruments to capture varied and analyzable longitudinal information about youth within the juvenile justice system. According to an embodiment, the system maintains information about programs, services, providers, funding, etc. The system measures the level of participation of the youth within a program—the delivery methods and workers involved, the interventions used, the services received, the contacts that were made, incidences that occurred etc. According to an embodiment, the system facilitates analysis of the information for case management and program evaluation purposes.

The program tracking, assessment, and evaluation system of the present invention enables case workers working with program participants to track participation activity and assessment information about those participants, and to be able to measure the effectiveness of the program and of program services. It provides a user-friendly interface to capture critical participation and assessment information.

According to a feature of the invention, program managers can document program characteristics and services, monitor the operation of the programs, and evaluate program effectiveness. Information can be used to identify problems and opportunities, and support decisions related to poorly used or unnecessary services, problem providers, need for new or changed services, etc.

The present invention, embodied as a relational database application, stores the participation and assessment information in such a manner as to facilitate the analysis of the captured data for program evaluation as well as case management purposes. The underlying data model provides a general and flexible framework for adapting to virtually any program-participation scenario. The user interface that supports the definition, capturing and reporting of assessment information do not involve instrument-specific tables. Rather they rely on instrument-specific rows. Thus, the assessment instrument is defined by the data rather than by the table structures.

An important byproduct of the flexible data structures is in the ease and flexibility of analysis and reporting. Importantly, assessment, participation activity and demographics can be easily combined. Basic reports, designed around user-supplied parameters, can be developed to accommodate numerous reporting requirements.

An exemplary embodiment of the present invention includes an assessment module that permits customization of assessment instruments without the aid of a professional software developer. The user-customized assessment instruments can then be used to provide questions to be answered in an assessment session or interview. Further, these questions may or may not have associated coded answer choices or answer restrictions. The answer restrictions enhance the question's or instrument's ability to be analyzed. Standard industry classification codes (e.g. diagnosis, treatment, or criminal codes, etc.) can be imported into the database to provide answer constraints. Other answer choices may be maintained, through the systems' assessment user interface, in a central repository of "permissible answers."

The present invention provides a flexible method of tracking fundamental program activities. According to a feature of an embodiment of the present invention, each activity is captured with a date, and possibly time, along with relevant supporting data. Participant-specific reports such as an activity summary and assessment summary can be viewed to provide valuable information about the participant's level of participation and about the impact of the participation in changing the participant's attitudes, behaviors, skills, etc. In other words, it provides information for measuring a participant's progress relative to targeted program outcomes. These fundamental program activities (events) include assessments, worker associations, contacts, services received, etc. In addition, miscellaneous activities can be tracked as well. Additional activity categories can be added by the user, and then tracked.

Detailed participant-specific activity and assessment data can be aggregated and analyzed at the program, provider, or other aggregate level. The longitudinal data can be analyzed to compare before and after measures, or used to evaluate program outcomes vis-à-vis other programs' outcomes.

In an embodiment, selected assessment-instrument questions can be used as outcome indicators. Analyzing these indicator-type questions is tantamount to analyzing the associated indicators. Values for these indicators, rolled up across multiple assessments, can provide "program-focused" indicator data that can be combined with other indicator data to assess program effectiveness.

An aggregate-score assessment instrument, i.e. an instrument whose questions are numeric, and can be combined or aggregated into an instrument-level score, can be designated as an indicator as well. Scores for these aggregate-score instrument indicators can also be used as input into program outcome measurement.

In an embodiment, the assessment information can be analyzed in combination with participant demographic and participation activity information (e.g. services received, workers associated, contacts made, etc.). The present invention contains many reports that analyze demographic, participation-activity and assessment information. Each report is based upon queries which accept parameters that specify, for example, the question or instrument to be analyzed, the type of output, the level of detail of the output, the type of evaluation, etc. It can be contemplated that additional parametric reports can be added to the set currently defined.

The present invention also creates intermediary tables (partially aggregated) that streamline analysis and evaluation of additional program outcome measures.

The extract files generated by the present invention can be imported into more sophisticated statistical analysis programs (e.g. SAS or SPSS) for multivariate or other advanced analysis purposes.

BRIEF DESCRIPTION OF THE DRAWINGS

FIG. 1 is a block diagram of a network configuration for practice of an embodiment of the present invention;

FIG. 2 is a context diagram for an embodiment of the present invention;

FIG. 3a is a data flow diagram for an assessment instrument definition module according to an embodiment of the present invention;

FIG. 3b is a data flow diagram for a program information module according to an embodiment of the present invention;

FIG. 3c is a data flow diagram for a participant information module according to an embodiment of the present invention;

FIG. 3d is a data flow diagram for a participation recordation module according to an embodiment of the present invention;

FIG. 3e is a data flow diagram for a report preparation module according to an embodiment of the present invention;

FIG. 4 is a data flow diagram for a program information module according to an embodiment of the present invention;

FIG. 5 is a data model of some basic elements of an embodiment of the present invention;

FIG. 6 is a data model of participant information as structured according to an embodiment of the present invention;

FIG. 7 is a data model of program offering information as structured according to an embodiment of the present invention;

FIG. 8 is a data model of individual participation information as structured according to an embodiment of the present invention;

FIG. 9 is a data model of individual assessment information as structured according to an embodiment of the present invention;

FIG. 10 is a data model of program evaluation information as structured according to an embodiment of the present invention;

FIG. 11 is a data model for program evaluation information as structured according to an embodiment of the present invention;

FIG. 12 is a data flow diagram for a program assessment module according to an embodiment of the present invention;

FIG. 13 is a data flow diagram for an assessment aggregation module according to an embodiment of the present invention;

FIG. 14 is a data flow diagram for assessment retrieval module according to an embodiment of the present invention;

FIG. 15 is a data flow diagram for an answer retrieval module according to an embodiment of the present invention;

FIG. 16 is a data flow diagram for score and interpretation retrieval module according to an embodiment of the present invention;

FIG. 17 is a data flow diagram for an assessment to answer joining module according to an embodiment of the present invention;

FIG. 18 is a data flow diagram for assessment to demographic profile joining module according to an embodiment of the present invention;

FIG. 19 is a data model for a navigational path based on program offering parameters according to an embodiment of the present invention;

FIG. 20 is a data model for a navigational path based on question parameters according to an embodiment of the present invention;

FIG. 21 is a data model for a navigational path based on instrument parameters according to an embodiment of the present invention;

FIG. 22 is a data model for a navigational path based on instrument/program offering parameters according to an embodiment of the present invention;

FIG. 23 is a data model for a navigational path based on program offering/instrument parameters according to an embodiment of the present invention;

FIG. 24 is a data model for a navigational path based on program offering/question parameters according to an embodiment of the present invention;

FIGS. 25-46 are examples of user interface screens for populating data structures of an embodiment of the present invention;

FIG. 47 is an illustration of a form representing an aggregate-score instrument according to an embodiment of the present invention;

FIGS. 48-51 are examples of SQL queries for generating program evaluation information according to an embodiment of the present invention; and FIGS. 52-57 are examples of reports that can be generating utilizing an embodiment of the present invention.

DETAILED DESCRIPTION OF THE PREFERRED EMBODIMENTS

Figure 54:
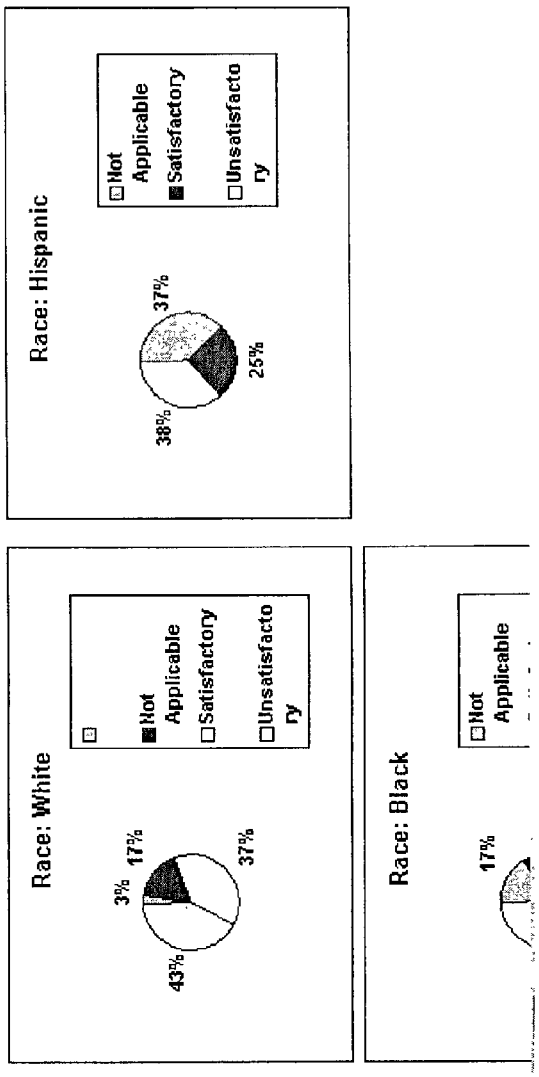

As illustrated in FIG. 1, a preferred embodiment of the invention, a Program Participation Tracking, Assessment, and Evaluation system, is in the form of a Microsoft Access 2000® database application, running on a Windows NT® local area network. The system is implemented in two files, a User Interface 10 (named PPTAEUserIF.mdb), and a Database 12 (named PPTAEData.mdb). Workstations in the network should be running Windows NT Workstation®\ or Windows 98® operating systems. MS Access 2000® must be installed on each workstation running the application, as well as on the NT server. Optionally, a PC-based statistical analysis program (e.g. SPSS) can be used to perform advanced analysis on data exported from the Assessment and Program Evaluation database application. Finally, MS Graph 2000® is required to display graphical reports.

Subsequent figures provide detail about the User Interface 10 and Database 12 components of the system. FIGS. 2 through 4 and 12 through 18 focus on the User Interface 10 processes, where FIGS. 5 through 11 focus on the Database 12 data models. The User Interface 10 is composed of 5 major processes, as illustrated in FIG. 2. Each of the 5 processes is decomposed in FIGS. 3a through 3e. The complete hierarchical decomposition is as follows:

| | |
|---|---|
| Context Diagram | FIG. 2 |
| Diagram 1 | FIG. 3a |
| Diagram 2 | FIG. 3b |
| Diagram 3 | FIG. 3c |
| Diagram 4 | FIG. 3d |
| Diagram 5 | FIG. 3e |
| Diagram 5.2 | FIG. 4 |
| Diagram 5.2.1 | FIG. 12 |
| Diagram 5.2.1.1 | FIG. 13 |
| Diagram 5.2.1.1.1 | FIG. 14 |
| Diagram 5.2.1.1.2 | FIG. 15 |
| Diagram 5.2.1.1.3 | FIG. 16 |
| Diagram 5.2.1.1.4 | FIG. 17 |
| Diagram 5.2.1.1.5 | FIG. 18 |

User Interface Process Overview

The processes embodied in the present invention will be described in five basic modules, outlined in FIG. 2, as follows:

Assessment-Instrument Maintenance Module

The first process, Maintain Assessment-Instrument Definition Information 210, is the system module where the assessment instruments are maintained. An Assessment Instrument 870 (FIG. 8) is an electronic version of a questionnaire or form containing questions that are to be answered by, in this case, a program participant, or by someone interviewing the participant and acting on his/her behalf. A case worker might be the most likely respondent. The user interface relative to this process is exemplified in the screens displayed in FIGS. 25 through 31.

Program Maintenance Module

The second process, Maintain Program Information 220, is manifest in the system module where information defining the program is maintained. Various screens collect information about the program. Such information includes the program's missions, goals and eligibility requirements to the provider, workers and services provided. This module permits the program configuration that must occur before any program participant can be tracked.

Participant Maintenance Module

Figure 32:
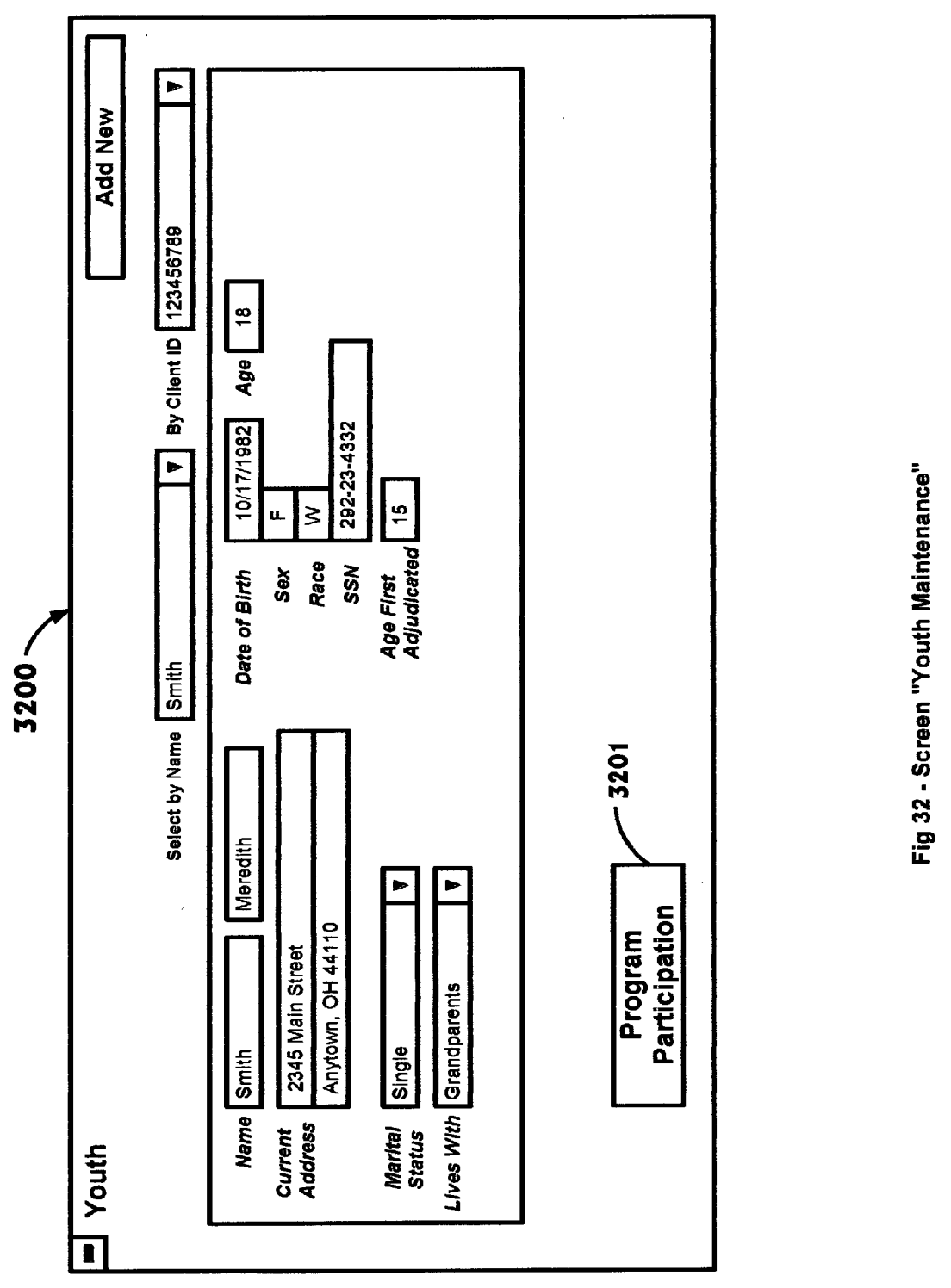

A third process, Maintain Participant Information 230, is the system module where information about the participant is maintained. See FIG. 32 for a sample screen. For the purposes of this description, it is assumed here that the information is primarily static demographic information as opposed to the more dynamic participation information that is maintained in the fourth process, Record Participation Information, 240. It may happen that much of this information is already stored in some other electronic medium, i.e. another computer system. In that case, a "refresh" interface can be developed to synchronize the Program Participation Tracking, Assessment and Evaluation system with participant attributes found in both systems. In fact, the preferred embodiment of the invention does include a module to refresh its system with demographic, address, criminal history, etc. maintained in a main information system.

Record Participation Module

The fourth process, Record Participation Information 240, represents the system module where the bulk of the day-to-day entry of information takes place. This user interface provides screens which capture a great amount of information relating to a participant's participation in a program. FIGS. 33 through 46 show examples of this interface.

Program Evaluation Module

A fifth process, Prepare and Output Reports 250, represents the system module that compiles information located within the database 12 that meets user specified requirements and presents the retrieved information to the user in a user specified manner. Assess/Evaluate Program Effectiveness 410 (FIG. 4), a sub-process of Prepare and Output Reports 250, represents the compilation, aggregation, analysis and presentation of participation and related data into useful management and evaluation information. Examples of how the database 12 is navigated to derive program-evaluation information is discussed in subsequent figures. The output of the Prepare and Output Reports 250 process are reports 16. The reports 16 presents the user with compiled information from the database based on the user specified requirements.

The Assessment-Instrument Maintenance Module

FIG. 3a is a decomposition of the Maintain Assessment-Instrument Definition Information process 210. The sub-processes represented by 311, 312 and 313 describe a user interface that maintains answers, questions, and instruments, respectively.

Though the focus of this section is on the process Maintain Assessment-Instrument Definition Information 210, it is useful to refer to the corresponding section of the data model (FIG. 9) that focuses on Individual Assessments (as opposed to Program Assessments). Frequent reference will be made to objects in FIG. 9.

The purpose of the Maintain Answers 311 interface is to provide a means of maintaining Permissible Answers 950 (FIG. 9) in a generic "answer repository." The answers in the answer repository will ultimately be used to constrain assessment-instrument multiple-choice questions. FIG. 25 shows the screen, Answer List Maintenance 2500 in the preferred embodiment where the generic answer repository is maintained. Note that the set of answers contain industry-neutral answers such as "Yes" and "No"; "Satisfactory" and "Unsatisfactory"; "Increase", "Decrease" or "NoChange", as well as industry-specific ones. Since this repository is user-maintained, it can contain answers that satisfy the assessment needs of target programs. For example, "K", "1.sup.st", "2.sup.nd", etc. might be answers used by programs catering to youth, when, for example, an assessment needs to document the current school grade.

This repository of manually added answers is one of two types of answer domains, the other type being imported industry-standard codes. Diagnostic, treatment, or criminal codes are typical examples. The DSM-IV diagnostic codes, if imported into the system, could be used to constrain diagnostic-related questions. Assume, for purposes of illustration, that the system has imported a table containing health diagnostic codes and called it domDSMIV (the "dom" prefix standing for "Domain"). For example, domDSMIV could look like the following:

| Diag ID | Diag Code | Diag Description |
|---|---|---|
| 1 | 291.8 | Alcohol-Induced Anxiety Disorder |
| 2 | 303.90 | Alcohol Dependence |
| 3 | 308.3 | Acute Stress Diorder |

Sub-process Maintain Questions 312 is the part of the Assessment Instrument Maintenance Module where the Questions 930 (FIG. 9) are maintained. A "question repository" is maintained in much the same way that an answer repository was maintained by Maintain Answers 311.

It is presumed that an effort precedes the implementation of the present invention that analyzes the numerous in-use instruments and culls from these instruments a core set of non- or minimally overlapping questions. When multiple similarly worded questions can be re-phrased into a normalized standard, the opportunity to perform analysis is improved. The same question may show up in multiple instruments, and can be analyzed, if desired, independently of the assessment instrument in which it appears. Question-based analysis is covered later when the process Assess/Evaluate Program Effectiveness 410 (FIG. 4) is discussed.

Questions 930 (FIG. 9) are characterized into different types according to the restrictions placed on their answers. These types are shown in FIG. 9 as: MultiChoice 935, Date 945, Freeform 955, Inherited 965, and Numeric Range 975.

Some of these categories are further subdivided. Multi-Choice questions may draw their answers from the generic answer repository or from one of the imported code tables (e.g. "domDSMIV" mentioned above). Multiple-choice questions may also have associated weights, if desired.

Date-type questions can have different levels of precision: MMDDYYYY, MMYYYY, or YYYY. A "date of birth" question would hope to have an MMDDYYYY answer, where a "year of divorce" question only needs a YYYY answer.

Inherited questions are those which are, usually, some static data elements such as sex, address, race, etc. which are maintained in the individual's "master file". If an assessment instrument has, for example, the "address" question, it can be inherited from the master file, eliminating the need to re-key it into the database. Inherited questions may or may not be editable. Editable questions can be overridden, whereas non-editable questions cannot.

Freeform questions are those questions which permit any information to be entered. There are no answer restrictions in this case. These questions are usually used for names or descriptions of things that will not be readily analyzed at an aggregate level.

Each question that is defined contains a prompt that is to be displayed on the Assessment Answer Screen (FIGS. 36b, 36c and 37c) when the target question is presented for answering. A question can be designated as requiring an answer or not.

FIG. 26 shows the initial Question Maintenance Screen 2600. The Question Maintenance Screen 2600 displays a summary of questions currently in the question repository. It also shows the question type. A new question may be added to the repository by depressing the Add button, or an existing question may be edited by pressing the Edit button.

If the Add button is depressed, a Question/Answer Maintenance Screen 2700 (FIG. 27) is displayed. The Question text box 2701 permits typing in a new question. The Question Type combo box 2702 allows selection of one of the question types. Depending upon the chosen question type, the Question/Answer Maintenance Screen 2700 (FIG. 27) displays additional controls which further define the answer choices. In all cases, the question answer prompt, Description of Choices 2703, is designed to capture a user-intended prompt.

FIG. 28a shows the Question/Answer Maintenance Screen—Answer List 2800 as it appears after the Question Type combo box 2702 has been used to select question type Multiple Choice Answers in Answer List 2704. FIG. 28b shows the Question/Answer Maintenance Screen—Multiple Choice Table 2820 as it appears after the Question Tyne combo box 2702 has been used to select Multiple Choice Answers in Table 2705. FIG. 28c shows the Question/Answer Maintenance Screen—Answer Range 2830 as it appears after the Question Type combo box 2702 has been used to select Range (answer must lie within boundaries) 2706.

FIG. 28a shows an Answer List subform where answers can be chosen from the answer repository using the answer-selection combo box 2801. FIG. 28b shows the Select Code Table combo box 2822 where one of the imported code tables can be selected, in this case a list of diagnosis codes from the fourth edition of the Diagnostic and Statistical Manual of Mental Disorders (DSM-IV) is selected, the Multiple Choice Answers in Table 2825 combo box selection highlights the type of ciuestion selected by the user. FIG. 28c shows From text box 2833 and To text box 2834 where the (inclusive) lower and upper bounds to the range-type (numeric) question are inputted.

Sub-process Maintain Assessment Instruments 313 is the part of the Assessment Instrument Maintenance Module where the Assessment Instruments 870 (FIG. 8) are maintained.

An assessment instrument, as defined earlier, is a form or questionnaire which contains questions. Some of the questions are independent of one another, and some are related to other questions. To accommodate this question-dependency, the concept of Instrument Question Group 910 (FIG. 9) is introduced, as shown in the Individual Assessment Conducted 900 data model. An Instrument Question Group 910 contains questions which are related, and the "relatedness" is important in the analysis of the answers. For example, a question group might be "History of Psych Evaluations". It contains a set of 4 questions: Date of assessment, diagnosis, treatment required? (Y/N), and date treatment completed. These questions are all related to a historical event, a "psychiatric evaluation." See FIG. 29a to see the Multiple Part Question Group maintenance screen 2900 where this question group is defined. The highlighted question group 2911 (top section of screen 2910) has the associated questions (bottom section of screen 2920). This is an example of a multi-question (or multi-part) question group.

Most question groups contain a single question, and are thus single-part (single-question) question groups. Most instruments contain single-part question groups.

To define an assessment instrument using the screen displayed in FIG. 29a, simply depress the Add Instrument 2901 button. Next, add question groups using the Add Instrument-Question Group 2912 button. The Add Instrument Question Group selection 3000 screen depicted in FIG. 30*a* asks whether the new question group is a Single-Part 3001 or Multi-Part 3002 question group. Also requested are the group Sequence # 3003 and a Multiple-Responses Allowed? flag 3004.

If a multi-part question group is chosen, an Add Multi-Part Question Group subform 3020 appears as seen in FIG. 30*b* which requests a Description of the multi-part question group 3005 and the Selection of questions 3006. Each question is to be selected from the set of questions in the question repository maintained in Maintain Questions 312. The number of questions per group is purely an interface issue and is not otherwise restricted by the database design. It can be contemplated that unlimited-question question groups can as easily be defined and maintained with some slight adjustment to the relevant screens. After the Multi-Part Question Group 3006 list is populated, the user selects the Save button 3008 and the entered Questions are saved.

Once the question group is saved, the Instrument Maintenance screen (FIG. 29*a*) returns. At this point, additional question groups may be added (Add Instrument-Question Group 2912) or deleted (Delete Instrument-Question Group 2913). Question groups can also be edited by adding (Add Instrument Question 2922) or deleting (Delete Instrument Question 2923) questions in the lower part of the Instrument Maintenance screen 2920. If Add Instrument Question 2922 is depressed, the Add Instrument Question form 3040 appears as seen in FIG. 30*c*.

Another attribute of an Assessment Instrument 870 (FIG. 8) is whether or not it is an aggregate-score instrument (see Aggregate Score? checkbox 2902 in FIG. 29*a*). Such an instrument must have only single-part question groups containing only questions that are of Range 2706 (FIG. 28*c*) question type. Since each Range-type question can only have numeric answers, and each question group has only one question, then each question group inherits the numeric "score" from its only "child" question. The assessment instrument, then, can have a cumulative or aggregate score which is the sum of the scores of its question groups.

See FIG. 31*a*. If an Assessment Instrument 870 (FIG. 8) qualifies according to the above criteria and is designated as an aggregate-score instrument, then it can have interpretations associated with its aggregate scores. The Assessment Instrument Maintenance screen with aggregate score intervals button 3100 is shown. If the Aggregate Score? check box 3102 is checked, a Score Intervals button 3105 becomes visible. Depressing this button brings up the dialog box 3110 (FIG. 31*b*). This dialog box permits entry of score intervals {Minimum Value 3111, Maximum Value 3112}, with associated Interpretation Text 3115. This screen effectively allows the aggregate score to be interpreted. This will be important when viewing assessment summary information in process Record Participation Information 240 (FIG. 3*d* and 35) and in process Collect and Aggregate Assessment Information 1210 (FIG. 12). The score intervals shown in FIG. 31*b* correspond to those defined in the sample Assessment Instrument 870 (FIG. 8), a LOSI Assessment Instrument sample is shown in FIG. 47*a*.

Once an Assessment Instrument 870 (FIG. 8) is defined in the Assessment-Instrument Maintenance Module, it may then be used to conduct an assessment (FIG. 35*c* shows a dialog box requesting the selection of a pre-defined Assessment Instrument 870). The process of conducting an assessment is described as sub-process Conduct Assessment 342 (FIG. 3*d*) of the process Record Participation Information 240 (FIG. 2) and will be discussed at length later.

The Program Maintenance Module

FIG. 3*b* is a decomposition of the Maintain Program Information process 220. The seven sub-processes represented by 321 through 327 describe a user interface that maintains program information. The corresponding data model focusing on Program Offerings 520 is shown in FIG. 7. These processes are thus briefly summarized below.

The Data Model for Program Offerings 700 shown in FIG. 7 defines the relationships among multiple types of data tables stored within the database 12, these relationships are also known as business rules. Specifically for a given Program Offering 520 there is a one to many relationship with a Program 510. A given Program 510 has a many to many relationship with Fund 760 that recognizes that a given flow of funds as provided by an Agency Funder 750 to support a program can come from multiple unique funding sources and may be used to fund multiple Programs 510 and Program Offerings 520. An Agency 730 can be either or both an Agency Provider 540, providing services, and an Agency Funder 750, providing funds for services. There are multiple Locations 720 where a given Program Offering 520 is offered. A specific Program Component or Service 710 provides 715, or is offered for use in a given Program Offering 520. An Individual 630 can be either or all, an Individual Participant 530, an Individual Provider 640, and/or an Individual Funder 650. An Individual Provider 640, can represent an individual case worker or other worker who can work in 725, or in other words provide services to multiple Program Offerings 520. When an Individual Provider 640 works in 725 a specific Program Offerings the Individual Provider 640 can play a specific service role with a defined start and possibly end dates. A given Agency Provider 540 can utilize, employ, or contract with an Individual Provider 640. An Individual Participant 530 is involved in one or more Participation 550 events in one or more Program Offerings 520. Each Program Offering 520 can have one or more Program Evaluations Conducted 590.

The purpose of the Maintain Program Attributes 321 interface is to provide a means of maintaining basic program information such as the program name, its mission, objectives, etc. Agencies play several roles relative to the operation of programs. The two primary roles are those of providers and funders. A particular agency may provide both of these roles simultaneously. Defining the basic attributes (e.g. name, address, employees, contacts, etc.) of any agency involved with programs is the object of Maintain Agency Information 322 process. If the agency is a provider, the Maintain Agency Provider Information 323 process is where this designation is defined. Programs that the agency provides could be defined in this process, but the preferred embodiment has chosen to maintain the many-to-many Agency Provider-to-Program relationship through the Maintain Program Offering Information 325 process.

Maintain Individual Provider Information 324 is where information about individuals who work in some capacity in a program's operation (also known as "workers") is captured. Name and contact information, service role, employing agency, etc. is defined.

Maintain Program Offering Information 325 is a sub-process of Maintain Program Information 220 process. One of the main business rules embodied in the present invention is: agency providers can provide many programs, and a program can be provided by many agency providers. The many-to-many relationship between agency providers and programs creates the need for a relationship (or entity) to decompose the many-to-many relationship into two one-to-many relationships. This new entity is referred to as Program Offering 520 (FIG. 5). The Program Participation Tracking Assessment and Evaluation data model 500 details the relationships between Program 510 and Agency Provider 540 and other datasets that populate a Program Offering 520. A Program 510 (FIG. 5) can have one or more Program Offerings 520. A Program Offering 520 has one Program 510 and one Agency Provider 540 (FIG. 5). An Agency Provider 540 can have one or more Program Offerings 520. See FIGS. 5 and 7 for additional detail.

Most "program" attributes are associated with Program Offering 520 instead of Program 510, because they can vary by offering. Some of these important attributes (aside from the associated Program and Agency Provider) are: dates of operation, contract info, budget info, funding info, workers, eligibility requirements, referral and other procedures, services offered, location of program offering. These are all maintained in the Maintain Program Offering Information 325 process.

Maintain Funding Information 326 is where funding information is maintained. This includes funds, funding accounts, associated funders, funding requirements and designations, funding amounts and purpose, etc.

A number of "domain"-type data items are needed to support the program offering and program definition. These include repositories of: program components (also known as services; interventions are considered program components as well), termination reasons, accounting codes, worker service roles, etc. The maintenance of this domain information is the object of process Maintain Other Program-related Information 327.

The seven sub-processes contribute to what is conceptually defined as data store Program Information 320 in FIG. 3b. This information is physically stored however, in the "Youth" implementation of the preferred embodiment (see FIG. 11), in many tables (e.g. tblProgram, tblAgency, tblProvider, tblProgramOffering, tblFund, domPgmComponents, domTermReasons, etc.) These tables align, not surprisingly, with the entities described in the Program Offering 520 data model of FIG. 7.

The Participant Maintenance Module

FIG. 3c is a slightly more detailed description of the Maintain Participant Information process 230. Like the Maintain Program Information process 220, it is an insignificant component of the present invention. The Maintain Participant Information 331 module enables a variety of information to be entered and updated in the Participant Information 330 table. The Individual Participant/Household data model 600 (FIG. 6), contains the assumed business rules related to Individuals 630, Individual Participants 530, and their Living Situation 670. The user interface describing how this participant information is maintained is not significant to this invention. An Individual Participant 530 is associated with Live With/Resides In 660 that possesses a number of different attributes including begin and end dates and circumstances as well as Household or Family Unit 670 attributes. An Individual Participant 530 also has the common attributes of Individuals 530, including, for example, name, sex, ethnicity, social security number, date of birth and other "individual" attributes. The Individual Participant 530 is involved in one or more Participation 550 events provided by one or more Program Offerings 520 with services provided by an Individual Provider 640. An Individual Provider 640, also has the same common attributes of an Individual 530, and provides services with both a specific Participation 550 event and associates with a Program Offering 520. Similarly, an Individual Funder 650 also has the common attributes of an Individual 630 and may fund either or both Program 510 or Program Offering 520.

The information maintained by this process is reflected conceptually in a single data store Participant Information 330, but, in the "Youth" implementation of the preferred embodiment, several tables are used to contain this information: tblYouth (the participant), tblFamMem, tblFamMemName, tblAddress, domLivingSituation, domParentalStatus, etc.

It can be contemplated that any number of tables could be used to represent Participant Information 330. For the purposes of this illustration, only two are used: tblYouth and tblFamMem, and assume that a single name, single address, and otherwise stable individual attributes reside in one of these two tables. See FIGS. 10 and 11 to see these relationships.

Note: The tblAddress and tblFamMemName were used to store multiples addresses and names, respectively, because the program environment was one in which the history of the individual's address (and alias names) was important in tracking the individual's participation. The choice to use these "hard-coded" additional tables could have been circumvented by using an assessment instrument with questions of: "addresses" and "names."

In general, assessment instruments are useful for capturing multiple longitudinal snapshots of any needed information. Any historical data can be easily maintained through the assessment activity. For example, a single- (or few-) question assessment instrument (e.g. "Address") could be developed to capture one or more data items (e.g. "Street Address", "City", "State").

In general, a good rule of thumb might be that the static characteristics of an individual (Sex, Race, DOB, SSN) or somewhat static characteristics which are fundamental (Name, Address) yet have no need of being tracked historically, can be attributes of the Individual Participant 530. Otherwise, it is useful to capture Individual Participant's characteristics via an Answered Question 925 during an Individual Assessment Conducted 570 (snapshot).

Record Participation Module

Though the focus of the Record Participation Module is on the process Record Participation Information 240, as depicted in FIG. 3d, it is helpful to refer to the corresponding section of the data model (FIG. 8, shown generally by numeral 800) that focuses on Individual Participation Activity 560. Frequent reference will be made to objects in FIG. 8.

FIG. 3d, shown generally by numeral 240, is a decomposition of the Record Participation Information process 240 into eight sub-processes 341 through 348. These are: Initiate Program Participation 341, Conduct Assessment 342, Log Worker Assignment Information 343, Contact Information 344, Log Service Receipt/Completion Information 345, Log Log Incident Information 346, Log Other Activity/Event Information 347, and Terminate Program Participation 348, respectively.

These processes maintain information in the data store Participation Information 340 (a subset of data store Database 12); information which relates to an Individual Participant's 530 Participation 550 in a Program Offering 520.

Note that data stores Program Information 320 and Participant Information 330 are used as input to all of the eight sub-processes. The data store Assessment-Instrument Definition Information 310, however, is used only for the particular sub-process Conduct Assessment 342. The information in the data store Assessment-Instrument Definition Information 310 provides the questions to be asked during the Conduct Assessment process 342.

In the specific implementation of the preferred embodiment, as documented in FIG. 11 (and higher), the Individual Participant 530 referred to in FIG. 10 (and lower) is specifically referred to as "Youth." FIG. 11 uses specific table and field names to implement the general entities and attributes, respectively, that are found in FIG. 10. For example, Individual Participant 530 of FIG. 10 corresponds to tblYouth 530' of FIG. 11. And Participation 550 of FIG. 10 corresponds to tblYouthiPgmPartic 550' of FIG. 11. The tblYouth 530' also links to a second table tblFamMem 1130' which is populated with Individual 630 attributes associated with a youth's family. Note the convention of using the "prime" notation to designate the embodiment of a general entity as a physical implementation of that entity, in this case, a "table."

In the preferred embodiment, the process of creating a Participation relationship 550 between an Individual Participant 530 and a Program Offering 520 is created from the Individual Participant's 530 side, i.e. from the "Youth's" side, vs. the Program Offering's 520 side.

For example, the Youth maintenance screen depicted in FIG. 32 and shown generally by numeral 3200, contains a Program Participation button 3201. Depressing this button enables Participations 550 to be created/edited/terminated for the particular youth whose record is displayed on the Youth maintenance screen 3200.

It can be contemplated that the Participation 550 records could be created/edited or deleted, as well, from the Program Offering's 520 side. In fact, many "program roster" type reports present this "view" of the many-to-many relationship Participation 550 that exists between Individual Participant 530 and Program Offering 520.

In the "Youth" implementation of the preferred embodiment, as described above, the Program Participation button 3201 on the Youth maintenance screen 3200 is the gateway to the Record Participation Information process 240, i.e. the means of initiating each of the eight processes (341 through 348) shown in FIG. 3d.

Each of the eight processes is a user-interface that maintains information in the data store Participation Information 340. Associated exemplary screens drawn from the "Youth" implementation of the preferred embodiment will be used to describe these eight processes. The sample screens are invoked from the Youth Program Participation screen displayed in FIG. 33a, shown generally by numeral 3300. And the Youth Program Participation screen 3300 is invoked from the Program Participation button 3201 of the Youth maintenance screen 3200.

Youth Program Participation Screen

The Youth Program Participation screen 3300 shows a summary listing of all of the Program Offerings 320 in which the target youth, whose name is shown in the Name text boxes 3310, is currently participating or has participated. This list of Participations 550 is shown in the Participation Summary subform 3320. The left-most boxes of the Participation 550 records, referred to as Participation Record Selectors 3325, are used to select a particular Participation 550. The bottom left section of the screen, the Program Participation Activity section 3340, contains a number of buttons—3342 through 3348—which invoke the processes 342 through 348, respectively, shown in FIG. 3d. For example, the Workers button 3343 invokes the Log Worker Assignment Information process 343. And the Log Worker Assignment Information process 343 is responsible for capturing the Worker Associated activity 820 (FIG. 8).

In the upper right-hand corner of the Youth Program Participation screen 3300 is another button, Program Initiation/Activity 3341. This button invokes the Initiate Program Participation process 341 of FIG. 3d. Finally, two buttons in the Reports section of the screen, Pgm Activity Summary 3350 and Assessment Summary 3360, invoke two summary reports. When the Pam Activity Summary 3350 button is selected, a Youth Program Activity Summary 4250 (FIG. 42b) is generated for the Individual Participant 530. Other buttons may be incorporated in the Youth Program Participation screen 3300, including, for example, a button to generate the Youth Program Participation Summary 3380 (FIG. 33b) with Participation 550 event information for Individual Participants 530, including start-end dates, termination reasons, Program Offerings 520 and Agency Provider 540 details.

Initiate Program Participation Process

The New Program Activity screen, depicted in FIG. 34a and shown generally by numeral 3400, is the user interface associated with the process Initiate Program Participation 341. Depressing the Program Initiation/Activity button 3341 on the Youth Program Participation screen 3300 opens this New Program Activity screen 3400.

The New Program Activity screen 3400 permits the selection of a Program Offering 520 via the Select Program Offering combo box 3401. New Activity Type 3402 combo box provides the means to select a particular Activity Type 580. In this preferred embodiment, an assumption is made that only pre-initiation- and initiation Activity Types 580 are available for selection. Pre-initiation activities include activities like "was referred to", "was accepted into" and "was denied acceptance into." The initiation Activity Type 580 "PARTICIPATION BEGAN" creates a new Participation 550 record (i.e. a new record in the tblYouthPgmPartic table 550'). Multiple pre-initiation activities may be logged, each having an activity date. An Activity list box 3405 displays these pre-initiation activities. Importantly, the date of the activity must be entered into the Date of Activity text box 3404.

Once the initiation activity (i.e. Activity Type 580="PARTICIPATION BEGAN") is posted (i.e. the OK button is depressed), control returns to the Youth Program Participation screen 3450 shown in FIG. 34b. This screen 3450 differs from 3300 in that it contains a new Participation 550 record 3460 in its Participation Summary subform 3470.

Once a Participation 550 is created by the Initiate Program Participation process 341, an Individual Participation Activity 560 can be associated with that Participation 550.

Individual Participation Activities

To log Individual Participation Activities 560, first, select the appropriate Participation 550 record using the Participation Summary Record Selector 3320 on the Youth Program Participation screen 3300. Then depress one of the buttons in the Program Participation Activity section 3340. In the specific implementation of the preferred embodiment, there are five Major Activity 860 (also known as Major Event) buttons—Assessments 3342, Workers 3343, Contacts 3344, Components 3345, and Incidents 3346—and a Miscellaneous Activity button 3347 to log Minor Activities 850.

FIG. 8 depicts the five Major Activities 860—Individual Assessment Conducted 570, Worker Associated 820, Contact Made 875, Service Received 810 and Incident Occurred 845—corresponding to the five Major Activity 860 buttons:

3342 through 3346 on the Youth Program Participation screen 3300, respectively. These five Major Activities 860 are those requested by the client for whom the "Youth" implementation of the preferred embodiment was developed. It is contemplated that other Major Activities 860 could be readily defined as well. Some examples of additional Major Activities 860 are shown in FIG. 8 as: Service Plan Developed 830, Referral Made 840, Award Received 855 and Goods Received 865.

The difference between Major Activities 860 and Minor Activities 850 relates to the number and quality of activity-specific attributes that need to be stored and reported on, and thus the need for activity-specific database structures to hold those data items. Each Major Activity 860 has a special table (e.g. tblYouthPgmParticAsst, tblYouthPgmParticWorker, tblYouthPgmParticContact, etc.) to hold data items which further qualify the activity (beyond Activity Type 580 and date of activity). Expanding/extending the set of five Major Activities 860 beyond those found in the "Youth" implementation of the preferred embodiment would require only minor database and functional modifications.

Minor Activities 850 can be defined by the user in a Miscellaneous-Data interface in the "Youth" implementation of the preferred embodiment. In that system, Activity Types 580 are stored in the table domActivityType. Once an activity type is recorded in the domActivityType table, it can then be selected as a Minor Activity 850. The procedure for logging Minor Activities 850 will be discussed after the processes for logging Major Activities 860 are described.

Logging Major Activities

The most complex Major Activity 860 type is that of Individual Assessment Conducted 570 (in FIG. 8). Thus the process, conduct assessment 342 (in FIG. 3d). for logging this Activity Type 580, is discussed first. As shown in the Individual Participation Activity data model 800, there is an Individual Provider 640. An Individual Provider 640 can work in 725, or provide services for, and be someone who 825 works on and becomes a Worker Associated with 820 a given Major Activity 860. The embodiment depicted herein describes a set of five Major Activities 860, such as Individual Assessment Conducted 570, Worker Associated 820, Contact Made 875, Service Received 810, and Incident Occurred 845. In alternative embodiments, Other Major Activities 885, can be included. Some examples of an Other Major Activity 885 are: Service Plan Developed 830, Referral Made 840, Award Received 855, Goods Received 865, Contract Made 875, and other Individual Participation Activities 560. A General Instrument/Form 890, of which an Assessment Instrument 870 is a specific type therefore, can be predefined or used to capture information for Referral Made 840, Service Plan Developed 830, or more generally Individual Participation Activities 560.

Conducting an Assessment

The process Conduct Assessment 342 is invoked from the Youth Program Participation screen 3300 by, first, selecting the target Participation 550 (using the Participation Record Selector 3325 in FIG. 33a) and then, pressing the Assessment button 3342. The resulting Youth Program Participation—Assessments screen, depicted in FIG. 35a and shown generally as numeral 3500, will open.

This Youth Program Participation—Assessments screen 3500 shows all of the Individual Assessments Conducted 570 for the target Participation 550 in an Assessment Summary list box 3530. At the top of the Youth Program Participation—Assessment screen 3500, identifying information about the Individual Participant 530, or Youth 530' name, is provided, such as the Name 3510. Identifying information about the specific Program Offering 520 in which the Individual Assessment Conducted 570 is shown in the Assessment Summary list box 3530 pertains is provided in the Program Name box 3520. For each Individual Assessment Conducted 570, the following data items are shown: Interview Date 3531, Assessment Instrument name 3532, Caseworker in charge of the interview/assessment 3533, and, if relevant, an Aggregate Score 3534, with corresponding Score Interpretation 3535. An Assessment Summary report 3545, invoked by the Assessment Summary button 3540, is shown in FIG. 35b. Pressing the Assessment Detail button 3580 invokes a new screen for an Assessment Detail report 3585 for the selected Individual Assessment Conducted 570. shown in FIG. 35d.

The Add 3550, View/Edit 3560, and Delete 3570 buttons on screen 3500 are used to add, view/edit, or delete an Individual Assessments Conducted 570 activity, respectively. Depressing the Add button 3550, opens the Add New Assessment screen depicted in FIG. 35c and shown generally as numeral 3555. Screen 3555 contains an Instrument combo box 3556, from which an Assessment Instrument 870 must be selected. Also requested are the caseworker and interview date (i.e. date of assessment). Posting the information creates an Individual Assessment Conducted 570 activity, implemented in the "Youth" implementation of the preferred embodiment, as a new record in tblYouthPgmParticAsst 570' (in FIG. 11). Also, as with all Individual Participation Activities 560, a new record is also added to tblYouthPgmActivity 560' (FIG. 11). The Youth Program Participation—Assessment screen 3500 is again displayed, now showing a new Assessment record in the Assessment Summary list box 3530.

Answering Assessment Questions

The View/Edit 3560 button is used to open the Conduct Assessment Interview screen found in FIG. 36a and shown generally as numeral 3600. Beneath the header section, which contains the name of the Assessment Instrument 870, the Youth 530' name, the interview date and the caseworker name, there are three additional sections: a Question Group section 3610, a Question section 3620, and an Answer section 3630.

Sections Question Group 3610 and Question 3620 are linked in that, for the selected Instrument Question Group 910 (FIG. 9) in the Question Group section 3610 (noted by the presence of a triangle in the Question Group Record Selector 3611), the associated Instrument Question(s) 920 is (are) displayed in the Question section 3620. This association between an Instrument Question Group 910 and Instrument Questions 920 was defined in Maintain Assessment Instrument process 313 (FIG. 3a) described earlier. This relationship is also depicted in FIG. 9.

In the Question Group section 3610, there are two buttons to the right of the list of Instrument Question Groups 910—an Add Answer button 3612 and a Delete Answer button 3613. These buttons are visible only when relevant—e.g. the Delete Answer button 3613 is not visible if there is no answer yet supplied.

In the Question section 3620, there is an Answer/Edit Question button 3622 on the right-hand side of the screen. This button provides the means to define Answer Sets 3739. For a given Instrument Question Group 910 having a set of associated Instrument Questions 920, a single-response set of answers for each of those questions is called an Answer Set.

In the preferred embodiment, the relationship between the Question section 3620 and the Answer section 3630 is somewhat different than the relationship between the Question Group section 3610 and the Question section 3620. For each Instrument Question 920 (with index #'s from 1 up to 5, determined from the relative Instrument Question 920 sequence #), there is a hard-programmed column in the Answer section 3630 which corresponds to the target Instrument Question 920 (as selected by the Instrument Question Record Selector 3621). For example, the Instrument Question 920 which has an index # of 3 (i.e. is the $3^{rd}$ Instrument Question 920 corresponding to the target Instrument Question Group 910), will have its corresponding Answer 960 in the $3^{rd}$ position in the Answer Set 3639 of the Answer section 3630.

Each row in the Answer section 3630 corresponds to an Answer Set 3639. The presence of multiple rows implies that there are multiple Answer Sets 3639 associated with the target Instrument Question Group 910 (i.e. as selected by the Question Group Record Selector 3611). An Instrument Question Group 910 is eligible to have multiple Answer Sets if its Multi-Response checkbox 3614 is checked. Otherwise, the Instrument Question Group 910 can only have a single Answer Set 3639 (i.e. a single row of answers).

The particular interface was designed to record multiple instances of multi-part answers to multi-part questions in a manner that was intuitive to a user, that would require as few keystrokes as possible, and would display an appropriate amount of data on a single screen. It is contemplated that improved interfaces can be readily developed that would implement the flexible assessment data model, yet be more user-friendly. The development of multiple interfaces (e.g. one for single-response/single-part instruments, another for single-response/multi-part instruments etc.) may be an attractive approach.

The Conduct Assessment process 342 will be illustrated by two examples using exemplary screens from the "Youth" implementation of the preferred embodiment. The first example, (I), assumes an Assessment Instrument 870 which is NOT an Aggregate-Score instrument and contains at least one Multi-Response Instrument Question Group 910. It is illustrated by the screens shown in FIGS. 36a, b, c and d. This example is further divided into two scenarios: a) a multi-response and multi-part scenario, and b) a single-response and single-part scenario. The second example, (II), assumes an Assessment Instrument 870 which is an Aggregate Score instrument containing no Multi-Response Instrument Question Groups 910. Furthermore, each Instrument Question Group 910 is a Single-Part (i.e. has only one associated Instrument Question 920.) This example is reflected in screens shown in FIGS. 37a and b.

EXAMPLE I

Non-Aggregate-Score Assessment Instrument a) Multi-Response/Multi-Part Instrument Question Group "History of Psych Eval Assessments"

1) Refer to screen 3600 in FIG. 36a. In the Question Group section 3610, select the Instrument Question Group 910 named "History of Psych Eval Assessments" (Note that this Instrument Question Group's 910 Multi-Response checkbox 3614 is checked. It can thus have multiple responses, i.e. multiple Answer Sets 3639. This Instrument Question Group 910 is also associated with multiple Instrument Questions 920, shown in the Question section 3620.

2) Depress the Add Answer button 3612 (to add the first "empty" Answer Set 3639).

3) Next, in the Question section 3620, select the desired Instrument Question 920 to be answered.

4) Select, for example, the "History of Psych Eval Assessments—Diagnosis", the $2^{nd}$ Instrument Question 920, as defined by its relative sequence #.

5) Now depress the Answer/Edit Question button 3622. This action will open the Answer Question dialog box illustrated in FIG. 36b and shown generally by numeral 3650.

6) The Answer control 3652 in the AnswerQuestion dialog box 3650 is customized to handle the Question Type 931 associated with the selected Instrument Question 920. In this example, the Answer control 3652 is a combo box whose record source is the table whose name, "domDSMIV", was pre-specified in the Maintain Questions process 312, as the "domain" of answers for the Instrument Question 920="History of Psych Eval Assessments—Diagnosis."

7) In addition to the Answer control 3652, the dialog box 3650 also contains three read-only text boxes whose values have been pre-defined (in the Maintain Question process 312 described earlier.) The first, labeled Question 3651, contains the question description "History of Psych Eval Assessments—Diagnosis." The second read-only text box, labeled Choices 3653, displays the question prompt "DSM-IV code." (This too, was pre-defined in the Maintain Question process 312.) Finally, the last read-only text box, shown in the lower part of the dialog box and numbered 3654, displays the Question Type 931. In this example, the Question Type 931 is "Multiple Choice Answers in Table." (See FIG. 28b the screen that assigned this Question Type 931 to the Question 930="History of Psych Eval Assessments—Diagnosis."

8) After selecting a particular diagnosis code, in this example, "Acute Stress Disorder" 3658, depress the OK button to save the answer as the 2.sup.nd component of the 4-component Answer Set 3639. In particular, the "Acute Stress Disorder" 3658 is saved in the control 3632. In a similar fashion, the answers corresponding to the other Instrument Questions 920, shown in the Question Section 3620, are saved in the matching components of the Answer Set 3639. For example, the first Instrument Question 920 item is saved in the first control 3631, the third Instrument Question 920 item answer is saved in the third control 3633, and the fourth Question item answer is similarly saved in the fourth control 3634.

9) Repeat the "answer question" process for each of the four Instrument Questions 920 associated with the "History of Psych Eval Assessments" Instrument Question Group 910.

10) To add a second response to this multi-response Instrument Question Group 910, depress the Add Answer button 3612 a second time. This will add a second "empty" Answer Set 3639 for each of the four Instrument Questions 920. FIG. 36c shows the two separate Answer Sets 3639 in the multi-response Answer Set 3665. The first control 3667 in the multi-response Answer Set 3665 details the two date-type answers for the Pysch Eval Assessments, March/1999 and June/1999 respectively as defined by the Answer Dialog Box—Date Format 3640. The Answer Dialog Box—Date Format 3640 includes the name of the Instrument Question 3641, the Date Answer 3642, as well as the date format information 3644 and the desired selection choices 3643. The second control 3668 similarly details the respective diagnosis made by the worker providing the diagnosis associated with the Question "History of Psych Eval Assessments—Diagnosis" as defined by the Multi-Choice table format dialog box 3650.

11) The Conduct Assessment Interview screen displayed in FIG. 36c and shown generally by numeral 3660, shows the resulting answers to the "History of Psych Eval Assessments" Instrument Question Group 910.

b) Single-Response/Single-Part Instrument Question Group "Current School Attendance . . . "

1) Refer to screen 3670 in FIG. 36d. In the Question Group section 3671, select the Instrument Question Group 910 named "Current School Attendance Status . . ." (Note that this Instrument Question Group's 910 Multi-Response checkbox 3674 is NOT checked. It can thus have one response, i.e. one Answer Set 3679. This Instrument Question Group 910 is associated with a single Instrument Question 920 having the same name as the Instrument Question Group 910 designated by 3675, i.e. "Current School Attendance . . . ")

2) Depress the Add Answer button 3672 (to add an "empty" Answer Set 3679). Next, in the Question section 3677, select the desired Instrument Question 920 to be answered. Since this is a Single-Part Instrument Question Group 910, there is no need to select an Instrument Question 920. There is only one question, and it is "Current School Attendance Status (less than 10 is Satisfactory)." By default, it is "selected."

3) Depress the Answer/Edit Question button 3676. This action will open the Answer Question dialog box illustrated in FIG. 36e, and shown generally by numeral 3680.

4) The Answer control 3682 in the AnswerQuestion dialog box 3680 is customized to handle the particular Question Type 931 associated with the selected Instrument Question 920. In this example, the Answer control 3682 is a combo box whose record source is the set of answers (i.e. the Answer Repository) pre-defined in the Maintain Questions process 312.

5) In addition to the Answer control 3682, the dialog box 3680 also contains three read-only text boxes whose values have been pre-defined (in the Maintain Question 312 process described earlier.) The first, labeled Question 3681, contains the question description, in this case "Current School Attendance Status (less than 10 is Satisfactory)." The second read-only text box, labeled Choices 3683, displays the question prompt, in this case: Satisfactory/Unsatisfactory/Non Applicable (i.e. not in school)." (This too, was pre-defined in the Maintain Question 312 process.) Finally, the last read-only text box, shown in the lower part of the dialog box and numbered 3684, displays the Question Type 931. In this example, the Question Type 931 is "Multiple Choice Answers in Answer List." (See FIG. 28a, the screen that assigned this Question Type 931 to the Question 930="Current School Attend . . . ")

EXAMPLE II

Aggregate-Score Assessment Instrument with Single-Response/Single-Part Instrument Question Groups Refer to screen 3700 in FIG. 37a.

1) In the Question Group section 3710 (FIG. 37a), select the Instrument Question Group 910 named "LOSI Attitudes/Orientation" 3711 This Instrument Question Group 910 is associated with a single Instrument Question 920 having the same name as the selected Instrument Question Group 910, i.e. "LOSI Attitudes/Orientation" 3711. The Question Group section 3710, similar to the previous example, also has a column Question Group Description 3715 and a multi-response selector 3716 to make a particular Instrument Question Group 910 a multi-response question.

2) Depressing the Delete Answer button 3719 will delete all answer sets 3730 in the answer section for the selected Instrument Group Question 910. Depress the Add Answer button 3712 (to add an "empty" Answer Set 3730 with a single control 3738). Next, in the Question section 3720, select the desired Instrument Question 920 to be answered (identified by the Instrument Question Record Selector 3721). Since this is a Single-Part Instrument Question Group 910, there is no need to select an Instrument Question 920. There is only one Instrument Question 920, and it is "LOSI Attitudes/Orientation" as shown in the ciuestion description 3725, with a Question Type 931="Range (answer must lie within range boundaries)". By default, it is "selected" and has a sequence number order 3721 of 1.

3) Depress the Answer/Edit Question button 3722. This action will open the Answer Question dialog box illustrated in FIG. 37c, and shown generally by numeral 3750. The Answer control 3758 in the Answer Question dialog box 3750 is customized to handle the particular Question Type 931 associated with the selected Instrument Question 920. In this example, the Answer control 3758 is a text box having validation procedures which ensure that the numeric answer supplied does indeed fall between the two range boundaries, inclusive.

4) In addition to the Answer control 3758, the dialog box 3750 also contains three read-only text boxes whose values have been pre-defined (in the Maintain Question process 312 described earlier.) The first, labeled Question 3755, contains the question description, in this case "LOSI Attitudes/Orientation." The second read-only text box, labeled Choices 3753, displays the question prompt as shown 0 to 5 or alternatively "From 0 to 5 (Low=0; Moderate=1 to 2; High=3 to 5)" (This, too, was pre-defined in the Maintain Question process 312.) Finally, the last read-only text box, shown in the lower part of the dialog box and numbered 3754, displays the Question Type 931. In this example, the Question Type 931="Range (answer must lie within range boundaries)". (See FIG. 28c the screen that assigned this Question Type 931 to the "LOCI Substance Abuse" Question 930.

Deleting Assessment Answers

Deleting the answers for an Instrument Question Group 910 is accomplished from the Conduct Assessment Interview screen 3600 by, first, selecting the Instrument Question Group 3611, and then depressing the Delete Answer button 3613. This will delete all Answer Sets in the Answer section 3630 for the selected Instrument Question Group 910.

When the Assessment Interview is completed, depress the exit button to return to Youth Program Participation—Assessments screen 3500. An Assessment record for the Assessment just conducted should be visible in the Assessment Summary subform 3550.

Logging Other Major Activities

The second Major Activity of Record Participation Information 240 is that of Log Worker Assignment Information 343. The user interface for this process is shown by the exemplary Youth Program Participation-Workers screen displayed in FIG. 38a, and generally shown by numeral 3800. This screen is invoked from the Youth Program Participation screen 3300, by, first selecting a particular Participation 550, and then, by pressing the Workers button 3343. This screen shows, for the Participation 550 selected from screen 3300, the set of associated workers. These workers are listed, one per record, in the Worker List section 3810 of screen 3800, and correspond to Worker Association 820 activities. For each Worker Association 820, a record shows the worker name, start date, end date, service role, termination, phone number and notes. It can be contemplated that additional worker-specific attributes could be added to those listed above.

To add a new Worker Association 820 activity, it is necessary to depress the Add button 3820. This will add new records to the generic tblYouthPgmActivity 560' table and to the activity-specific tblYouthPgmParticWorker table 820'.

A second View/Edit Program Workers screen, depicted by FIG. 38b and shown generally by numeral 3850, displays some additional detail about the selected worker and provides a better interface for entry of notes. This screen is invoked from the Youth Program Participation-Workers screen 3800, by, first selecting a particular Worker Association record 820 from the Worker List section 3810, and then depressing the View/Edit button 3830. Though there is little additional information on screen 3850 than that shown in screen 3800, it can be contemplated that, when more Worker Association 820 attributes are required, the need to have a second "detailed" screen such as screen 3850 may be greater.

Depending upon the business rules required, the set of workers from which to choose when establishing a Worker Association 820, may, or may not be filtered by, say, a rule requiring the worker to be employed by the Agency which is the Agency Provider 540 of the Program Offering 520 of the Participation 550.

The third Major Activity of Record Participation Information 240 is that of Log Contact Information 345. The user interface for this process is shown by the exemplary Youth Program Participation—Contacts screen displayed in FIG. 39a, and generally shown by numeral 3900. This screen is invoked from the Youth Program Participation screen 3300, by first selecting a particular Participation 550, and then, by pressing the Contacts button 3344. This screen shows, for the Participation 550 selected from screen 3300, the set of contacts made.

The general functioning of the Log Contact Information process 344 is similar to that described for the Log Worker Information process 343 above. There are two screens, a summary-listing-level screen, in this case, screen 3900, and a detailed single-record screen, in this case, screen 3950 (shown in FIG. 39b).

The fourth Major Activity of Record Participation Information 240 is that of Log Service Receipt/Completion Information 345. The general functioning of the Log Service Receipt/Completion Information process 345 is similar to that described for the Log Worker Information process 343 above. There are two screens, a summary-listing-level screen, in this case, screen 4000 (FIG. 40), and a detailed single-record screen, in this case is not shown.

One important note to make about the Program Component selection combo box is that the record source of the combo box contains only those records (i.e. program components) which have previously been defined as "offered" by the Program Offering 820 in the Maintain Program Information process.

The fifth Major Activity of Record Participation Information 240 is that of Log Incident Information 346. The general functioning of the Log Incident Information process 346 is similar to that described for the Log Worker Information process 343 above. There are two screens, a summary-listing-level screen, in this case, screen 4100 (FIG. 41a), and a detailed single-record screen, in this case, 4150 (FIG. 41b).

Minor Activities

Minor Activities 850 are logged by depressing the Miscellaneous Activity button 3347 on the Youth Program Participation screen 3300. The Program Activity screen illustrated in FIG. 42a and generally shown as numeral 4200 appears. It shows a summary of all activity logged to date (Activity Summary list box 4201) for the Youth 530' whose name appears in the upper right hand corner of the screen 4202 relative to the Participation 550 in the Program Offering 520 shown in the read-only Program Name text box 4203. It also provides the opportunity to log additional Individual Participation Activity 560 using the New Activity Type combo box 4204 and the Date of Activity text box 4205. Activity Notes 4206 can be captured as well. The Program Activity screen 4200 is very similar to the New Program Activity screen 3400.

A report-version of the activity-summary information found on the Program Activity screen 4200 is shown in FIG. 42b, generally shown by numeral 4250. It is invoked from the PgmActivity Summary button 3350 of the Youth Program Participation screen 3300.

Program Participation Termination

Refer again to the Youth Program Participation screen 3300. When a Participation 550 is to be terminated, it must first be selected by clicking the Participation record selector 3325 to the left of the appropnate non-terminated Participation 550 record. (Note: Non-terminated Participation 550 records are those with neither an End Date nor Termination Reason.)

Figure 43:
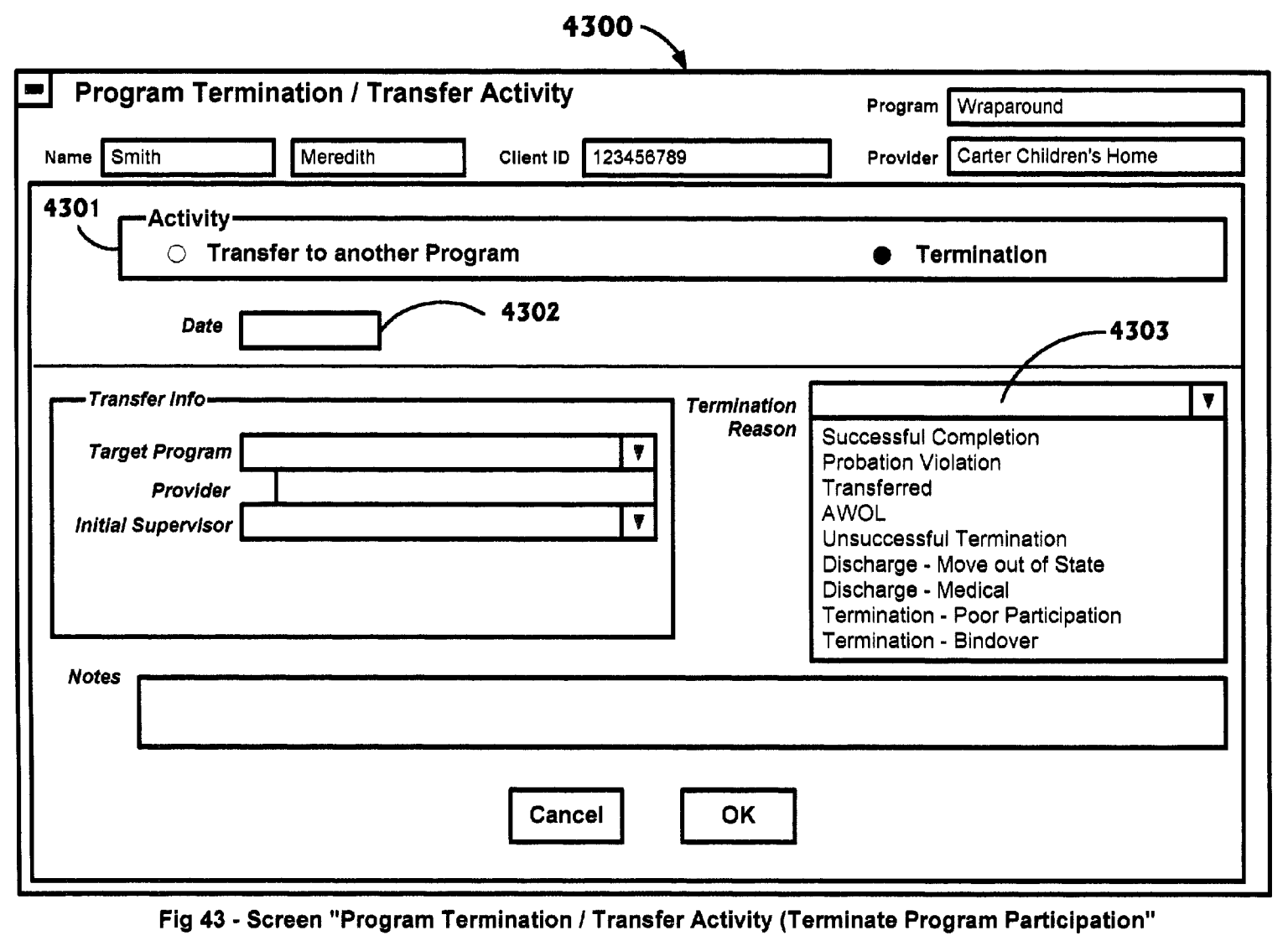

Depressing the Program Termination/Transfer button 3348 brings up the Program Termination/Transfer Activity screen of FIG. 43, generally shown by numeral 4300. In the "Youth" implementation of the preferred embodiment, the option to transfer from one Program Offering 520 to another was accomplished through the Transfer/Terminate buttons 4301, thus abbreviating the process of ending one Program Offering 520 and beginning another. The termination date and termination reason are required input to the Date of Termination 4302 text box and the Termination Reason 4303 combo box. These "boundary" attributes of the Participation 550 are critical for program-evaluation purposes. This will be illustrated in the Program Evaluation Module which follows.

Program Evaluation Module

FIG. 3e, shown generally by numeral 250, shows a decomposition of the Prepare and Output Reports process 250 of FIG. 2 into two sub-processes, Prepare & Output Participant Information 351 and Prepare & Output Program Information 352. The output of each of the Prepare & Output Participant Information 351 and Prepare & Output Program Information 352 are stored in Participant Reports 361 and Program Reports 362 respectively. A sub-process of the latter, namely the Assess/Evaluate Program Effectiveness process 410, is shown in FIG. 4 and is of relevance to the present invention. While the Assess/Evaluate Program Effectiveness process is described in conjunction with the other four modules above, it is contemplated that this module can be employed to assess programs based on assessment information collected using processes other than those described above. FIG. 4, shown generally by numeral 400, shows the input data stores to the process Assess/Evaluate Program Effectiveness 410: Assessment-Instrument Definition Information 310, Program Information 320, Participant Information 330 and Participation Information 340. The two most relevant data stores to the present invention are the Assessment-Instrument Definition Information 310 and the Participation Information 340. Two other processes, Prepare and Output Program Roster Information 420 and Prepare and Output Program Profile Information 430, operate in the same position and with the same information as the Assess/Evaluation Program Effectiveness 410 process. The output of all three of these processes output specific program evaluation information in response to user Queries to populate Program Evaluation Reports 440.

Though the focus of the Program Evaluation Module is on the process Assess/Evaluate Program Effectiveness 410, depicted in FIG. 4, and its sub-processes, shown in FIGS. 12 through 18, it is helpful to refer to the corresponding sections of the data model. FIGS. 10 and 11, shown generally by numerals 1000 and 1100, respectively. These segments of the overall data model focus on how assessments and program participation activity can be used to evaluate program effectiveness.

FIG. 10 shows the conceptual entities, relationships and attributes most directly involved in generating program-evaluation information from Participation 550, Individual Participation Activity 560, and Individual Assessments Conducted 570. This data model clearly shows how the database might be navigated to search for basic program evaluation information. Notice the path between the Program Evaluation Conducted 590 and the Individual Assessment Conducted 570. Entities 550, 560, 860, 570, 915 and 925 are classified as belonging to the data store Participation Information 340. Entities 870, 970, 920 and 930 would belong to the data store Assessment-Instrument Definition Information 310.

FIG. 11 mirrors FIG. 10, but uses specific objects in the "Youth" implementation (namely tables and fields) instead of the more abstract objects of FIG. 10. The data model segments in FIGS. 19 through 24, shown generally by numerals 1900 through 2400, respectively, describe how queries might navigate through the data model to measure several exemplary program outcome indicators.

In addition to the stored information from the four data stores, it is assumed that a user directing the Assess/Evaluation Program Effectiveness 410 may want to specify parameters qualifying the analysis. For example, the user may want to specify which Program 510 or Program Offering 520 is to be analyzed. The evaluation period should also be specified by the user. Other parameters might be the type of evaluation (e.g. "compare first and last assessments", "use only the last assessment", "use only assessments conducted 6 months after beginning program", "use only the last assessments conducted after completion of program", etc.), Individual Participant 530 attributes (e.g. race, sex, etc.) or other factors, Assessment parameters (Assessment Instrument 870 to use, Instrument Question(s) 920 to use, outcome indicators, targets, type of comparison, etc.), and type of output (e.g. report, file, graphic format, summary/detail, etc.) FIGS. 44 through 46, shown generally by numeral 4400 through 4600, respectively, show sample screens that solicit these parameters and invoke some "reports."

A Program Offering Evaluation Screen 4400 (FIG. 44) provides an example of one program report generation screen. The Program Offering Evaluation Screen 4400 has text box 4410 that indicates which Program Offering 520 and Individual Provider 540 are included in the report to be generated. A Question selection 4415, in this case Current High School Attendance Status 4420 provides the type of information to be Queried. An Evaluation Scenario combo box 4430 indicates which assessments to use in order to construct the report. Finally a Type of Output combo box 4440 enables the user to select the type of output to be generated. A alternative Program Offering Evaluation Screen 4500 with an alternative Evaluation Scenario 4530 and alternative Type of Output 4560 is shown in FIG. 45. In the case of the alternative Program Offering Evaluation Screen 4500, the alternative Evaluation Scenario 4530 is the last assessment (i.e. most recent) after the Individual Participant 530 has started Participation 550 and the Program Offering 520 has started. The alternative Type of Output 4560 output requested on the alternative Program Offering Evaluation Screen 4500 is a pie chart with demographic breakdown.

Program Evaluation Example

For the purpose of illustrating how the present embodiment could support program evaluation, the following scenario is presented. The scenario is set in the context of the "Youth" implementation of the preferred embodiment. It assumes that the database is that depicted in data model 1100 of FIG. 11. (Specific table names from FIG. 11 will be referenced in the sub-process of Assess/Evaluate Program Effectiveness process 410 as they are described in FIGS. 12 through 18.)

The following evaluation assumptions apply. Assume that a particular Program Offering 920 is to be evaluated. In the sample, the Program Name is "Intensive Probation", and the Program Provider is "Lorain County Domestic Relations Court". Two program outcome indicators are to be used.

Assume the first indicator is the youth's school attendance. In the context of the present invention, this indicator can be measured by examining answers to the Instrument Question 920 whose description is "Current School Attendance Status (less than 10 is Satisfactory)".

The second indicator is a surrogate measure of youth needs and risk based upon eight questions. The sample Assessment Instrument 870 shown in FIG. 47 shows precisely the questions, as well as the aggregate-score interpretations. The name of this Assessment Instrument is "LOSI Assessment of Risks and Needs."

For youth participating in the Program Offering 920, consider only those youth which were assessed twice: once at the beginning of the Participation 550 and once later on. Assume that the date of the second assessment is not relevant except that it must be conducted after the first. Assume also that the second assessment need not occur while the youth was participating in the Program Offering 920; it could have been conducted after the Participation 550 ended.

First Indicator Instrument Question-based—"School Attendance"

For all youth participating in the program, document the first-assessment question answer relative to the last-assessment question answer. Present the results in each of the following output formats:
1. Look at the "before and after" answers, including demographic information, in tabular form. (See FIG. 44: 4430 and 4440)

2. Look at the "before and after" answers, including demographic information, in extract file output form . . . (See FIG. 44: 4430 and 4450) The purpose of have the extract-file format is to be able to utilize more sophisticated analysis tools such as SPSS or SAS. The extract file would be used as input into the analysis tool.
3. Look only at the most recent answers by race, in pie-chart form. (See FIG. 45: 4530 and 4560)

Second Indicator Assessment Instrument-Based—"LOSI" Surrogate Score

For all youth participating in the program, analyze the first-assessment scores relative to the last-assessment scores to determine how those scores changed. To do this analysis a report generation screen is used as shown in the Aggregate Program Offering Evaluation Screen 4600 in FIG. 46. The Aggregate Program Offering Evaluation Screen 4600 has text box 4610 that indicates which Program Offering 520 and Individual Provider 540 are included in the report to be generated. An Instrument selection 4615. in this case LOST Assessment of Risks and Needs 4620 provides the type of information to be queried which in this case is an aggregate score. An Evaluation Scenario combo box 4630 indicates which assessment to use in order to construct the report. Finally a Type of Output combo box 4690 enables the user to select the type of output to be generated, which in this case is a bar chart that reflects the score change of the aggregate score graphed as a bar chart.

Present the results in each of the following output formats:
1. Look at the "before and after" scores, including demographic information, in tabular form. (See FIG. 46: 4630 and 4640)
2. Look at the "before and after" scores, including demographic information, in extract file output form. (See FIG. 46: 4630 and 4650)
3. Look at the change in scores between the first and last assessments. Show in bar-chart form. (See FIG. 46: 4630 and 4690)

Assess/Evaluate Program Effectiveness Process Decomposition

FIG. 12, shown generally by numeral 1200, decomposes the Assess/Evaluate Program Effectiveness into two sub-processes: Collect and Aggregate Assessment Information 1210 and Present Program Evaluation Information 1220. There are three parameters shown: PgmOffer ID 1201, QuestTD 1202 and InstiD 1203. In addition, four specific tables are shown as intermediary tables: tblEvalFirst-LastAssts 1211, tblEvalAsstAnswers 1212, tblEvalFirst-LastAsstsWithAnwersScores 1213 and tblEvalDemogFirst-LastAsstsWithAnswersScores 1214. The fields within these tables are shown in FIGS. 14 through 19—process decompositions of the Collect and Aggregate Assessment Information 1210. The output of Present Program Evaluation Information 1220 is three separate types of formatted information output. The first type of formatted output is Program Evaluation Tables/Queries 1221 that provides program evaluation information in a tabular or ciuery driven form. The second type of formatted output is Program Evaluation Reports/Charts 1222 that provides program evaluation information in either graphical or textual report formats. Finally. the third type of formatted output is Program Evaluation Extraction Files 1223 that provide output files suitable for import to third party applications such as SPSS or SAS.

FIG. 13, shown generally by numeral 1300, decomposes the Collect and Aggregate Assessment Information 1210 from FIG. 12 into five sub-processes. However, process 1320 and 1330 are mutually exclusive. Depending upon whether the indicator is Question-based or Indicator-based, one of the two Step 2 processes will be used. So, for each type of indicator measurement (i.e. Question-based or Instrument-based), the entire Collect and Aggregate Assessment Information process 1210 requires four steps. FIGS. 48 through 51 show specific queries that could be used to carry out the 4-step Collect and Aggregate Assessment Information process 1210 in the "Youth" implementation of the preferred embodiment.

If a Question-based indicator is to be measured, Step 2_Quest Get Answers 1320 is used. If an Instrument-based indicator is used, the Step 2_Inst Get Scores and Interpretation 1330 is used. The remaining three processes (1310, 1340 and 1350) are used in measuring both types of indicators.

For example, for the first indicator, a Question-based indicator, the four processes: Step 1 Get Paired Assessments 1310, Step 2_Quest Get Answers 1320, Step 3 Join Assessments to Answers and Scores 1340 and Step 4 Join Answered/Scored Assessments to Demographic Profile Info 1350 are used.

For the second indicator, an Instrument-based indicator, the four relevant processes are: 1310, 1330, 1340 and 1350. It can be contemplated that alternative processes (alternate queries or stored procedures) could be used to navigate through the database to measure the specified indicators. This is one example.

Measuring the First Indicator (Instrument Question-based—School Attendance)

The first step is depicted in FIG. 14. The Get Paired Assessments data flow diagram 1400 shows the specific fields within the data stores (tables), that are input to and output from the process Step 1 Get Paired Assessments 1310. It also shows the parameter PgmOfferID 1201 as an input. The object of this process is to find assessments that satisfy the date and pairing criteria expressed in the evaluation assumptions,—e.g. first and last assessments occurring after Participations 550 in the specified Program Offering 920 (i.e. Intensive Probation/Lorain County Domestic Relations Court) begin. This process does not care about the type of assessment instrument used, nor of the resulting answers or scores.

To illustrate the navigation within the database corresponding to process Step 1 Get Paired Assessments 1310, refer to the data model 1900 shown in FIG. 19.

The second step, depicted in FIG. 15 and shown generally by numeral 1500, describes the process Step 2_Quest Get Answers 1320. It relates only to the Question-based indicator. This process accepts, as a parameter, the specific question to be observed. In this case, the QuestID would point to the Instrument Question 920 whose description is "Current School Attendance Status (less than 10 is Satisfactory)". This process searches through all assessments that contain answers to this particular Instrument Question 920.

To illustrate the navigation within the database corresponding to process Step 2_Quest Get Answers 1320, refer to the data model 2000 shown in FIG. 20.

FIG. 16, applies to Instrument-based indicators, so is not relevant for this indicator type, the data flow diagram for Step 2 Inst Get Scores and Interpretation is referred to generally as 1600. The third step is illustrated by FIG. 17 and shown generally by numeral 1700. This diagram provides an overview of the process Step 3 Join Assessments to Answers and Scores 1340. Process 1340 joins the date-constrained assessment information, found in the interim table tblEvatFirstLastAssts 1211, with the question-constrained answer information, found in tblEvalAsstAnswers 1212, and stores the information in a third interim table, tblEvalFirstLastAsstsWithAnswersScores 1213.

The fourth step, shown in FIG. 18 and depicted by numeral 1800, shows how the process Step 4 Join Answered/Scored Assessments to Demographic Profile Info 1350 joins the information in tblEvalFirstLastAsstsWith-AnswersScores 1213 with demographic information associated with the youth who was the subject of the assessments. This information is stored in the table tblEvalDemogFirstLastAsstsWithAnswersScores 1214.

To illustrate the navigation within the database corresponding to process Step 4 Join Answered/Scored Assessments to Demographic Profile Info, refer to the data model 2400 shown in FIG. 24.

Each of the three output samples are drawn from the final table tblEvalDemogFirstLastAsstsWithAnswersScores 1214. See FIGS. 52 to 54, shown generally by numerals 5200 to 5400, respectively, to see examples of the three types of output. Also refer to FIGS. 44 and 45 to see examples of how these three types of output might be invoked. In this example, 5200 is invoked by 4440, 5300 by 4450, and 5400 by 4560.

Measuring the Second Indicator—Assessment Instrument-based—"LOSI" Surrogate Score The first step, i.e. Step 1 Get Paired Assessments, is identical to that described in the Question-based indicator measurement above. The second step is described by FIG. 16, shown generally by numeral 1600. It describes the process Step 2_Inst Get Scores and Interpretation 1330. It relates only to the Instrument-based indicator. This process accepts, as a parameter, the specific instrument to be observed. In this case, the InstID would point to the Assessment Instrument 870 whose description is "LOSI Assessment of Risks and Needs." This process searches through all assessments that contain answers to this particular Assessment Instrument 870.

To illustrate the navigation within the database corresponding to process Step 2_Inst Get Scores and Interpretation 1330, refer to the data model 2100 shown in FIG. 21. The third step, i.e. Step 3 Join Assessments to Answers and Scores 1340, is identical to that described in the Question-based indicator measurement above.

To illustrate the navigation within the database corresponding to process Step 3 Join Assessments to Answers and Scores 1340, for the Instrument-based indicator measurement, refer to the data model 2200 shown in FIG. 22.

The fourth step, i.e. Step 4 Join Answered/Scored Assessments to Demographic Profile Info 1350, is identical to that described in the Question-based indicator measurement above. To illustrate the navigation within the database corresponding to process Step 4 Join Answered/Scored Assessments to Demographic Profile Info 1350, for the Instrument-bases indicator measurement, refer to the data model 2300 shown in FIG. 23.

Figure 57:
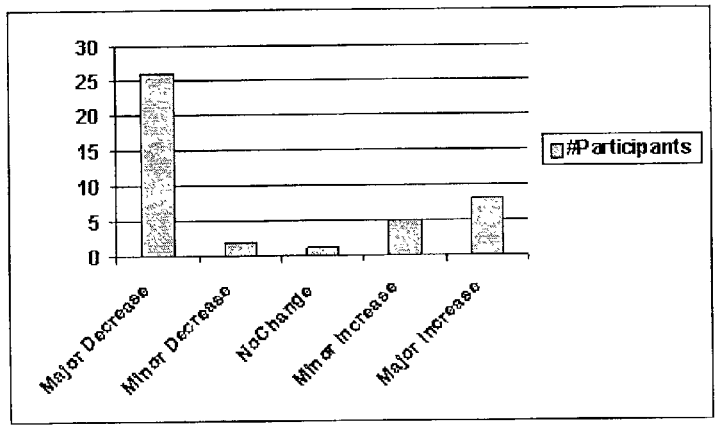

Each of the three output samples are drawn from the final table tblEvalDemogFirstLastAsstsWithAnswersScores 1214. See FIGS. 55 to 57, shown generally by numerals 5500 to 5700, respectively, to see examples of the three types of output. Also refer to FIG. 46 to see examples of how these three types of output might be invoked. In this example, 5500 is invoked by 4640, 5600 by 4650, and 5700 by 4690.

The present invention permits more complicated indicator measurements and other types of analysis for the purpose of program evaluation. It can be contemplated that the following factors might also be taken into consideration in program evaluation: the individual providers associated; the program components, interventions and services received; the amount of funding; the participation termination reason; the number of contacts made; the socioeconomic characteristics of the participant; or the living situation of the individual participant.

Other levels of aggregation are also available. Some examples are: analyses could be conducted by Program 510, Agency 730, or Fund 760; program periods might be more precisely specified; statistical samples might specify participants who received specific program, components, services or interventions; and control groups not receiving services could be compared with groups that did receive services. The data model described, collectively, in FIGS. 5 through 10 encompasses each of the above variations, and could easily accommodate more complex analysis specifications.

While the exemplary embodiment of the invention has been described with a degree of particularity, it is the intent that the invention include all modifications and alterations from the disclosed design falling within the spirit or scope of the appended claims.

I claim:

1. A method of tracking, managing, and evaluating individual participation and overall performance of multiple programs, agencies, funders, and workers with a server with processor, memory, and storage means, comprising the steps of:
   a) configuring a server to operate a database to store structured data;
   b) accessing a user interface to add, edit, or delete data stored in said database;
   c) maintaining assessment-instrument definition information stored in a first dataset in said database, wherein said assessment-instrument definition information is comprised of questions, question groups composed of multiple said questions, answer lists, answer validation data and assessment instruments comprised of said questions, said question groups, said answer lists and said answer validation data;
   d) maintaining program information stored in a second dataset in said database, wherein said program information is time-stamped, and said program information is comprised of program attributes, agency information, agency provider information, individual provider information, program offering information, and funds and funder information;
   e) maintaining participant information stored in a third dataset in said database;
   f) maintaining participation information stored in a fourth dataset in said database, wherein said participation information is comprised of links to said first dataset, said second dataset, said third dataset, time-stamped information of assessment-events, and time-stamped information regarding major activities and minor activities of an individual, such that said information of assessment events and said time-stamped information regarding major activities and minor activities, collected using said assessment instruments, can be tracked over time;
   g) creating a program offering comprised of said program information, wherein said program offering is defined by said funds comprising a pool of capital for operating said program offering where said funds are contributed by an agency funder defined by said agency information, an individual provider defined by said individual provider information, and an agency provider defined by said agency provider information which provides said program offering, whereby said agency finder and said agency provider are the same;

h) defining a program participation activity comprised of an individual described by said participant information, said program offering that said individual participates in, a program participation time indicating the participation time period during which said individual participated in said program offering, said individual provider who provides services to said individual through said program offering, and said assessment instruments that maintain said time-stamped information of assessment-events, and said information regarding said major activities and said minor activities performed as part of said program participation activity;

i) generating reports from said database by the steps of:
   i) structuring and issuing a query to said database to retrieve specific information from said database;
   ii) specifying a desired output for said specific information; and
   iii) processing and formatting said specific information into said desired output to be sent to said user interface or another software product; and, j) creating a program report by said generating reports whereby said specific information is a set of outcome indicators represented by said outcome instruments and associated dynamic subject attributes across multiple said program offerings, multiple providers, and multiple individual participants over time, whereby said desired output enables said outcome indicators to be correlated to the individual participation in multiple said program offerings over time.

2. A method of claim 1, wherein said questions and said groups of questions are multi-response questions and multi-response groups of questions.

3. A method of claim 1, whereby a computer that is connected to said server by a local area network is used to access said user interface.

4. A method of claim 1, whereby said step of maintaining said participant information further utilizes said questions, said question groups, and said assessment instruments to capture dynamic subject attributes selected from the group consisting of address, school, job, and marital status.

5. A method of claim 1, wherein said step (c), said answer lists are imported from an external data source.

6. A method of claim 1, wherein said step (e) of maintaining participant information further comprises the steps of obtaining said information regarding major activities and minor activities by sending said assessment instruments to said user interface, accepting an input from said user interface, and validating said input with said answer validation data.

7. A method of claim 1, wherein each said question is of a type selected from the group consisting of multichoice, date, freeform, inherited answer, and numeric range.

8. A method of claim 1, wherein said information of assessment-events includes a means of representing a plurality of similar assessment-events conducted at multiple points in time.

9. A method of claim 8, wherein said steps (i) and (iii) of processing and formatting said specific information produces aggregate assessment results from said plurality of similar assessment-events conducted at multiple points in time.

* * * * *